(12) United States Patent
Webber et al.

(10) Patent No.: US 11,937,991 B2
(45) Date of Patent: Mar. 26, 2024

(54) DENTAL ATTACHMENT PLACEMENT STRUCTURE

(71) Applicant: Align Technology, Inc., San Jose, CA (US)

(72) Inventors: Peter Webber, Redwood City, CA (US); Siobhan O'Leary, Santa Clara, CA (US); Jun Sato, San Jose, CA (US)

(73) Assignee: Align Technology, Inc., San Jose, CA (US)

( * ) Notice: Subject to any disclaimer, the term of this patent is extended or adjusted under 35 U.S.C. 154(b) by 475 days.

(21) Appl. No.: 16/366,686

(22) Filed: Mar. 27, 2019

(65) Prior Publication Data

US 2019/0298494 A1 Oct. 3, 2019

Related U.S. Application Data

(60) Provisional application No. 62/648,698, filed on Mar. 27, 2018.

(51) Int. Cl.
*A61C 7/08* (2006.01)
*A61C 7/14* (2006.01)
*A61C 7/16* (2006.01)

(52) U.S. Cl.
CPC ............... *A61C 7/08* (2013.01); *A61C 7/145* (2013.01); *A61C 7/16* (2013.01)

(58) Field of Classification Search
CPC ........... A61C 7/08; A61C 7/146; A61C 7/145; A61C 7/16
See application file for complete search history.

(56) References Cited

U.S. PATENT DOCUMENTS 2,171,695 A 9/1939 Harper
2,194,790 A 3/1940 Gluck
(Continued)

FOREIGN PATENT DOCUMENTS

AU 517102 B 11/1977
AU 3031677 A 11/1977
(Continued)

OTHER PUBLICATIONS

US 8,553,966 B1, 10/2013, Alpern et al. (withdrawn)
(Continued)

*Primary Examiner* — Jacqueline T Johanas
*Assistant Examiner* — Shannel Nicole Belk
(74) *Attorney, Agent, or Firm* — Shay Glenn LLP

(57) ABSTRACT

Aligner attachment placement devices including a frame configured to extend over at least a portion of a dental arch, an attachment support extending from a first side of the frame, an aligner attachment frangibly connected to the attachment support, a first and second registration anchor, and a retention support extending from a second side of the frame. In some cases, a gap portion of the frame between the first and second registration anchors may be configured to suspend over one or more teeth of the dental arch. The retention support may be separate from and located between the first and second registration anchors. The retention support may include an extension arm and a tooth contact portion, where at least part of the extension arm has a smaller width than the tooth contact portion.

32 Claims, 39 Drawing Sheets

(56) References Cited

U.S. PATENT DOCUMENTS

| | | |
|---|---|---|
| 2,467,432 A | 4/1949 | Kesling |
| 2,531,222 A | 11/1950 | Kesling |
| 2,835,628 A | 5/1958 | Saffir |
| 3,089,487 A | 5/1963 | Enicks et al. |
| 3,092,907 A | 6/1963 | Traiger |
| 3,178,820 A | 4/1965 | Kesling |
| 3,211,143 A | 10/1965 | Grossberg |
| 3,379,193 A | 4/1968 | Monsghan |
| 3,385,291 A | 5/1968 | Martin |
| 3,407,500 A | 10/1968 | Kesling |
| 3,478,742 A | 11/1969 | Bohlmann |
| 3,496,936 A | 2/1970 | Gores |
| 3,503,127 A | 3/1970 | Kasdin et al. |
| 3,521,355 A | 7/1970 | Pearlman |
| 3,533,163 A | 10/1970 | Kirschenbaum |
| 3,556,093 A | 1/1971 | Quick |
| 3,600,808 A | 8/1971 | Reeve |
| 3,660,900 A | 5/1972 | Andrews |
| 3,683,502 A | 8/1972 | Wallshein |
| 3,724,075 A | 4/1973 | Kesling |
| 3,738,005 A | 6/1973 | Cohen et al. |
| 3,797,115 A | 3/1974 | Cohen et al. |
| 3,813,781 A | 6/1974 | Forgione et al. |
| 3,860,803 A | 1/1975 | Levine |
| 3,885,310 A | 5/1975 | Northcutt |
| 3,916,526 A | 11/1975 | Schudy |
| 3,922,786 A | 12/1975 | Lavin |
| 3,949,477 A | 4/1976 | Cohen et al. |
| 3,950,851 A | 4/1976 | Bergersen |
| 3,955,282 A | 5/1976 | McNall |
| 3,983,628 A | 10/1976 | Acevedo |
| 4,014,096 A | 3/1977 | Dellinger |
| 4,039,653 A | 8/1977 | DeFoney et al. |
| 4,055,895 A | 11/1977 | Huge |
| 4,094,068 A | 6/1978 | Schinhammer |
| 4,117,596 A | 10/1978 | Wallshein |
| 4,129,946 A | 12/1978 | Kennedy |
| 4,134,208 A | 1/1979 | Pearlman |
| 4,139,944 A | 2/1979 | Bergersen |
| 4,179,811 A | 12/1979 | Hinz |
| 4,179,812 A | 12/1979 | White |
| 4,183,141 A | 1/1980 | Dellinger |
| 4,195,046 A | 3/1980 | Kesling |
| 4,204,325 A | 5/1980 | Kaelble |
| 4,253,828 A | 3/1981 | Coles et al. |
| 4,255,138 A | 3/1981 | Frohn |
| 4,278,087 A | 7/1981 | Theeuwes |
| 4,299,568 A | 11/1981 | Crowley |
| 4,324,546 A | 4/1982 | Heitlinger et al. |
| 4,324,547 A | 4/1982 | Arcan et al. |
| 4,348,178 A | 9/1982 | Kurz |
| 4,360,341 A * | 11/1982 | Dellinger .............. A61C 7/146 433/24 |
| 4,368,040 A | 1/1983 | Weissman |
| 4,419,992 A | 12/1983 | Chorbajian |
| 4,433,956 A | 2/1984 | Witzig |
| 4,433,960 A | 2/1984 | Garito et al. |
| 4,439,154 A | 3/1984 | Mayclin |
| 4,449,928 A | 5/1984 | von Weissenfluh |
| 4,450,150 A | 5/1984 | Sidman |
| 4,478,580 A | 10/1984 | Barrut |
| 4,500,294 A | 2/1985 | Lewis |
| 4,505,672 A | 3/1985 | Kurz |
| 4,505,673 A | 3/1985 | Yoshii |
| 4,519,386 A | 5/1985 | Sullivan |
| 4,523,908 A | 6/1985 | Drisaldi et al. |
| 4,526,540 A | 7/1985 | Dellinger |
| 4,553,936 A | 11/1985 | Wang |
| 4,575,330 A | 3/1986 | Hull |
| 4,575,805 A | 3/1986 | Moermann et al. |
| 4,591,341 A | 5/1986 | Andrews |
| 4,608,021 A | 8/1986 | Barrett |
| 4,609,349 A | 9/1986 | Cain |
| 4,611,288 A | 9/1986 | Duret et al. |
| 4,629,424 A | 12/1986 | Lauks et al. |
| 4,638,145 A | 1/1987 | Sakuma et al. |
| 4,656,860 A | 4/1987 | Orthuber et al. |
| 4,663,720 A | 5/1987 | Duret et al. |
| 4,664,626 A | 5/1987 | Kesling |
| 4,665,621 A | 5/1987 | Ackerman et al. |
| 4,676,747 A | 6/1987 | Kesling |
| 4,741,700 A | 5/1988 | Barabe |
| 4,755,139 A | 7/1988 | Abbatte et al. |
| 4,757,824 A | 7/1988 | Chaumet |
| 4,763,791 A | 8/1988 | Halverson et al. |
| 4,764,111 A | 8/1988 | Knierim |
| 4,790,752 A | 12/1988 | Cheslak |
| 4,793,803 A | 12/1988 | Martz |
| 4,798,534 A | 1/1989 | Breads |
| 4,818,542 A | 4/1989 | DeLuca et al. |
| 4,830,612 A | 5/1989 | Bergersen |
| 4,836,778 A | 6/1989 | Baumrind et al. |
| 4,837,732 A | 6/1989 | Brandestini et al. |
| 4,850,864 A | 7/1989 | Diamond |
| 4,850,865 A | 7/1989 | Napolitano |
| 4,856,991 A | 8/1989 | Breads et al. |
| 4,861,268 A | 8/1989 | Garay et al. |
| 4,877,398 A | 10/1989 | Kesling |
| 4,880,380 A | 11/1989 | Martz |
| 4,886,451 A | 12/1989 | Cetlin |
| 4,889,238 A | 12/1989 | Batchelor |
| 4,890,608 A | 1/1990 | Steer |
| 4,932,866 A | 6/1990 | Guis |
| 4,935,635 A | 6/1990 | O'Harra |
| 4,936,862 A | 6/1990 | Walker et al. |
| 4,937,928 A | 7/1990 | van der Zel |
| 4,941,826 A | 7/1990 | Loran et al. |
| 4,952,928 A | 8/1990 | Carroll et al. |
| 4,964,770 A | 10/1990 | Steinbichler et al. |
| 4,971,557 A | 11/1990 | Martin |
| 4,975,052 A | 12/1990 | Spencer et al. |
| 4,983,334 A | 1/1991 | Adell |
| 4,997,369 A | 3/1991 | Shafir |
| 5,002,485 A | 3/1991 | Aagesen |
| 5,011,405 A | 4/1991 | Lemchen |
| 5,015,183 A | 5/1991 | Fenick |
| 5,017,133 A | 5/1991 | Miura |
| 5,018,969 A | 5/1991 | Andreiko et al. |
| 5,027,281 A | 6/1991 | Rekow et al. |
| 5,035,613 A | 7/1991 | Breads et al. |
| 5,037,295 A | 8/1991 | Bergersen |
| 5,049,077 A | 9/1991 | Goldin et al. |
| 5,055,039 A | 10/1991 | Abbatte et al. |
| 5,061,839 A | 10/1991 | Matsuno et al. |
| 5,083,919 A | 1/1992 | Quach |
| 5,094,614 A | 3/1992 | Wildman |
| 5,100,316 A | 3/1992 | Wildman |
| 5,103,838 A | 4/1992 | Yousif |
| 5,114,339 A | 5/1992 | Guis |
| 5,121,333 A | 6/1992 | Riley et al. |
| 5,123,425 A | 6/1992 | Shannon et al. |
| 5,128,870 A | 7/1992 | Erdman et al. |
| 5,130,064 A | 7/1992 | Smalley et al. |
| 5,131,843 A | 7/1992 | Hilgers et al. |
| 5,131,844 A | 7/1992 | Marinaccio et al. |
| 5,139,419 A | 8/1992 | Andreiko et al. |
| 5,145,364 A | 9/1992 | Martz et al. |
| 5,176,517 A | 1/1993 | Truax |
| 5,194,003 A | 3/1993 | Garay et al. |
| 5,204,670 A | 4/1993 | Stinton |
| 5,222,499 A | 6/1993 | Allen et al. |
| 5,224,049 A | 6/1993 | Mushabac |
| 5,238,404 A | 8/1993 | Andreiko |
| 5,242,304 A | 9/1993 | Truax et al. |
| 5,245,592 A | 9/1993 | Kuemmel et al. |
| 5,273,429 A | 12/1993 | Rekow et al. |
| 5,278,756 A | 1/1994 | Lemchen et al. |
| 5,306,144 A | 4/1994 | Hibst et al. |
| 5,314,335 A | 5/1994 | Fung |
| 5,324,186 A | 6/1994 | Bakanowski |
| 5,328,362 A | 7/1994 | Watson et al. |
| 5,335,657 A | 8/1994 | Terry et al. |
| 5,338,198 A | 8/1994 | Wu et al. |
| 5,340,309 A | 8/1994 | Robertson |

(56) References Cited

U.S. PATENT DOCUMENTS

| | | | |
|---|---|---|---|
| 5,342,202 A | 8/1994 | Deshayes |
| 5,344,315 A | 9/1994 | Hanson |
| 5,368,478 A | 11/1994 | Andreiko et al. |
| 5,372,502 A | 12/1994 | Massen et al. |
| D354,355 S | 1/1995 | Hilgers |
| 5,382,164 A | 1/1995 | Stern |
| 5,395,238 A | 3/1995 | Andreiko et al. |
| 5,415,542 A | 5/1995 | Kesling |
| 5,431,562 A | 7/1995 | Andreiko et al. |
| 5,440,326 A | 8/1995 | Quinn |
| 5,440,496 A | 8/1995 | Andersson et al. |
| 5,447,432 A | 9/1995 | Andreiko et al. |
| 5,449,703 A | 9/1995 | Mitra et al. |
| 5,452,219 A | 9/1995 | Dehoff et al. |
| 5,454,717 A | 10/1995 | Andreiko et al. |
| 5,456,600 A | 10/1995 | Andreiko et al. |
| 5,474,448 A | 12/1995 | Andreiko et al. |
| 5,487,662 A | 1/1996 | Kipke et al. |
| RE35,169 E | 3/1996 | Lemchen et al. |
| 5,499,633 A | 3/1996 | Fenton |
| 5,522,725 A | 6/1996 | Jordan et al. |
| 5,528,735 A | 6/1996 | Strasnick et al. |
| 5,533,895 A | 7/1996 | Andreiko et al. |
| 5,540,732 A | 7/1996 | Testerman |
| 5,542,842 A | 8/1996 | Andreiko et al. |
| 5,543,780 A | 8/1996 | McAuley et al. |
| 5,549,476 A | 8/1996 | Stern |
| 5,562,448 A | 10/1996 | Mushabac |
| 5,570,182 A | 10/1996 | Nathel et al. |
| 5,575,649 A | 11/1996 | Lee |
| 5,575,655 A | 11/1996 | Darnell |
| 5,583,977 A | 12/1996 | Seidl |
| 5,587,912 A | 12/1996 | Andersson et al. |
| 5,588,098 A | 12/1996 | Chen et al. |
| 5,605,459 A | 2/1997 | Kuroda et al. |
| 5,607,305 A | 3/1997 | Andersson et al. |
| 5,614,075 A | 3/1997 | Andre |
| 5,621,648 A | 4/1997 | Crump |
| 5,626,537 A | 5/1997 | Danyo et al. |
| 5,636,736 A | 6/1997 | Jacobs et al. |
| 5,645,420 A | 7/1997 | Bergersen |
| 5,645,421 A | 7/1997 | Slootsky |
| 5,651,671 A | 7/1997 | Seay et al. |
| 5,655,653 A | 8/1997 | Chester |
| 5,659,420 A | 8/1997 | Wakai et al. |
| 5,683,243 A | 11/1997 | Andreiko et al. |
| 5,683,244 A | 11/1997 | Truax |
| 5,691,539 A | 11/1997 | Pfeiffer |
| 5,692,894 A | 12/1997 | Schwartz et al. |
| 5,711,665 A | 1/1998 | Adam et al. |
| 5,711,666 A | 1/1998 | Hanson |
| 5,725,376 A | 3/1998 | Poirier |
| 5,725,378 A | 3/1998 | Wang |
| 5,730,151 A | 3/1998 | Summer et al. |
| 5,737,084 A | 4/1998 | Ishihara |
| 5,740,267 A | 4/1998 | Echerer et al. |
| 5,742,700 A | 4/1998 | Yoon et al. |
| 5,769,631 A | 6/1998 | Williams |
| 5,774,425 A | 6/1998 | Ivanov et al. |
| 5,790,242 A | 8/1998 | Stern et al. |
| 5,791,896 A * | 8/1998 | Ipenburg ............... A61C 7/12 |
| | | 433/24 |
| 5,799,100 A | 8/1998 | Clarke et al. |
| 5,800,162 A | 9/1998 | Shimodaira et al. |
| 5,800,174 A | 9/1998 | Andersson |
| 5,813,854 A | 9/1998 | Nikodem |
| 5,816,800 A | 10/1998 | Brehm et al. |
| 5,818,587 A | 10/1998 | Devaraj et al. |
| 5,823,778 A | 10/1998 | Schmitt et al. |
| 5,848,115 A | 12/1998 | Little et al. |
| 5,857,853 A | 1/1999 | van Nifterick et al. |
| 5,866,058 A | 2/1999 | Batchelder et al. |
| 5,876,199 A | 3/1999 | Bergersen |
| 5,879,158 A | 3/1999 | Doyle et al. |
| 5,880,961 A | 3/1999 | Crump |
| 5,880,962 A | 3/1999 | Andersson et al. |
| 5,882,192 A | 3/1999 | Bergersen |
| 5,886,702 A | 3/1999 | Migdal et al. |
| 5,890,896 A | 4/1999 | Padial |
| 5,904,479 A | 5/1999 | Staples |
| 5,911,576 A | 6/1999 | Ulrich et al. |
| 5,934,288 A | 8/1999 | Avila et al. |
| 5,957,686 A | 9/1999 | Anthony |
| 5,964,587 A | 10/1999 | Sato |
| 5,971,754 A | 10/1999 | Sondhi et al. |
| 5,975,893 A | 11/1999 | Chishti et al. |
| 5,975,906 A | 11/1999 | Knutson |
| 5,980,246 A | 11/1999 | Ramsay et al. |
| 5,989,023 A | 11/1999 | Summer et al. |
| 5,993,413 A | 11/1999 | Aaltonen et al. |
| 6,002,706 A | 12/1999 | Staver et al. |
| 6,018,713 A | 1/2000 | Coli et al. |
| 6,044,309 A | 3/2000 | Honda |
| 6,049,743 A | 4/2000 | Baba |
| 6,053,731 A | 4/2000 | Heckenberger |
| 6,068,482 A | 5/2000 | Snow |
| 6,070,140 A | 5/2000 | Tran |
| 6,099,303 A | 8/2000 | Gibbs et al. |
| 6,099,314 A | 8/2000 | Kopelman et al. |
| 6,102,701 A | 8/2000 | Engeron |
| 6,120,287 A | 9/2000 | Chen |
| 6,123,544 A * | 9/2000 | Cleary ............... A61C 7/146 |
| | | 433/24 |
| 6,152,731 A | 11/2000 | Jordan et al. |
| 6,154,676 A | 11/2000 | Levine |
| 6,183,248 B1 | 2/2001 | Chishti et al. |
| 6,183,249 B1 | 2/2001 | Brennan et al. |
| 6,186,780 B1 | 2/2001 | Hibst et al. |
| 6,190,165 B1 | 2/2001 | Andreiko et al. |
| 6,200,133 B1 | 3/2001 | Kittelsen |
| 6,201,880 B1 | 3/2001 | Elbaum et al. |
| 6,210,162 B1 | 4/2001 | Chishti et al. |
| 6,212,435 B1 | 4/2001 | Lattner et al. |
| 6,213,767 B1 | 4/2001 | Dixon et al. |
| 6,217,334 B1 | 4/2001 | Hultgren |
| 6,227,850 B1 | 5/2001 | Chishti et al. |
| 6,230,142 B1 | 5/2001 | Benigno et al. |
| 6,231,338 B1 | 5/2001 | de Josselin de Jong et al. |
| 6,239,705 B1 | 5/2001 | Glen |
| 6,243,601 B1 | 6/2001 | Wist |
| 6,263,234 B1 | 7/2001 | Engelhardt et al. |
| 6,283,761 B1 | 9/2001 | Joao |
| 6,288,138 B1 | 9/2001 | Yamamoto |
| 6,299,438 B1 | 10/2001 | Sahagian et al. |
| 6,309,215 B1 | 10/2001 | Phan et al. |
| 6,313,432 B1 | 11/2001 | Nagata et al. |
| 6,315,553 B1 | 11/2001 | Sachdeva et al. |
| 6,328,745 B1 | 12/2001 | Ascherman |
| 6,332,774 B1 | 12/2001 | Chikami |
| 6,334,073 B1 | 12/2001 | Levine |
| 6,350,120 B1 | 2/2002 | Sachdeva et al. |
| 6,364,660 B1 | 4/2002 | Durbin et al. |
| 6,382,975 B1 | 5/2002 | Poirier |
| 6,386,878 B1 | 5/2002 | Pavlovskaia et al. |
| 6,394,802 B1 | 5/2002 | Hahn |
| 6,402,510 B1 | 6/2002 | Williams |
| 6,402,707 B1 | 6/2002 | Ernst |
| 6,405,729 B1 | 6/2002 | Thornton |
| 6,406,292 B1 | 6/2002 | Chishti et al. |
| 6,409,504 B1 | 6/2002 | Jones et al. |
| 6,413,086 B1 | 7/2002 | Womack |
| 6,414,264 B1 | 7/2002 | von Falkenhausen |
| 6,414,708 B1 | 7/2002 | Carmeli et al. |
| 6,435,871 B1 | 8/2002 | Inman |
| 6,436,058 B1 | 8/2002 | Krahner et al. |
| 6,441,354 B1 | 8/2002 | Seghatol et al. |
| 6,450,167 B1 | 9/2002 | David et al. |
| 6,450,807 B1 | 9/2002 | Chishti et al. |
| 6,462,301 B1 | 10/2002 | Scott et al. |
| 6,470,338 B1 | 10/2002 | Rizzo et al. |
| 6,471,511 B1 | 10/2002 | Chishti et al. |
| 6,471,512 B1 | 10/2002 | Sachdeva et al. |
| 6,471,970 B1 | 10/2002 | Fanara et al. |
| 6,482,002 B2 | 11/2002 | Jordan et al. |

(56) References Cited

U.S. PATENT DOCUMENTS

| | | |
|---|---|---|
| 6,482,298 B1 | 11/2002 | Bhatnagar |
| 6,496,814 B1 | 12/2002 | Busche |
| 6,496,816 B1 | 12/2002 | Thiesson et al. |
| 6,499,026 B1 | 12/2002 | Rivette et al. |
| 6,499,995 B1 | 12/2002 | Schwartz |
| 6,507,832 B1 | 1/2003 | Evans et al. |
| 6,514,074 B1 | 2/2003 | Chishti et al. |
| 6,515,593 B1 | 2/2003 | Stark et al. |
| 6,516,288 B2 | 2/2003 | Bagne |
| 6,516,805 B1 | 2/2003 | Thornton |
| 6,520,772 B2 | 2/2003 | Williams |
| 6,523,009 B1 | 2/2003 | Wilkins |
| 6,523,019 B1 | 2/2003 | Borthwick |
| 6,524,101 B1 | 2/2003 | Phan et al. |
| 6,526,168 B1 | 2/2003 | Ornes et al. |
| 6,526,982 B1 | 3/2003 | Strong |
| 6,529,891 B1 | 3/2003 | Heckerman |
| 6,529,902 B1 | 3/2003 | Kanevsky et al. |
| 6,532,455 B1 | 3/2003 | Martin et al. |
| 6,535,865 B1 | 3/2003 | Skaaning et al. |
| 6,540,512 B1 | 4/2003 | Sachdeva et al. |
| 6,540,707 B1 | 4/2003 | Stark et al. |
| 6,542,593 B1 | 4/2003 | Bowman Amuah |
| 6,542,881 B1 | 4/2003 | Meidan et al. |
| 6,542,894 B1 | 4/2003 | Lee et al. |
| 6,542,903 B2 | 4/2003 | Hull et al. |
| 6,551,243 B2 | 4/2003 | Bocionek et al. |
| 6,554,837 B1 | 4/2003 | Hauri et al. |
| 6,556,659 B1 | 4/2003 | Bowman Amuah |
| 6,556,977 B1 | 4/2003 | Lapointe et al. |
| 6,560,592 B1 | 5/2003 | Reid et al. |
| 6,564,209 B1 | 5/2003 | Dempski et al. |
| 6,567,814 B1 | 5/2003 | Bankier et al. |
| 6,571,227 B1 | 5/2003 | Agrafiotis et al. |
| 6,572,372 B1 | 6/2003 | Phan et al. |
| 6,573,998 B2 | 6/2003 | Cohen Sabban |
| 6,574,561 B2 | 6/2003 | Alexander et al. |
| 6,578,003 B1 | 6/2003 | Camarda et al. |
| 6,580,948 B2 | 6/2003 | Haupert et al. |
| 6,587,529 B1 | 7/2003 | Staszewski et al. |
| 6,587,828 B1 | 7/2003 | Sachdeva |
| 6,592,368 B1 | 7/2003 | Weathers |
| 6,594,539 B1 | 7/2003 | Geng |
| 6,595,342 B1 | 7/2003 | Maritzen et al. |
| 6,597,934 B1 | 7/2003 | de Jong et al. |
| 6,598,043 B1 | 7/2003 | Baclawski |
| 6,599,250 B2 | 7/2003 | Webb et al. |
| 6,602,070 B2 | 8/2003 | Miller et al. |
| 6,604,527 B1 | 8/2003 | Palmisano |
| 6,606,744 B1 | 8/2003 | Mikurak |
| 6,607,382 B1 | 8/2003 | Kuo et al. |
| 6,611,783 B2 | 8/2003 | Kelly et al. |
| 6,611,867 B1 | 8/2003 | Bowman Amuah |
| 6,613,001 B1 | 9/2003 | Dworkin |
| 6,615,158 B2 | 9/2003 | Wenzel et al. |
| 6,616,447 B1 | 9/2003 | Rizoiu et al. |
| 6,616,579 B1 | 9/2003 | Reinbold et al. |
| 6,621,491 B1 | 9/2003 | Baumrind et al. |
| 6,623,698 B2 | 9/2003 | Kuo |
| 6,624,752 B2 | 9/2003 | Klitsgaard et al. |
| 6,626,180 B1 | 9/2003 | Kittelsen et al. |
| 6,626,569 B2 | 9/2003 | Reinstein et al. |
| 6,626,669 B2 | 9/2003 | Zegarelli |
| 6,633,772 B2 | 10/2003 | Ford et al. |
| 6,640,128 B2 | 10/2003 | Vilsmeier et al. |
| 6,643,646 B2 | 11/2003 | Su et al. |
| 6,647,383 B1 | 11/2003 | August et al. |
| 6,650,944 B2 | 11/2003 | Goedeke et al. |
| 6,671,818 B1 | 12/2003 | Mikurak |
| 6,675,104 B2 | 1/2004 | Paulse et al. |
| 6,678,669 B2 | 1/2004 | Lapointe et al. |
| 6,682,346 B2 | 1/2004 | Chishti et al. |
| 6,685,469 B2 | 2/2004 | Chishti et al. |
| 6,689,055 B1 | 2/2004 | Mullen et al. |
| 6,690,761 B2 | 2/2004 | Lang et al. |
| 6,691,110 B2 | 2/2004 | Wang et al. |
| 6,694,234 B2 | 2/2004 | Lockwood et al. |
| 6,697,164 B1 | 2/2004 | Babayoff et al. |
| 6,697,793 B2 | 2/2004 | McGreevy |
| 6,702,765 B2 | 3/2004 | Robbins et al. |
| 6,702,804 B1 | 3/2004 | Ritter et al. |
| 6,705,863 B2 | 3/2004 | Phan et al. |
| 6,729,876 B2 | 5/2004 | Chishti et al. |
| 6,733,289 B2 | 5/2004 | Manemann et al. |
| 6,736,638 B1 | 5/2004 | Sachdeva et al. |
| 6,739,869 B1 | 5/2004 | Taub et al. |
| 6,744,932 B1 | 6/2004 | Rubbert et al. |
| 6,749,414 B1 | 6/2004 | Hanson et al. |
| 6,769,913 B2 | 8/2004 | Hurson |
| 6,772,026 B2 | 8/2004 | Bradbury et al. |
| 6,790,036 B2 | 9/2004 | Graham |
| 6,802,713 B1 | 10/2004 | Chishti et al. |
| 6,814,574 B2 | 11/2004 | Abolfathi et al. |
| 6,830,450 B2 | 12/2004 | Knopp et al. |
| 6,832,912 B2 | 12/2004 | Mao |
| 6,832,914 B1 | 12/2004 | Bonnet et al. |
| 6,843,370 B2 | 1/2005 | Tuneberg |
| 6,845,175 B2 | 1/2005 | Kopelman et al. |
| 6,885,464 B1 | 4/2005 | Pfeiffer et al. |
| 6,890,285 B2 | 5/2005 | Rahman et al. |
| 6,951,254 B2 | 10/2005 | Morrison |
| 6,976,841 B1 | 12/2005 | Osterwalder |
| 6,978,268 B2 | 12/2005 | Thomas et al. |
| 6,983,752 B2 | 1/2006 | Garabadian |
| 6,984,128 B2 | 1/2006 | Breining et al. |
| 6,988,893 B2 | 1/2006 | Haywood |
| 7,016,952 B2 | 3/2006 | Mullen et al. |
| 7,020,963 B2 | 4/2006 | Cleary et al. |
| 7,036,514 B2 | 5/2006 | Heck |
| 7,040,896 B2 | 5/2006 | Pavlovskaia et al. |
| 7,106,233 B2 | 9/2006 | Schroeder et al. |
| 7,112,065 B2 | 9/2006 | Kopelman et al. |
| 7,121,825 B2 | 10/2006 | Chishti et al. |
| 7,134,874 B2 | 11/2006 | Chishti et al. |
| 7,137,812 B2 | 11/2006 | Cleary et al. |
| 7,138,640 B1 | 11/2006 | Delgado et al. |
| 7,140,877 B2 | 11/2006 | Kaza |
| 7,142,312 B2 | 11/2006 | Quadling et al. |
| 7,155,373 B2 | 12/2006 | Jordan et al. |
| 7,156,655 B2 | 1/2007 | Sachdeva et al. |
| 7,156,661 B2 | 1/2007 | Choi et al. |
| 7,166,063 B2 | 1/2007 | Rahman et al. |
| 7,184,150 B2 | 2/2007 | Quadling et al. |
| 7,191,451 B2 | 3/2007 | Nakagawa |
| 7,192,273 B2 | 3/2007 | McSurdy |
| 7,194,781 B1 | 3/2007 | Orjela |
| 7,217,131 B2 | 5/2007 | Vuillemot |
| 7,220,122 B2 | 5/2007 | Chishti |
| 7,220,124 B2 | 5/2007 | Taub et al. |
| 7,229,282 B2 | 6/2007 | Andreiko et al. |
| 7,234,937 B2 | 6/2007 | Sachdeva et al. |
| 7,241,142 B2 | 7/2007 | Abolfathi et al. |
| 7,244,230 B2 | 7/2007 | Duggirala et al. |
| 7,245,753 B2 | 7/2007 | Squilla et al. |
| 7,257,136 B2 | 8/2007 | Mori et al. |
| 7,286,954 B2 | 10/2007 | Kopelman et al. |
| 7,292,759 B2 | 11/2007 | Boutoussov et al. |
| 7,294,141 B2 | 11/2007 | Bergersen |
| 7,302,842 B2 | 12/2007 | Biester et al. |
| 7,320,592 B2 | 1/2008 | Chishti et al. |
| 7,328,706 B2 | 2/2008 | Barach et al. |
| 7,329,122 B1 | 2/2008 | Scott |
| 7,338,327 B2 | 3/2008 | Sticker et al. |
| D565,509 S | 4/2008 | Fechner et al. |
| 7,351,116 B2 | 4/2008 | Dold |
| 7,354,270 B2 | 4/2008 | Abolfathi et al. |
| 7,357,637 B2 | 4/2008 | Liechtung |
| 7,435,083 B2 | 10/2008 | Chishti et al. |
| 7,450,231 B2 | 11/2008 | Johs et al. |
| 7,458,810 B2 | 12/2008 | Bergersen |
| 7,460,230 B2 | 12/2008 | Johs et al. |
| 7,462,076 B2 | 12/2008 | Walter et al. |
| 7,463,929 B2 | 12/2008 | Simmons |
| 7,476,100 B2 | 1/2009 | Kuo |

(56) References Cited

U.S. PATENT DOCUMENTS

| | | |
|---|---|---|
| 7,500,851 B2 | 3/2009 | Williams |
| D594,413 S | 6/2009 | Palka et al. |
| 7,543,511 B2 | 6/2009 | Kimura et al. |
| 7,544,103 B2 | 6/2009 | Walter et al. |
| 7,553,157 B2 | 6/2009 | Abolfathi et al. |
| 7,561,273 B2 | 7/2009 | Stautmeister et al. |
| 7,577,284 B2 | 8/2009 | Wong et al. |
| 7,596,253 B2 | 9/2009 | Wong et al. |
| 7,597,594 B2 | 10/2009 | Stadler et al. |
| 7,609,875 B2 | 10/2009 | Liu et al. |
| D603,796 S | 11/2009 | Sticker et al. |
| 7,616,319 B1 | 11/2009 | Woollam et al. |
| 7,626,705 B2 | 12/2009 | Altendorf |
| 7,632,216 B2 | 12/2009 | Rahman et al. |
| 7,633,625 B1 | 12/2009 | Woollam et al. |
| 7,637,262 B2 | 12/2009 | Bailey |
| 7,637,740 B2 | 12/2009 | Knopp |
| 7,641,473 B2 | 1/2010 | Sporbert et al. |
| 7,668,355 B2 | 2/2010 | Wong et al. |
| 7,670,179 B2 | 3/2010 | Müller |
| 7,695,327 B2 | 4/2010 | Bäuerle et al. |
| 7,698,068 B2 | 4/2010 | Babayoff |
| 7,711,447 B2 | 5/2010 | Lu et al. |
| 7,724,378 B2 | 5/2010 | Babayoff |
| D618,619 S | 6/2010 | Walter |
| 7,728,848 B2 | 6/2010 | Petrov et al. |
| 7,731,508 B2 | 6/2010 | Borst |
| 7,735,217 B2 | 6/2010 | Borst |
| 7,740,476 B2 | 6/2010 | Rubbert et al. |
| 7,744,369 B2 | 6/2010 | Imgrund et al. |
| 7,746,339 B2 | 6/2010 | Matov et al. |
| 7,780,460 B2 | 8/2010 | Walter |
| 7,787,132 B2 | 8/2010 | Körner et al. |
| 7,791,810 B2 | 9/2010 | Powell |
| 7,796,243 B2 | 9/2010 | Choo-Smith et al. |
| 7,806,687 B2 | 10/2010 | Minagi et al. |
| 7,806,727 B2 | 10/2010 | Dold et al. |
| 7,813,787 B2 | 10/2010 | de Josselin de Jong et al. |
| 7,824,180 B2 | 11/2010 | Abolfathi et al. |
| 7,828,601 B2 | 11/2010 | Pyczak |
| 7,841,464 B2 | 11/2010 | Cinader, Jr. et al. |
| 7,845,969 B2 | 12/2010 | Stadler et al. |
| 7,854,609 B2 | 12/2010 | Chen et al. |
| 7,862,336 B2 | 1/2011 | Kopelman et al. |
| 7,869,983 B2 | 1/2011 | Raby et al. |
| 7,872,760 B2 | 1/2011 | Ertl |
| 7,874,836 B2 | 1/2011 | McSurdy |
| 7,874,837 B2 | 1/2011 | Chishti et al. |
| 7,874,849 B2 | 1/2011 | Sticker et al. |
| 7,878,801 B2 | 2/2011 | Abolfathi et al. |
| 7,878,805 B2 | 2/2011 | Moss et al. |
| 7,880,751 B2 | 2/2011 | Kuo et al. |
| 7,892,474 B2 | 2/2011 | Shkolnik et al. |
| 7,904,308 B2 | 3/2011 | Arnone et al. |
| 7,907,280 B2 | 3/2011 | Johs et al. |
| 7,929,151 B2 | 4/2011 | Liang et al. |
| 7,930,189 B2 | 4/2011 | Kuo |
| 7,947,508 B2 | 5/2011 | Tricca et al. |
| 7,959,308 B2 | 6/2011 | Freeman et al. |
| 7,963,766 B2 | 6/2011 | Cronauer |
| 7,970,627 B2 | 6/2011 | Kuo et al. |
| 7,970,628 B2 | 6/2011 | Kuo et al. |
| 7,985,414 B2 | 7/2011 | Knaack et al. |
| 7,986,415 B2 | 7/2011 | Thiel et al. |
| 7,987,099 B2 | 7/2011 | Kuo et al. |
| 7,991,485 B2 | 8/2011 | Zakim |
| 8,017,891 B2 | 9/2011 | Nevin |
| 8,026,916 B2 | 9/2011 | Wen |
| 8,027,709 B2 | 9/2011 | Arnone et al. |
| 8,029,277 B2 | 10/2011 | Imgrund et al. |
| 8,038,444 B2 | 10/2011 | Kitching et al. |
| 8,045,772 B2 | 10/2011 | Kosuge et al. |
| 8,054,556 B2 | 11/2011 | Chen et al. |
| 8,070,490 B1 | 12/2011 | Roetzer et al. |
| 8,075,306 B2 | 12/2011 | Kitching et al. |
| 8,077,949 B2 | 12/2011 | Liang et al. |
| 8,083,556 B2 | 12/2011 | Stadler et al. |
| D652,799 S | 1/2012 | Mueller |
| 8,092,215 B2 | 1/2012 | Stone-Collonge et al. |
| 8,095,383 B2 | 1/2012 | Arnone et al. |
| 8,099,268 B2 | 1/2012 | Kitching et al. |
| 8,099,305 B2 | 1/2012 | Kuo et al. |
| 8,108,189 B2 | 1/2012 | Chelnokov et al. |
| 8,118,592 B2 | 2/2012 | Tortorici |
| 8,126,025 B2 | 2/2012 | Takeda |
| 8,126,726 B2 | 2/2012 | Matov et al. |
| 8,136,529 B2 | 3/2012 | Kelly |
| 8,144,954 B2 | 3/2012 | Quadling et al. |
| 8,152,518 B2 | 4/2012 | Kuo |
| 8,160,334 B2 | 4/2012 | Thiel et al. |
| 8,172,569 B2 | 5/2012 | Matty et al. |
| 8,197,252 B1 | 6/2012 | Harrison, III |
| 8,201,560 B2 | 6/2012 | Dembro |
| 8,215,312 B2 | 7/2012 | Garabadian et al. |
| 8,240,018 B2 | 8/2012 | Walter et al. |
| 8,275,180 B2 | 9/2012 | Kuo |
| 8,279,450 B2 | 10/2012 | Oota et al. |
| 8,292,617 B2 | 10/2012 | Brandt et al. |
| 8,294,657 B2 | 10/2012 | Kim et al. |
| 8,296,952 B2 | 10/2012 | Greenberg |
| 8,297,286 B2 | 10/2012 | Smernoff |
| 8,306,608 B2 | 11/2012 | Mandelis et al. |
| 8,314,764 B2 | 11/2012 | Kim et al. |
| 8,332,015 B2 | 12/2012 | Ertl |
| 8,354,588 B2 | 1/2013 | Sticker et al. |
| 8,366,479 B2 | 2/2013 | Borst et al. |
| 8,401,826 B2 | 3/2013 | Cheng et al. |
| 8,419,428 B2 | 4/2013 | Lawrence |
| 8,433,083 B2 | 4/2013 | Abolfathi et al. |
| 8,439,672 B2 | 5/2013 | Matov et al. |
| 8,465,280 B2 | 6/2013 | Sachdeva et al. |
| 8,477,320 B2 | 7/2013 | Stock et al. |
| 8,488,113 B2 | 7/2013 | Thiel et al. |
| 8,517,726 B2 | 8/2013 | Kakavand et al. |
| 8,520,922 B2 | 8/2013 | Wang et al. |
| 8,520,925 B2 | 8/2013 | Duret et al. |
| 8,523,565 B2 | 9/2013 | Matty et al. |
| 8,545,221 B2 | 10/2013 | Stone-Collonge et al. |
| 8,556,625 B2 | 10/2013 | Lovely |
| 8,570,530 B2 | 10/2013 | Liang |
| 8,573,224 B2 | 11/2013 | Thornton |
| 8,577,212 B2 | 11/2013 | Thiel |
| 8,587,582 B2 | 11/2013 | Matov et al. |
| 8,601,925 B1 | 12/2013 | Coto |
| 8,639,477 B2 | 1/2014 | Chelnokov et al. |
| 8,650,586 B2 | 2/2014 | Lee et al. |
| 8,675,706 B2 | 3/2014 | Seurin et al. |
| 8,723,029 B2 | 5/2014 | Pyczak et al. |
| 8,738,394 B2 | 5/2014 | Kuo |
| 8,743,923 B2 | 6/2014 | Geske et al. |
| 8,767,270 B2 | 7/2014 | Curry et al. |
| 8,768,016 B2 | 7/2014 | Pan et al. |
| 8,771,149 B2 | 7/2014 | Rahman et al. |
| 8,839,476 B2 | 9/2014 | Adachi |
| 8,843,381 B2 | 9/2014 | Kuo et al. |
| 8,856,053 B2 | 10/2014 | Mah |
| 8,870,566 B2 | 10/2014 | Bergersen |
| 8,874,452 B2 | 10/2014 | Kuo |
| 8,878,905 B2 | 11/2014 | Fisker et al. |
| 8,896,592 B2 | 11/2014 | Boltunov et al. |
| 8,899,976 B2 | 12/2014 | Chen et al. |
| 8,936,463 B2 | 1/2015 | Mason et al. |
| 8,944,812 B2 | 2/2015 | Kuo |
| 8,948,482 B2 | 2/2015 | Levin |
| 8,956,058 B2 | 2/2015 | Rösch |
| 8,992,216 B2 | 3/2015 | Karazivan |
| 9,004,915 B2 | 4/2015 | Moss et al. |
| 9,022,792 B2 | 5/2015 | Sticker et al. |
| 9,039,418 B1 | 5/2015 | Rubbert |
| 9,084,535 B2 | 7/2015 | Girkin et al. |
| 9,084,657 B2 | 7/2015 | Matty et al. |
| 9,108,338 B2 | 8/2015 | Sirovskiy et al. |
| 9,144,512 B2 | 9/2015 | Wagner |
| 9,192,305 B2 | 11/2015 | Levin |

(56) References Cited

U.S. PATENT DOCUMENTS

| | | |
|---|---|---|
| 9,204,952 B2 | 12/2015 | Lampalzer |
| 9,211,166 B2 | 12/2015 | Kuo et al. |
| 9,214,014 B2 | 12/2015 | Levin |
| 9,220,580 B2 | 12/2015 | Borovinskih et al. |
| 9,241,774 B2 | 1/2016 | Li et al. |
| 9,242,118 B2 | 1/2016 | Brawn |
| 9,256,710 B2 | 2/2016 | Boltunov et al. |
| 9,261,358 B2 | 2/2016 | Atiya et al. |
| 9,277,972 B2 | 3/2016 | Brandt et al. |
| 9,336,336 B2 | 5/2016 | Deichmann et al. |
| 9,351,810 B2 | 5/2016 | Moon |
| 9,375,300 B2 | 6/2016 | Matov et al. |
| 9,403,238 B2 | 8/2016 | Culp |
| 9,408,743 B1 | 8/2016 | Wagner |
| 9,414,897 B2 | 8/2016 | Wu et al. |
| 9,433,476 B2 | 9/2016 | Khardekar et al. |
| 9,439,568 B2 | 9/2016 | Atiya et al. |
| 9,444,981 B2 | 9/2016 | Bellis et al. |
| 9,463,287 B1 | 10/2016 | Lorberbaum et al. |
| 9,492,243 B2 | 11/2016 | Kuo |
| 9,500,635 B2 | 11/2016 | Islam |
| 9,506,808 B2 | 11/2016 | Jeon et al. |
| 9,510,918 B2 | 12/2016 | Sanchez |
| 9,545,331 B2 | 1/2017 | Ingemarsson-Matzen |
| 9,566,132 B2 | 2/2017 | Stone-Collonge et al. |
| 9,584,771 B2 | 2/2017 | Mandelis et al. |
| 9,589,329 B2 | 3/2017 | Levin |
| 9,610,141 B2 | 4/2017 | Kopelman et al. |
| 9,675,427 B2 | 6/2017 | Kopelman |
| 9,675,430 B2 | 6/2017 | Verker et al. |
| 9,693,839 B2 | 7/2017 | Atiya et al. |
| 9,744,006 B2 | 8/2017 | Ross |
| 9,795,461 B2 | 10/2017 | Kopelman et al. |
| 9,820,829 B2 | 11/2017 | Kuo |
| 9,830,688 B2 | 11/2017 | Levin |
| 9,844,421 B2 | 12/2017 | Moss et al. |
| 9,848,985 B2 | 12/2017 | Yang et al. |
| 9,861,451 B1 | 1/2018 | Davis |
| 9,936,186 B2 | 4/2018 | Jesenko et al. |
| 9,962,238 B2 | 5/2018 | Boltunov et al. |
| 10,123,706 B2 | 11/2018 | Elbaz et al. |
| 10,123,853 B2 | 11/2018 | Moss et al. |
| 10,130,445 B2 | 11/2018 | Kopelman et al. |
| 10,159,541 B2 | 12/2018 | Bindayel |
| 10,172,693 B2 | 1/2019 | Brandt et al. |
| 10,195,690 B2 | 2/2019 | Culp |
| 10,231,801 B2 | 3/2019 | Korytov et al. |
| 10,238,472 B2 | 3/2019 | Levin |
| 10,248,883 B2 | 4/2019 | Borovinskih et al. |
| 10,258,432 B2 | 4/2019 | Webber |
| 10,275,862 B2 | 4/2019 | Levin |
| 10,390,913 B2 | 8/2019 | Sabina et al. |
| 10,413,385 B2 | 9/2019 | Sherwood et al. |
| 10,421,152 B2 | 9/2019 | Culp |
| 10,449,016 B2 | 10/2019 | Kimura et al. |
| 10,470,847 B2 | 11/2019 | Shanjani et al. |
| 10,504,386 B2 | 12/2019 | Levin et al. |
| 10,517,482 B2 | 12/2019 | Sato et al. |
| 10,528,636 B2 | 1/2020 | Elbaz et al. |
| 10,537,405 B2 | 1/2020 | Choi et al. |
| 10,543,064 B2 | 1/2020 | Kuo |
| 10,548,700 B2 | 2/2020 | Fernie |
| 10,561,476 B2 | 2/2020 | Matov et al. |
| 10,585,958 B2 | 3/2020 | Elbaz et al. |
| 10,595,965 B2 | 3/2020 | Khardekar et al. |
| 10,595,966 B2 | 3/2020 | Carrier et al. |
| 10,606,911 B2 | 3/2020 | Elbaz et al. |
| 10,610,332 B2 | 4/2020 | Wu et al. |
| 10,613,515 B2 | 4/2020 | Cramer et al. |
| 10,639,134 B2 | 5/2020 | Shanjani et al. |
| 10,653,502 B2 | 5/2020 | Kuo |
| 2001/0002310 A1 | 5/2001 | Chishti et al. |
| 2001/0032100 A1 | 10/2001 | Mahmud et al. |
| 2001/0038705 A1 | 11/2001 | Rubbert et al. |
| 2001/0041320 A1 | 11/2001 | Phan et al. |
| 2002/0004727 A1 | 1/2002 | Knaus et al. |
| 2002/0007284 A1 | 1/2002 | Schurenberg et al. |
| 2002/0010568 A1 | 1/2002 | Rubbert et al. |
| 2002/0015934 A1 | 2/2002 | Rubbert et al. |
| 2002/0025503 A1 | 2/2002 | Chapoulaud et al. |
| 2002/0026105 A1 | 2/2002 | Drazen |
| 2002/0028417 A1 | 3/2002 | Chapoulaud et al. |
| 2002/0035572 A1 | 3/2002 | Takatori et al. |
| 2002/0064752 A1 | 5/2002 | Durbin et al. |
| 2002/0064759 A1 | 5/2002 | Durbin et al. |
| 2002/0087551 A1 | 7/2002 | Hickey et al. |
| 2002/0107853 A1 | 8/2002 | Hofmann et al. |
| 2002/0188478 A1 | 12/2002 | Breeland et al. |
| 2002/0192617 A1 | 12/2002 | Phan et al. |
| 2003/0000927 A1 | 1/2003 | Kanaya et al. |
| 2003/0008259 A1 | 1/2003 | Kuo et al. |
| 2003/0009252 A1 | 1/2003 | Pavlovskaia et al. |
| 2003/0019848 A1 | 1/2003 | Nicholas et al. |
| 2003/0021453 A1 | 1/2003 | Weise et al. |
| 2003/0035061 A1 | 2/2003 | Iwaki et al. |
| 2003/0049581 A1 | 3/2003 | Deluke |
| 2003/0057192 A1 | 3/2003 | Patel |
| 2003/0059736 A1 | 3/2003 | Lai et al. |
| 2003/0060532 A1 | 3/2003 | Subelka et al. |
| 2003/0068598 A1 | 4/2003 | Vallittu et al. |
| 2003/0095697 A1 | 5/2003 | Wood et al. |
| 2003/0101079 A1 | 5/2003 | McLaughlin |
| 2003/0103060 A1 | 6/2003 | Anderson et al. |
| 2003/0120517 A1 | 6/2003 | Eida et al. |
| 2003/0139834 A1 | 7/2003 | Nikolskiy et al. |
| 2003/0144886 A1 | 7/2003 | Taira |
| 2003/0172043 A1 | 9/2003 | Guyon et al. |
| 2003/0190575 A1 | 10/2003 | Hilliard |
| 2003/0192867 A1 | 10/2003 | Yamazaki et al. |
| 2003/0207224 A1 | 11/2003 | Lotte |
| 2003/0215764 A1 | 11/2003 | Kopelman et al. |
| 2003/0224311 A1 | 12/2003 | Cronauer |
| 2003/0224313 A1 | 12/2003 | Bergersen |
| 2003/0224314 A1 | 12/2003 | Bergersen |
| 2004/0002873 A1 | 1/2004 | Sachdeva |
| 2004/0009449 A1 | 1/2004 | Mah et al. |
| 2004/0013994 A1 | 1/2004 | Goldberg et al. |
| 2004/0019262 A1 | 1/2004 | Perelgut |
| 2004/0029078 A1 | 2/2004 | Marshall |
| 2004/0038168 A1 | 2/2004 | Choi et al. |
| 2004/0054304 A1 | 3/2004 | Raby |
| 2004/0054358 A1 | 3/2004 | Cox et al. |
| 2004/0058295 A1 | 3/2004 | Bergersen |
| 2004/0068199 A1 | 4/2004 | Echauz et al. |
| 2004/0078222 A1 | 4/2004 | Khan et al. |
| 2004/0080621 A1 | 4/2004 | Fisher et al. |
| 2004/0094165 A1 | 5/2004 | Cook |
| 2004/0107118 A1 | 6/2004 | Harnsberger et al. |
| 2004/0133083 A1 | 7/2004 | Comaniciu et al. |
| 2004/0152036 A1 | 8/2004 | Abolfathi |
| 2004/0158194 A1 | 8/2004 | Wolff et al. |
| 2004/0166463 A1 | 8/2004 | Wen et al. |
| 2004/0167646 A1 | 8/2004 | Jelonek et al. |
| 2004/0170941 A1 | 9/2004 | Phan et al. |
| 2004/0193036 A1 | 9/2004 | Zhou et al. |
| 2004/0197728 A1 | 10/2004 | Abolfathi et al. |
| 2004/0214128 A1 | 10/2004 | Sachdeva et al. |
| 2004/0219479 A1 | 11/2004 | Malin et al. |
| 2004/0220691 A1 | 11/2004 | Hofmeister et al. |
| 2004/0229185 A1 | 11/2004 | Knopp |
| 2004/0259049 A1 | 12/2004 | Kopelman et al. |
| 2005/0003318 A1 | 1/2005 | Choi et al. |
| 2005/0023356 A1 | 2/2005 | Wiklof et al. |
| 2005/0031196 A1 | 2/2005 | Moghaddam et al. |
| 2005/0037312 A1 | 2/2005 | Uchida |
| 2005/0038669 A1 | 2/2005 | Sachdeva et al. |
| 2005/0040551 A1 | 2/2005 | Biegler et al. |
| 2005/0042569 A1 | 2/2005 | Plan et al. |
| 2005/0042577 A1 | 2/2005 | Kvitrud et al. |
| 2005/0048433 A1 | 3/2005 | Hilliard |
| 2005/0074717 A1 | 4/2005 | Cleary et al. |
| 2005/0089822 A1 | 4/2005 | Geng |
| 2005/0100333 A1 | 5/2005 | Kerschbaumer et al. |
| 2005/0108052 A1 | 5/2005 | Omaboe |

(56) References Cited

U.S. PATENT DOCUMENTS

| | | |
|---|---|---|
| 2005/0131738 A1 | 6/2005 | Morris |
| 2005/0144150 A1 | 6/2005 | Ramamurthy et al. |
| 2005/0171594 A1 | 8/2005 | Machan et al. |
| 2005/0171630 A1 | 8/2005 | Dinauer et al. |
| 2005/0181333 A1 | 8/2005 | Karazivan et al. |
| 2005/0186524 A1 | 8/2005 | Abolfathi et al. |
| 2005/0186526 A1 | 8/2005 | Stewart et al. |
| 2005/0216314 A1 | 9/2005 | Secor |
| 2005/0233276 A1 | 10/2005 | Kopelman et al. |
| 2005/0239013 A1 | 10/2005 | Sachdeva |
| 2005/0244781 A1 | 11/2005 | Abels et al. |
| 2005/0244791 A1 | 11/2005 | Davis et al. |
| 2005/0271996 A1 | 12/2005 | Sporbert et al. |
| 2006/0040235 A1 | 2/2006 | Davis |
| 2006/0056670 A1 | 3/2006 | Hamadeh |
| 2006/0057533 A1 | 3/2006 | McGann |
| 2006/0063135 A1 | 3/2006 | Mehl |
| 2006/0078842 A1 | 4/2006 | Sachdeva et al. |
| 2006/0084024 A1 | 4/2006 | Farrell |
| 2006/0093982 A1 | 5/2006 | Wen |
| 2006/0093984 A1 | 5/2006 | Rosenberg |
| 2006/0098007 A1 | 5/2006 | Rouet et al. |
| 2006/0099545 A1 | 5/2006 | Lia et al. |
| 2006/0099546 A1 | 5/2006 | Bergersen |
| 2006/0110698 A1 | 5/2006 | Robson |
| 2006/0111631 A1 | 5/2006 | Kelliher et al. |
| 2006/0115782 A1 | 6/2006 | Li et al. |
| 2006/0115785 A1 | 6/2006 | Li et al. |
| 2006/0137813 A1 | 6/2006 | Robrecht et al. |
| 2006/0147872 A1 | 7/2006 | Andreiko |
| 2006/0154198 A1 | 7/2006 | Durbin et al. |
| 2006/0154207 A1 | 7/2006 | Kuo |
| 2006/0173715 A1 | 8/2006 | Wang |
| 2006/0183082 A1 | 8/2006 | Quadling et al. |
| 2006/0188834 A1 | 8/2006 | Hilliard |
| 2006/0188848 A1 | 8/2006 | Tricca et al. |
| 2006/0194163 A1 | 8/2006 | Tricca et al. |
| 2006/0199153 A1 | 9/2006 | Liu et al. |
| 2006/0204078 A1 | 9/2006 | Orth et al. |
| 2006/0223022 A1 | 10/2006 | Solomon |
| 2006/0223023 A1 | 10/2006 | Lai et al. |
| 2006/0223032 A1 | 10/2006 | Fried et al. |
| 2006/0223342 A1 | 10/2006 | Borst et al. |
| 2006/0234179 A1 | 10/2006 | Wen et al. |
| 2006/0257815 A1 | 11/2006 | De Dominicis |
| 2006/0275729 A1 | 12/2006 | Fornoff |
| 2006/0275731 A1 | 12/2006 | Wen et al. |
| 2006/0275736 A1 | 12/2006 | Wen et al. |
| 2006/0277075 A1 | 12/2006 | Salwan |
| 2006/0290693 A1 | 12/2006 | Zhou et al. |
| 2006/0292520 A1 | 12/2006 | Dillon et al. |
| 2007/0031775 A1 | 2/2007 | Andreiko |
| 2007/0046865 A1 | 3/2007 | Umeda et al. |
| 2007/0053048 A1 | 3/2007 | Kumar et al. |
| 2007/0054237 A1 | 3/2007 | Neuschafer |
| 2007/0065768 A1 | 3/2007 | Nadav |
| 2007/0087300 A1 | 4/2007 | Willison et al. |
| 2007/0087302 A1 | 4/2007 | Reising et al. |
| 2007/0106138 A1 | 5/2007 | Beiski et al. |
| 2007/0122592 A1 | 5/2007 | Anderson et al. |
| 2007/0141525 A1 | 6/2007 | Cinader, Jr. |
| 2007/0141526 A1 | 6/2007 | Eisenberg et al. |
| 2007/0143135 A1 | 6/2007 | Lindquist et al. |
| 2007/0172112 A1 | 7/2007 | Paley et al. |
| 2007/0172291 A1 | 7/2007 | Yokoyama |
| 2007/0178420 A1 | 8/2007 | Keski-Nisula et al. |
| 2007/0183633 A1 | 8/2007 | Hoffmann |
| 2007/0184402 A1 | 8/2007 | Boutoussov et al. |
| 2007/0185732 A1 | 8/2007 | Hicks et al. |
| 2007/0190476 A1 | 8/2007 | Dellinger |
| 2007/0192137 A1 | 8/2007 | Ombrellaro |
| 2007/0199929 A1 | 8/2007 | Rippl et al. |
| 2007/0215582 A1 | 9/2007 | Roeper et al. |
| 2007/0218422 A1 | 9/2007 | Ehrenfeld |
| 2007/0231765 A1 | 10/2007 | Phan et al. |
| 2007/0238065 A1 | 10/2007 | Sherwood et al. |
| 2007/0239488 A1 | 10/2007 | DeRosso |
| 2007/0263226 A1 | 11/2007 | Kurtz et al. |
| 2008/0013727 A1 | 1/2008 | Uemura |
| 2008/0020350 A1 | 1/2008 | Matov et al. |
| 2008/0045053 A1 | 2/2008 | Stadler et al. |
| 2008/0057461 A1 | 3/2008 | Cheng et al. |
| 2008/0057467 A1 | 3/2008 | Gittelson |
| 2008/0057479 A1 | 3/2008 | Grenness |
| 2008/0059238 A1 | 3/2008 | Park et al. |
| 2008/0062429 A1 | 3/2008 | Liang et al. |
| 2008/0090208 A1 | 4/2008 | Rubbert |
| 2008/0094389 A1 | 4/2008 | Rouet et al. |
| 2008/0113317 A1 | 5/2008 | Kemp et al. |
| 2008/0115791 A1 | 5/2008 | Heine |
| 2008/0118882 A1 | 5/2008 | Su |
| 2008/0118886 A1 | 5/2008 | Liang et al. |
| 2008/0141534 A1 | 6/2008 | Hilliard |
| 2008/0169122 A1 | 7/2008 | Shiraishi et al. |
| 2008/0171934 A1 | 7/2008 | Greenan et al. |
| 2008/0176448 A1 | 7/2008 | Muller et al. |
| 2008/0233530 A1 | 9/2008 | Cinader |
| 2008/0242144 A1 | 10/2008 | Dietz |
| 2008/0248443 A1 | 10/2008 | Chishti et al. |
| 2008/0254403 A1 | 10/2008 | Hilliard |
| 2008/0268400 A1 | 10/2008 | Moss et al. |
| 2008/0306724 A1 | 12/2008 | Kitching et al. |
| 2009/0029310 A1 | 1/2009 | Pumphrey et al. |
| 2009/0030290 A1 | 1/2009 | Kozuch et al. |
| 2009/0030347 A1 | 1/2009 | Cao |
| 2009/0040740 A1 | 2/2009 | Muller et al. |
| 2009/0061379 A1 | 3/2009 | Yamamoto et al. |
| 2009/0061381 A1 | 3/2009 | Durbin et al. |
| 2009/0075228 A1 | 3/2009 | Kumada et al. |
| 2009/0087050 A1 | 4/2009 | Gandyra |
| 2009/0098502 A1 | 4/2009 | Andreiko |
| 2009/0099445 A1 | 4/2009 | Burger |
| 2009/0103579 A1 | 4/2009 | Ushimaru et al. |
| 2009/0105523 A1 | 4/2009 | Kassayan et al. |
| 2009/0130620 A1 | 5/2009 | Yazdi et al. |
| 2009/0136890 A1 | 5/2009 | Kang et al. |
| 2009/0136893 A1 | 5/2009 | Zegarelli |
| 2009/0148809 A1 | 6/2009 | Kuo et al. |
| 2009/0170050 A1 | 7/2009 | Marcus |
| 2009/0181346 A1 | 7/2009 | Orth |
| 2009/0191502 A1 | 7/2009 | Cao et al. |
| 2009/0210032 A1 | 8/2009 | Beiski et al. |
| 2009/0218514 A1 | 9/2009 | Klunder et al. |
| 2009/0220920 A1* | 9/2009 | Primus .............. A61C 7/16 433/226 |
| 2009/0281433 A1 | 11/2009 | Saadat et al. |
| 2009/0286195 A1 | 11/2009 | Sears et al. |
| 2009/0298017 A1 | 12/2009 | Boerjes et al. |
| 2009/0305540 A1 | 12/2009 | Stadler et al. |
| 2009/0316966 A1 | 12/2009 | Marshall et al. |
| 2009/0317757 A1 | 12/2009 | Lemchen |
| 2010/0015565 A1 | 1/2010 | Carrillo Gonzalez et al. |
| 2010/0019170 A1 | 1/2010 | Hart et al. |
| 2010/0028825 A1 | 2/2010 | Lemchen |
| 2010/0045902 A1 | 2/2010 | Ikeda et al. |
| 2010/0062394 A1 | 3/2010 | Jones et al. |
| 2010/0068676 A1 | 3/2010 | Mason et al. |
| 2010/0138025 A1 | 6/2010 | Morton et al. |
| 2010/0142789 A1 | 6/2010 | Chang et al. |
| 2010/0145664 A1 | 6/2010 | Hultgren et al. |
| 2010/0145898 A1 | 6/2010 | Malfliet et al. |
| 2010/0152599 A1 | 6/2010 | DuHamel et al. |
| 2010/0165275 A1 | 7/2010 | Tsukamoto et al. |
| 2010/0167225 A1 | 7/2010 | Kuo |
| 2010/0179789 A1 | 7/2010 | Sachdeva et al. |
| 2010/0193482 A1 | 8/2010 | Ow et al. |
| 2010/0196837 A1 | 8/2010 | Farrell |
| 2010/0216083 A1* | 8/2010 | Grobbee ............. A61C 7/146 433/3 |
| 2010/0216085 A1 | 8/2010 | Kopelman |
| 2010/0217130 A1 | 8/2010 | Weinlaender |
| 2010/0231577 A1 | 9/2010 | Kim et al. |
| 2010/0268363 A1 | 10/2010 | Karim et al. |
| 2010/0268515 A1 | 10/2010 | Vogt et al. |

(56) References Cited

U.S. PATENT DOCUMENTS

| | | |
|---|---|---|
| 2010/0279243 A1 | 11/2010 | Cinader et al. |
| 2010/0280798 A1 | 11/2010 | Pattijn |
| 2010/0281370 A1 | 11/2010 | Rohaly et al. |
| 2010/0303316 A1 | 12/2010 | Bullis et al. |
| 2010/0312484 A1 | 12/2010 | DuHamel et al. |
| 2010/0327461 A1 | 12/2010 | Co et al. |
| 2011/0007920 A1 | 1/2011 | Abolfathi et al. |
| 2011/0012901 A1 | 1/2011 | Kaplanyan |
| 2011/0056350 A1 | 3/2011 | Gale et al. |
| 2011/0065060 A1 | 3/2011 | Teixeira et al. |
| 2011/0081625 A1 | 4/2011 | Fuh |
| 2011/0091832 A1* | 4/2011 | Kim ............... A61C 7/146 433/3 |
| 2011/0102549 A1 | 5/2011 | Takahashi |
| 2011/0102566 A1 | 5/2011 | Zakian et al. |
| 2011/0136072 A1 | 6/2011 | Li et al. |
| 2011/0136090 A1 | 6/2011 | Kazemi |
| 2011/0143300 A1 | 6/2011 | Villaalba |
| 2011/0143673 A1 | 6/2011 | Landesman et al. |
| 2011/0159452 A1 | 6/2011 | Huang |
| 2011/0164810 A1 | 7/2011 | Zang et al. |
| 2011/0207072 A1 | 8/2011 | Schiemann |
| 2011/0212420 A1 | 9/2011 | Vuillemot |
| 2011/0220623 A1 | 9/2011 | Beutler |
| 2011/0235045 A1 | 9/2011 | Koerner et al. |
| 2011/0269092 A1 | 11/2011 | Kuo et al. |
| 2011/0316994 A1 | 12/2011 | Lemchen |
| 2012/0028210 A1 | 2/2012 | Hegyi et al. |
| 2012/0029883 A1 | 2/2012 | Heinz et al. |
| 2012/0040311 A1 | 2/2012 | Nilsson |
| 2012/0064477 A1 | 3/2012 | Schmitt |
| 2012/0081786 A1 | 4/2012 | Mizuyama et al. |
| 2012/0086681 A1 | 4/2012 | Kim et al. |
| 2012/0115107 A1 | 5/2012 | Adams |
| 2012/0129117 A1 | 5/2012 | McCance |
| 2012/0147912 A1 | 6/2012 | Moench et al. |
| 2012/0150494 A1 | 6/2012 | Anderson et al. |
| 2012/0166213 A1 | 6/2012 | Arnone et al. |
| 2012/0172678 A1 | 7/2012 | Logan et al. |
| 2012/0281293 A1 | 11/2012 | Gronenborn et al. |
| 2012/0295216 A1 | 11/2012 | Dykes et al. |
| 2012/0322025 A1 | 12/2012 | Ozawa et al. |
| 2013/0029284 A1 | 1/2013 | Teasdale |
| 2013/0081271 A1 | 4/2013 | Farzin-Nia et al. |
| 2013/0081272 A1 | 4/2013 | Johnson et al. |
| 2013/0089828 A1 | 4/2013 | Borovinskih et al. |
| 2013/0095446 A1 | 4/2013 | Andreiko et al. |
| 2013/0103176 A1 | 4/2013 | Kopelman et al. |
| 2013/0110469 A1 | 5/2013 | Kopelman |
| 2013/0150689 A1 | 6/2013 | Shaw-Klein |
| 2013/0163627 A1 | 6/2013 | Seurin et al. |
| 2013/0201488 A1 | 8/2013 | Ishihara |
| 2013/0204599 A1 | 8/2013 | Matov et al. |
| 2013/0209952 A1 | 8/2013 | Kuo et al. |
| 2013/0235165 A1 | 9/2013 | Gharib et al. |
| 2013/0252195 A1 | 9/2013 | Popat |
| 2013/0266326 A1 | 10/2013 | Joseph et al. |
| 2013/0278396 A1 | 10/2013 | Kimmel |
| 2013/0280671 A1 | 10/2013 | Brawn et al. |
| 2013/0286174 A1 | 10/2013 | Urakabe |
| 2013/0293824 A1 | 11/2013 | Yoneyama et al. |
| 2013/0323664 A1 | 12/2013 | Parker |
| 2013/0323671 A1 | 12/2013 | Dillon et al. |
| 2013/0323674 A1 | 12/2013 | Hakomori et al. |
| 2013/0325431 A1 | 12/2013 | See et al. |
| 2013/0337412 A1 | 12/2013 | Kwon |
| 2014/0051039 A1 | 2/2014 | Jensen |
| 2014/0061974 A1 | 3/2014 | Tyler |
| 2014/0081091 A1 | 3/2014 | Abolfathi et al. |
| 2014/0093160 A1 | 4/2014 | Porikli et al. |
| 2014/0106289 A1 | 4/2014 | Kozlowski |
| 2014/0122027 A1 | 5/2014 | Andreiko et al. |
| 2014/0136222 A1 | 5/2014 | Arnone et al. |
| 2014/0142902 A1 | 5/2014 | Chelnokov et al. |
| 2014/0178829 A1 | 6/2014 | Kim |
| 2014/0178830 A1 | 6/2014 | Widu |
| 2014/0186794 A1 | 7/2014 | Deichmann et al. |
| 2014/0265034 A1 | 9/2014 | Dudley |
| 2014/0272774 A1 | 9/2014 | Dillon et al. |
| 2014/0280376 A1 | 9/2014 | Kuo |
| 2014/0294273 A1 | 10/2014 | Jaisson |
| 2014/0313299 A1 | 10/2014 | Gebhardt et al. |
| 2014/0329194 A1 | 11/2014 | Sachdeva et al. |
| 2014/0342301 A1 | 11/2014 | Fleer et al. |
| 2014/0350354 A1 | 11/2014 | Stenzler et al. |
| 2014/0363778 A1 | 12/2014 | Parker |
| 2015/0002649 A1 | 1/2015 | Nowak et al. |
| 2015/0004553 A1 | 1/2015 | Li et al. |
| 2015/0021210 A1 | 1/2015 | Kesling |
| 2015/0079531 A1 | 3/2015 | Heine |
| 2015/0094564 A1 | 4/2015 | Tashman et al. |
| 2015/0097315 A1 | 4/2015 | DeSimone et al. |
| 2015/0097316 A1 | 4/2015 | DeSimone et al. |
| 2015/0102532 A1 | 4/2015 | DeSimone et al. |
| 2015/0140502 A1 | 5/2015 | Brawn et al. |
| 2015/0150501 A1 | 6/2015 | George et al. |
| 2015/0164335 A1 | 6/2015 | Van Der Poel et al. |
| 2015/0173856 A1 | 6/2015 | Iowe et al. |
| 2015/0182303 A1 | 7/2015 | Abraham et al. |
| 2015/0216626 A1 | 8/2015 | Ranjbar |
| 2015/0216716 A1 | 8/2015 | Anitua |
| 2015/0230885 A1 | 8/2015 | Wucher |
| 2015/0238280 A1 | 8/2015 | Wu et al. |
| 2015/0238283 A1 | 8/2015 | Tanugula et al. |
| 2015/0306486 A1 | 10/2015 | Logan et al. |
| 2015/0320320 A1 | 11/2015 | Kopelman et al. |
| 2015/0320532 A1 | 11/2015 | Matty et al. |
| 2015/0325044 A1 | 11/2015 | Lebovitz |
| 2015/0338209 A1 | 11/2015 | Knüttel |
| 2015/0338844 A1* | 11/2015 | Matty ............... G05B 19/4097 700/197 |
| 2015/0351638 A1 | 12/2015 | Amato |
| 2015/0374469 A1 | 12/2015 | Konno et al. |
| 2016/0000332 A1 | 1/2016 | Atiya et al. |
| 2016/0003610 A1 | 1/2016 | Lampert et al. |
| 2016/0022185 A1 | 1/2016 | Agarwal et al. |
| 2016/0042509 A1 | 2/2016 | Andreiko et al. |
| 2016/0051345 A1 | 2/2016 | Levin |
| 2016/0064898 A1 | 3/2016 | Atiya et al. |
| 2016/0067013 A1 | 3/2016 | Morton et al. |
| 2016/0095668 A1 | 4/2016 | Kuo et al. |
| 2016/0100924 A1 | 4/2016 | Wilson et al. |
| 2016/0106520 A1 | 4/2016 | Borovinskih et al. |
| 2016/0135924 A1 | 5/2016 | Choi et al. |
| 2016/0135925 A1 | 5/2016 | Mason et al. |
| 2016/0163115 A1 | 6/2016 | Furst |
| 2016/0220105 A1 | 8/2016 | Durent |
| 2016/0220200 A1 | 8/2016 | Sandholm et al. |
| 2016/0225151 A1 | 8/2016 | Cocco et al. |
| 2016/0228213 A1 | 8/2016 | Tod et al. |
| 2016/0242871 A1 | 8/2016 | Morton et al. |
| 2016/0246936 A1 | 8/2016 | Kahn |
| 2016/0287358 A1 | 10/2016 | Nowak et al. |
| 2016/0296303 A1 | 10/2016 | Parker |
| 2016/0302885 A1 | 10/2016 | Matov et al. |
| 2016/0318247 A1 | 11/2016 | Schlachter |
| 2016/0328843 A1 | 11/2016 | Graham et al. |
| 2016/0346063 A1 | 12/2016 | Schulhof et al. |
| 2016/0346064 A1 | 12/2016 | Schulhof et al. |
| 2016/0367188 A1 | 12/2016 | Malik et al. |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0020633 A1 | 1/2017 | Stone-Collonge et al. |
| 2017/0049326 A1 | 2/2017 | Alfano et al. |
| 2017/0056131 A1 | 3/2017 | Alauddin et al. |
| 2017/0086943 A1 | 3/2017 | Mah |
| 2017/0100209 A1 | 4/2017 | Wen |
| 2017/0100213 A1 | 4/2017 | Kuo |
| 2017/0100214 A1 | 4/2017 | Wen |
| 2017/0135792 A1 | 5/2017 | Webber |
| 2017/0135793 A1 | 5/2017 | Webber et al. |

(56) References Cited

U.S. PATENT DOCUMENTS

| | | |
|---|---|---|
| 2017/0158803 A1 | 6/2017 | Amin et al. |
| 2017/0165032 A1 | 6/2017 | Webber et al. |
| 2017/0215739 A1 | 8/2017 | Miyasato |
| 2017/0265970 A1 | 9/2017 | Verker |
| 2017/0319054 A1 | 11/2017 | Miller et al. |
| 2017/0319296 A1* | 11/2017 | Webber .................. A61C 7/146 |
| 2017/0325690 A1 | 11/2017 | Salah et al. |
| 2018/0000565 A1 | 1/2018 | Shanjani et al. |
| 2018/0028064 A1 | 2/2018 | Elbaz et al. |
| 2018/0071055 A1 | 3/2018 | Kuo |
| 2018/0153648 A1 | 6/2018 | Shanjani et al. |
| 2018/0153649 A1 | 6/2018 | Wu et al. |
| 2018/0153733 A1 | 6/2018 | Kuo |
| 2018/0161126 A1* | 6/2018 | Marshall ................. A61C 7/002 |
| 2018/0192877 A1 | 7/2018 | Atiya et al. |
| 2018/0228359 A1 | 8/2018 | Meyer et al. |
| 2018/0280118 A1 | 10/2018 | Cramer |
| 2018/0303583 A1* | 10/2018 | Tong ....................... A61C 7/146 |
| 2018/0318043 A1 | 11/2018 | Li et al. |
| 2018/0344431 A1* | 12/2018 | Kuo ......................... A61C 19/04 |
| 2018/0353264 A1 | 12/2018 | Riley et al. |
| 2018/0360567 A1 | 12/2018 | Xue et al. |
| 2018/0368944 A1 | 12/2018 | Sato et al. |
| 2019/0019187 A1 | 1/2019 | Miller et al. |
| 2019/0021817 A1 | 1/2019 | Sato et al. |
| 2019/0029784 A1 | 1/2019 | Moalem et al. |
| 2019/0046296 A1 | 2/2019 | Kopelman et al. |
| 2019/0046297 A1 | 2/2019 | Kopelman et al. |
| 2019/0069975 A1 | 3/2019 | Cam et al. |
| 2019/0076214 A1 | 3/2019 | Nyukhtikov et al. |
| 2019/0076216 A1 | 3/2019 | Moss et al. |
| 2019/0090983 A1 | 3/2019 | Webber et al. |
| 2019/0099129 A1 | 4/2019 | Kopelman et al. |
| 2019/0105130 A1 | 4/2019 | Grove et al. |
| 2019/0125494 A1 | 5/2019 | Li et al. |
| 2019/0142551 A1* | 5/2019 | Dickenson ............. B33Y 50/00 433/3 |
| 2019/0152152 A1 | 5/2019 | O'Leary et al. |
| 2019/0171618 A1 | 6/2019 | Kuo |
| 2019/0175303 A1 | 6/2019 | Akopov et al. |
| 2019/0175304 A1 | 6/2019 | Morton et al. |
| 2019/0192259 A1 | 6/2019 | Kopleman et al. |
| 2019/0223993 A1 | 7/2019 | Mason et al. |
| 2019/0231477 A1 | 8/2019 | Shanjani et al. |
| 2019/0231491 A1 | 8/2019 | Sabina et al. |
| 2019/0231492 A1 | 8/2019 | Sabina et al. |
| 2019/0239983 A1* | 8/2019 | Matty ....................... A61C 7/08 |
| 2019/0240771 A1 | 8/2019 | Culp |
| 2019/0244694 A1 | 8/2019 | Amone et al. |
| 2019/0254780 A1 | 8/2019 | Brandt et al. |
| 2019/0269482 A1 | 9/2019 | Shanjani et al. |

FOREIGN PATENT DOCUMENTS

| | | |
|---|---|---|
| CA | 1121955 A1 | 4/1982 |
| CN | 1655732 A | 8/2005 |
| CN | 1655733 A | 8/2005 |
| CN | 1663540 A | 9/2005 |
| CN | 1867317 A | 11/2006 |
| CN | 101991465 A | 3/2011 |
| CN | 102017658 A | 4/2011 |
| CN | 103889364 A | 6/2014 |
| CN | 104254297 A | 12/2014 |
| CN | 204092220 U | 1/2015 |
| CN | 105496575 A | 4/2016 |
| CN | 105997274 A | 10/2016 |
| DE | 2749802 A1 | 5/1978 |
| DE | 3526198 A1 | 2/1986 |
| DE | 4207169 A1 | 9/1993 |
| DE | 69327661 T2 | 7/2000 |
| DE | 102005043627 A1 | 3/2007 |
| DE | 202010017014 U1 | 3/2011 |
| DE | 102011051443 A1 | 1/2013 |
| DE | 202012011899 U1 | 1/2013 |
| DE | 102014106151 A1 | 11/2014 |
| DE | 102014225457 A1 | 6/2016 |
| EP | 0428152 A1 | 5/1991 |
| EP | 490848 A2 | 6/1992 |
| EP | 541500 A1 | 5/1993 |
| EP | 714632 B1 | 5/1997 |
| EP | 774933 B1 | 12/2000 |
| EP | 731673 B1 | 5/2001 |
| EP | 1941843 A2 | 7/2008 |
| EP | 2437027 A2 | 4/2012 |
| EP | 2447754 A1 | 5/2012 |
| EP | 1989764 B1 | 7/2012 |
| EP | 2332221 B1 | 11/2012 |
| EP | 2596553 B1 | 12/2013 |
| EP | 2612300 B1 | 2/2015 |
| EP | 2848229 A1 | 3/2015 |
| ES | 463897 A1 | 1/1980 |
| ES | 2455066 A1 | 4/2014 |
| FR | 2369828 A1 | 6/1978 |
| FR | 2867377 A1 | 9/2005 |
| FR | 2930334 A1 | 10/2009 |
| GB | 1550777 A | 8/1979 |
| JP | 53-058191 A | 5/1978 |
| JP | 04-028359 A | 1/1992 |
| JP | H0919443 A | 1/1997 |
| JP | 2000339468 A | 12/2000 |
| JP | 2003245289 A | 9/2003 |
| JP | 2005527320 A | 9/2005 |
| JP | 2005527321 A | 9/2005 |
| JP | 2006043121 A | 2/2006 |
| JP | 2007151614 A | 6/2007 |
| JP | 2007260158 A | 10/2007 |
| JP | 2007537824 A | 12/2007 |
| JP | 2008067732 A | 3/2008 |
| JP | 2008523370 A | 7/2008 |
| JP | 4184427 B1 | 11/2008 |
| JP | 2009000412 A | 1/2009 |
| JP | 2009018173 A | 1/2009 |
| JP | 2009078133 A | 4/2009 |
| JP | 2009101386 A | 5/2009 |
| JP | 2009205330 A | 9/2009 |
| JP | 2010017726 A | 1/2010 |
| JP | 2011087733 A | 5/2011 |
| JP | 2012045143 A | 3/2012 |
| JP | 2013007645 A | 1/2013 |
| JP | 2013192865 A | 9/2013 |
| JP | 201735173 A | 2/2017 |
| KR | 10-20020062793 A | 7/2002 |
| KR | 10-20090065778 A | 6/2009 |
| KR | 10-1266966 B1 | 5/2013 |
| KR | 10-2016-041632 A | 4/2016 |
| KR | 10-2016-0071127 A | 6/2016 |
| KR | 10-1675089 B1 | 11/2016 |
| TW | 480166 B | 3/2002 |
| WO | WO91/004713 A1 | 4/1991 |
| WO | WO92/03102 A1 | 3/1992 |
| WO | WO94/010935 A1 | 5/1994 |
| WO | WO96/23452 A1 | 8/1996 |
| WO | WO98/032394 A1 | 7/1998 |
| WO | WO98/044865 A1 | 10/1998 |
| WO | WO01/08592 A1 | 2/2001 |
| WO | WO01/85047 A2 | 11/2001 |
| WO | WO02/017776 A2 | 3/2002 |
| WO | 02058583 A1 | 8/2002 |
| WO | WO02/062252 A1 | 8/2002 |
| WO | WO02/095475 A1 | 11/2002 |
| WO | WO03/003932 A2 | 1/2003 |
| WO | 2005114183 A1 | 12/2005 |
| WO | WO2006/096558 A2 | 9/2006 |
| WO | WO2006/100700 A1 | 9/2006 |
| WO | WO2006/133548 A1 | 12/2006 |
| WO | WO2007/019709 A2 | 2/2007 |
| WO | WO2007/071341 A1 | 6/2007 |
| WO | WO2007/103377 A2 | 9/2007 |
| WO | WO2008/115654 A1 | 9/2008 |
| WO | WO2009/016645 A2 | 2/2009 |
| WO | WO2009/085752 A2 | 7/2009 |
| WO | WO2009/089129 A1 | 7/2009 |
| WO | WO2009/146788 A1 | 12/2009 |

(56) References Cited

FOREIGN PATENT DOCUMENTS

| | | |
|---|---|---|
| WO | WO2009/146789 A1 | 12/2009 |
| WO | WO2010/059988 A1 | 5/2010 |
| WO | WO2010/123892 A2 | 10/2010 |
| WO | WO2012/007003 A1 | 1/2012 |
| WO | WO2012/064684 A2 | 5/2012 |
| WO | WO2012/074304 A2 | 6/2012 |
| WO | WO2012/078980 A2 | 6/2012 |
| WO | WO2012/083968 A1 | 6/2012 |
| WO | WO2012/140021 A2 | 10/2012 |
| WO | WO2013/058879 A2 | 4/2013 |
| WO | WO2014/068107 A1 | 5/2014 |
| WO | WO2014/091865 A1 | 6/2014 |
| WO | 2014143911 A1 | 9/2014 |
| WO | WO2015/015289 A2 | 2/2015 |
| WO | WO2015/063032 A1 | 5/2015 |
| WO | WO2015/112638 A1 | 7/2015 |
| WO | WO2015/176004 A1 | 11/2015 |
| WO | WO2016/004415 A1 | 1/2016 |
| WO | WO2016/042393 A1 | 3/2016 |
| WO | WO2016/061279 A1 | 4/2016 |
| WO | WO2016/084066 A1 | 6/2016 |
| WO | WO2016/099471 A1 | 6/2016 |
| WO | WO2016/113745 A1 | 7/2016 |
| WO | WO2016/116874 A1 | 7/2016 |
| WO | WO2016/200177 A1 | 12/2016 |
| WO | WO2017/006176 A1 | 1/2017 |
| WO | WO2018/057547 A1 | 3/2018 |
| WO | WO2018/232113 A1 | 12/2018 |

OTHER PUBLICATIONS

Dental Monitoring, "Basics: How to put your Cheek Retractor? (Dental Monitoring Tutorial)", https://www.youtube.com/watch?v=6K1HXw4Kq3c, May 27, 2016.
Dental Monitoring, Dental monitoring tutdrial, 1 page (Screenshot), retrieved from the internet (https:www.youtube.com/watch?v=Dbe3ud0f9_c), Mar. 18, 2015.
Eclinger Selfie, Change your smile, 1 page (screenshot), retrieved from the internet https://play.google.com/store/apps/details?id=parkelict.ecligner), on Feb. 13, 2018.
Lawrence, H.P., "Salivary Markers of Systemic Disease: Noninvasive Diagnosis of Disease and Monitorning of General Health," Journal of the Canadian Dental Association Clinical Parctice, vol. 68, No. 3, Mar. 2002, pp. 170-174.
Nishanian et al., "Oral Fluids as an Alternative to Serum for Measurement of Markers of Immune Activation," Clinical and Diagnostic Laboratory Immunology, Jul. 1998, vol. 5, No. 4, pp. 507-512.
Svec et al.; "Molded rigid monolithic porous polymers: an inexpensive, efficient, and versatile alternative to beads for design of materials for numerous applications", Industrial and Engineering Chemistry Research; Jan. 4, 1999, vol. 38(1 ); pp. 34-48.
U.S. Food and Drug Administration; Color additives; 3 pages; retrieved from the internet https://websrchive.org/web/20070502213911/http://www.cfsan.fda.gov/-dms/col.toc.html; last known as May 2, 2007.
AADR. American Association for Dental Research; Summary of Activities; Los Angeles, CA; p. 195; March 20-23,(year of pub. sufficiently earlier than effective US filing date and any foreign priority date) 1980.
Alcaniz et aL; An Advanced System for the Simulation and Planning of Orthodontic Treatments; Karl Heinz Hohne and Ron Kikinis (eds.); Visualization in Biomedical Computing, 4th Intl. Conf, VBC '96, Hamburg, Germany; Springer-Verlag; pp. 511-520; Sep. 22-25, 1996.
Alexander et al.; The DigiGraph Work Station Part 2 Clinical Management; J. Clin. Orthod.; pp. 402-407; (Author Manuscript); Jul. 1990.
Align Technology; Align technology announces new teen solution with introduction of invisalign teen with mandibular advancement; 2 pages; retrieved from the internet (http://investor.aligntech.com/static-files/eb4fa6bb-3e62-404f-b74d-32059366a01b); Mar. 6, 2017.
Allesee Orthodontic Appliance: Important Tip About Wearing the Red White & Blue Active Clear Retainer System; Allesee Orthodontic Appliances-Pro Lab; 1 page; (year of pub. sufficiently earlier than effective US filing date and any foreign priority date); 1998.
Allesee Orthodontic Appliances: DuraClearTM; Product information; 1 page; (year of pub. sufficiently earlier than effective US filing date and any foreign priority date) 1997.
Allesee Orthodontic Appliances; The Choice Is Clear: Red, White & Blue . . . The Simple, Affordable, No-Braces Treatment; ( product information for doctors); retrieved from the internet (http://ormco.com/aoa/appliancesservices/RWB/doctorhtml); 5 pages on May 19, 2003.
Allesee Orthodontic Appliances; The Choice Is Clear: Red, White & Blue . . . The Simple, Affordable, No-Braces Treatment; (product information), 6 pages; (year of pub. sufficiently earlier than effective US filing date and any foreign priority date) 2003.
Allesee Orthodontic Appliances; The Choice is Clear: Red, White & Blue . . . The Simple, Affordable, No-Braces Treatment;(Patient Information); retrieved from the internet (http://ormco.com/aoa/appliancesservices/RWB/patients.html); 2 pages on May 19, 2003.
Allesee Orthodontic Appliances; The Red, White & Blue Way to Improve Your Smile; (information for patients), 2 pages; (year of pub. sufficiently earlier than effective US filing date and any foreign priority date) 1992.
Allesee Orthodontic Appliances; You may be a candidate for this invisible no-braces treatment; product information for patients; 2 pages; (year of pub. sufficiently earlier than effective US filing date and any foreign priority date) 2002.
Altschuler et al.; Analysis of 3-D Data for Comparative 3-D Serial Growth Pattern Studies of Oral-Facial Structures; AADR Abstracts, Program and Abstracts of Papers, 57th General Session, IADR Annual Session, Mar. 29, 1979—Apr. 1, 1979, New Orleans Marriot; Journal of Dental Research; vol. 58, Special Issue A, p. 221; Jan. 1979.
Altschuler et al.; Laser Electro-Optic System for Rapid Three-Dimensional (3D) Topographic Mapping of Surfaces; Optical Engineering; 20(6); pp. 953-961; Dec. 1981.
Altschuler et al.; Measuring Surfaces Space-Coded by a Laser-Projected Dot Matrix; SPIE Imaging q Applications for Automated Industrial Inspection and Assembly; vol. 182; pp. 187-191; Oct. 10, 1979.
Altschuler; 3D Mapping of Maxillo-Facial Prosthesis; AADR Abstract #607; 2 pages total, (year of pub, sufficiently earlier than effective US filing date and any foreign priority date) 1980.
Andersson et al.; Clinical Results with Titanium Crowns Fabricated with Machine Duplication and Spark Erosion; Acta Odontologica Scandinavica; 47(5); pp. 279-286; Oct. 1989.
Andrews, The Six Keys to Optimal Occlusion Straight Wire, Chapter 3, L.A. Wells; pp. 13-24; (year of pub, sufficiently earlier than effective US filing date and any foreign priority date) 1989.
Bandodkar et al.; Self-healing inks for autonomous repair of printable electrochemical devices; Advanced Electronic Materials; 1(12); 5 pages; 1500289; Dec. 2015.
Barone et al.; Creation of 3D multi-body orthodontic models by using independent imaging sensors; Sensors; 13(2); pp. 2033-2050; Feb. 5, 2013.
Bartels et al.; An Introduction to Splines for Use in Computer Graphics and Geometric Modeling; Morgan Kaufmann Publishers; pp. 422-425 Jan. 1, 1987.
Baumrind et al, "Mapping the Skull in 3-D," reprinted from J. Calif. Dent. Assoc, 48(2), 11 pages; (year of pub. sufficiently earlier than effective US filing date and any foreign priority date) Fall Issue 1972.
Baumrind et al.; A Stereophotogrammetric System for the Detection of Prosthesis Loosening in Total Hip Arthroplasty; NATO Symposium on Applications of Human Biostereometrics; SPIE; vol. 166; pp. 112-123; Jul. 9-13, 1978.
Baumrind; A System for Cranio facial Mapping Through the Integration of Data from Stereo X-Ray Films and Stereo Photographs; an invited paper submitted to the 1975 American Society of Photogram

(56) References Cited

OTHER PUBLICATIONS

Symposium on Close-Range Photogram Systems; University of Illinois; pp. 142-166; Aug. 26-30, 1975.
Baumrind; Integrated Three-Dimensional Craniofacial Mapping: Background, Principles, and Perspectives; Seminars in Orthodontics; 7(4); pp. 223-232; Dec. 2001.
beautyworlds.com; Virtual plastic surgery—beautysurge.com announces launch of cosmetic surgery digital imaging services; 5 pages; retrieved from the internet (http://www.beautyworlds.com/cosmossurgdigitalimagning.htm); Mar. 2004.
Begole et al.; A Computer System for the Analysis of Dental Casts; The Angle Orthodontist; 51(3); pp. 252-258; Jul. 1981.
Berland; The use of smile libraries for cosmetic dentistry; Dental Tribune: Asia Pacific Edition; pp. 16-18; Mar. 29, 2006.
Bernabe et al.; Are the lower incisors the best predictors for the unerupted canine and premolars sums? An analysis of peruvian sample; The Angle Orthodontist; 75(2); pp. 202-207; Mar. 2005.
Bernard et al; Computerized Diagnosis in Orthodontics for Epidemiological Studies: A ProgressReport; (Abstract Only), J. Dental Res. Special Issue, vol. 67, p. 169, paper presented at International Association for Dental Research 66th General Session, Montreal Canada; Mar. 9-13, 1988.
Bhatia et al.; A Computer-Aided Design for Orthognathic Surgery; British Journal of Oral and Maxillofacial Surgery; 22(4); pp. 237-253; Aug. 1, 1984.
Biggerstaff et al.; Computerized Analysis of Occlusion in the Postcanine Dentition; American Journal of Orthodontics; 61(3); pp. 245-254; Mar. 1972.
Biggerstaff; Computerized Diagnostic Setups and Simulations; Angle Orthodontist; 40(I); pp. 28-36; Jan. 1970.
Biostar Operation & Training Manual. Great Lakes Orthodontics, Ltd. 199 Fire Tower Drive, Tonawanda, New York, 14150-5890, 20 pages; (year of pub. sufficiently earlier than effective US filing date and any foreign priority date) 1990.
Blu et al.; Linear interpolation revitalized; IEEE Transactions on Image Processing; 13(5); pp. 710-719; May 2004.
Bookstein; Principal warps: Thin-plate splines and decomposition of deformations; IEEE Transactions on pattern analysis and machine intelligence; 11(6); pp. 567-585; Jun. 1989.
Bourke, Coordinate System Transformation; 1 page; retrived from the internet (http://astronomy.swin.edu.au/ pbourke/prolection/coords) on Nov. 5, 2004; Jun. 1996.
Boyd et al.; Three Dimensional Diagnosis and Orthodontic Treatment of Complex Malocclusions With the Invisalipn Appliance; Seminars in Orthodontics; 7(4); pp. 274-293; Dec. 2001.
Brandestini et al.; Computer Machined Ceramic Inlays: In Vitro Marginal Adaptation; J. Dent. Res. Special Issue; (Abstract 305); vol. 64; p. 208; (year of pub. sufficiently earlier than effective US filing date and any foreign priority date) 1985.
Brook et al.; An Image Analysis System for the Determination of Tooth Dimensions from Study Casts: Comparison with Manual Measurements of Mesio-distal Diameter; Journal of Dental Research; 65(3); pp. 428-431; Mar. 1986.
Burstone et al.; Precision Adjustment of the Transpalatal Lingual Arch: Computer Arch Form Predetermination; American Journal of Orthodontics; 79(2);pp. 115-133; Feb. 1981.
Burstone; Dr. Charles J. Burstone on the Uses of the Computer in Orthodontic Practice (Part 1); Journal of Clinical Orthodontics; 13(7); pp. 442-453; (interview); Jul. 1979.
Burstone; Dr. Charles J. Burstone on the Uses of the Computer in Orthodontic Practice (Part 2); journal of Clinical Orthodontics; 13(8); pp. 539-551 (interview); Aug. 1979.
Cadent Inc.; OrthoCAD ABO user guide; 38 pages; Dec. 21, 2005.
Cadent Inc.; Reviewing and modifying an orthoCAD case; 4 pages; Feb. 14, 2005.
Cardinal Industrial Finishes; Powder Coatings; 6 pages; retrieved from the internet (http://www.cardinalpaint.com) on Aug. 25, 2000.
Carnaghan, An Alternative to Holograms for the Portrayal of Human Teeth; 4th Int'l. Conf. on Holographic Systems, Components and Applications; pp. 228-231; Sep. 15, 1993.
Chaconas et al,; The DigiGraph Work Station, Part 1, Basic Concepts; Journal of Clinical Orthodontics; 24(6); pp. 360-367; (Author Manuscript); Jun. 1990.
Chafetz et al.; Subsidence of the Femoral Prosthesis, A Stereophotogrammetric Evaluation; Clinical Orthopaedics and Related Research; No. 201; pp. 60-67; Dec. 1985.
Chiappone; Constructing the Gnathologic Setup and Positioner; Journal of Clinical Orthodontics; 14(2); pp. 121-133; Feb. 1980.
Chishti et al.; U.S. Appl. No. 60/050,342 entitled "Procedure for moving teeth using a seires of retainers," filed Jun. 20, 1997.
Collins English Dictionary; Teeth (definition); 9 pages; retrieved from the internet (https:www.collinsdictionary.com/us/dictionary/english/teeth) on May 13, 2019.
Cottingham; Gnathologic Clear Plastic Positioner; American Journal of Orthodontics; 55(1); pp. 23-31; Jan. 1969.
Crawford; CAD/CAM in the Dental Office: Does It Work?; Canadian Dental Journal; 57(2); pp. 121-123 Feb. 1991.
Crawford; Computers in Dentistry: Part 1: CAD/CAM: The Computer Moves Chairside, Part 2: F. Duret A Man With a Vision, Part 3: The Computer Gives New Vision—Literally, Part 4: Bytes 'N Bites the Computer Moves From the Front Desk to the Operatory; Canadian Dental Journal; 54(9); pp. 661-666 Sep. 1988.
Crooks; CAD/CAM Comes to USC; USC Dentistry; pp. 14-17; (year of pub. sufficiently earlier than effective US filing date and any foreign priority date) Spring 1990.
CSI Computerized Scanning and Imaging Facility; What is a maximum/minimum intensity projection (MIP/MinIP); 1 page; retrived from the internet (http://csi.whoi.edu/content/what-maximumminimum-intensity-projection-mipminip); Jan. 4, 2010.
Cureton; Correcting Malaligned Mandibular Incisors with Removable Retainers; Journal of Clinical Orthodontics; 30(7); pp. 390-395; Jul. 1996.
Curry et al.; Integrated Three-Dimensional Craniofacial Mapping at the Craniofacial Research InstrumentationLaboratory/University of the Pacific; Seminars in Orthodontics; 7(4); pp. 258-265; Dec. 2001.
Cutting et al.; Three-Dimensional Computer-Assisted Design of Craniofacial Surgical Procedures: Optimization and Interaction with Cephalometric and CT-Based Models; Plastic and Reconstructive Surgery; 77(6); pp. 877-885; Jun. 1986.
Daniels et al.; The development of the index of complexity outcome and need (ICON); British Journal of Orthodontics; 27(2); pp. 149-162; Jun. 2000.
DCS Dental AG; The CAD/CAM 'DCS Titan System' for Production of Crowns/Bridges; DSC Production; pp. 1-7; Jan. 1992.
DeFranco et al.; Three-Dimensional Large Displacement Analysis of Orthodontic Appliances; Journal of Biomechanics; 9(12); pp. 793-801; Jan. 1976.
Dental Institute University of Zurich Switzerland; Program for International Symposium on Computer Restorations: State of the Art of the CEREC-Method; 2 pages; May 1991.
Dentalwings; I series dental impression scanner; 8 pages; retrieved from the internet (https://web.archive.org/web/20160502145908/http://www.dentalwings.com/products/scan-and-design-systems/iseries/); available as of May 2, 2016.
Dentalwings; Intraoral scanner; 7 pages; retrieved from the internet (https://web.archive.org/web/20160422114335/http://www.dentalwings.com/products/intraoral-scanner/); available as of Apr. 4, 2016.
Dentrac Corporation; Dentrac document; pp. 4-13; (year of pub. sufficiently earlier than effective US filing date and any foreign priority date) 1992.
Dentrix; Dentrix G3, new features; 2 pages; retrieved from the internet (http://www.dentrix.com/g3/new_features/index.asp); on Jun. 6, 2008.
Dent-x; Dentsim . . . Dent-x's virtual reality 3-D training simulator . . . A revolution in dental education; 6 pages; retrieved from the internet (http://www.dent-x.com/DentSim.htm); on Sep. 24, 1998.
Di Giacomo et al.; Clinical application of sterolithographic surgical guides for implant placement: Preliminary results; Journal Periodontolgy; 76(4); pp. 503-507; Apr. 2005.
Di Muzio et al.; Minimum intensity projection (MinIP); 6 pages; retrieved from the internet (https://radiopaedia.org/articles/minimum-intensity-projection-minip) on Sep. 6, 2018.

(56) References Cited

OTHER PUBLICATIONS

Dicom to surgical guides; (Screenshot)1 page; retrieved from the internet at YouTube (https://youtu.be/47KtOmCEFQk); Published Apr. 4, 2016.
dictionary.com; Plural (definition); 6 pages; retrieved from the internet ( https://www.dictionary.com/browse/plural#) on May 13, 2019.
dictionary.com; Quadrant (definition); 6 pages; retrieved from the internet ( https://www.dictionary.com/browse/quadrant?s=t) on May 13, 2019.
Doruk et al.; The role of the headgear timer in extraoral cooperation; European Journal of Orthodontics; 26; pp. 289-291; Jun. 1, 2004.
Doyle; Digital Dentistry; Computer Graphics World; pp. 50-52 andp. 54; Oct. 2000.
Dummer et al.; Computed Radiography Imaging Based on High-Density 670 nm VCSEL Arrays; International Society for Optics and Photonics; vol. 7557; p. 75570H; 7 pages; (Author Manuscript); Feb. 24, 2010.
Duret et al.; CAD/CAM Imaging in Dentistry; Current Opinion in Dentistry; 1(2); pp. 150-154; Apr. 1991.
Duret et al; CAD-CAM in Dentistry; Journal of the American Dental Association; 117(6); pp. 715-720; Nov. 1988.
Duret; The Dental CAD/CAM, General Description of the Project; Hennson International Product Brochure, 18 pages; Jan. 1986.
Duret; Vers Une Prosthese Informatisee; Tonus; 75(15); pp. 55-57; (English translation attached); 23 pages; Nov. 15, 1985.
Economides; The Microcomputer in the Orthodontic Office; Journal of Clinical Orthodontics; 13(11); pp. 767-772; Nov. 1979.
Ellias et al.; Proteomic analysis of saliva identifies potential biomarkers for orthodontic tooth movement; The Scientific World Journal; vol. 2012; Article ID 647240; dio:10.1100/2012/647240; 7 pages; Jul. 2012.
Elsasser; Some Observations on the History and Uses of the Kesling Positioner; American Journal of Orthodontics; 36(5); pp. 368-374; May 1, 1950.
English translation of Japanese Laid-Open Publication No. 63-11148 to inventor T. Ozukuri (Laid-Open on Jan. 18, 1998) pp. 1-7.
Faber et al.; Computerized Interactive Orthodontic Treatment Planning; American Journal of Orthodontics; 73(1); pp. 36-46; Jan. 1978.
Farooq et al.; Relationship between tooth dimensions and malocclusion; JPMA: The Journal of the Pakistan Medical Association; 64(6); pp. 670-674; Jun. 2014.
Felton et al.; A Computerized Analysis of the Shape and Stability of Mandibular Arch Form, American Journal of Orthodontics and Dentofacial Orthopedics; 92(6); pp. 478-483; Dec. 1987.
Florez-Moreno; Time-related changes in salivary levels of the osteotropic factors sRANKL and OPG through orthodontic tooth movement; American Journal of Orthodontics and Dentofacial Orthopedics; 143(1); pp. 92-100; Jan. 2013.
Friede et al.; Accuracy of Cephalometric Prediction in Orthognathic Surgery; Journal of Oral and Maxillofacial Surgery; 45(9); pp. 754-760; Sep. 1987.
Friedrich et al; Measuring system for in vivo recording of force systems in orthodontic treatment-concept and analysis of accuracy; J. Biomech.; 32(1); pp. 81-85; (Abstract Only) Jan. 1999.
Futterling et al.; Automated Finite Element Modeling of a Human Mandible with Dental Implants; JS WSCG '98-Conference Program; 8 pages; retrieved from the Internet (https://dspace5.zcu.cz/bitstream/11025/15851/1/Strasser_98.pdf); on Aug. 21, 2018.
Gansky; Dental data mining: potential pitfalls and practical issues; Advances in Dental Research; 17(1); pp. 109-114; Dec. 2003.
Gao et al.; 3-D element Generation for Multi-Connected Complex Dental and Mandibular Structure; IEEE Proceedings International Workshop in Medical Imaging and Augmented Reality; pp. 267-271; Jun. 12, 2001.
Geomagic; Dental reconstruction; 1 page; retrieved from the internet (http://geomagic.com/en/solutions/industry/detal_desc.php) on Jun. 6, 2008.
Gim-Alldent Deutschland, "Das DUX System: Die Technik," 3 pages; (English Translation Included); (year of pub. sufficiently earlier than effective US filing date and any foreign priority date); 2002.
Gottleib et al.; JCO Interviews Dr. James A. McNamura, Jr., on the Frankel Appliance: Part 2: Clinical 1-1 Management; Journal of Clinical Orthodontics; 16(6); pp. 390-407; retrieved from the internet (http://www.jco-online.com/archive/print_article.asp?Year=1982&Month=06&ArticleNum+); 21 pages; Jun. 1982.
Gottschalk et al.; OBBTree: A hierarchical structure for rapid interference detection; 12 pages; (http://www.cs.unc.edu/?geom/OBB/OBBT.html); retrieved from te internet (https://www.cse.iitk.ac.in/users/amit/courses/RMP/presentations/dslamba/presentation/sig96.pdf) on Apr. 25, 2019.
gpsdentaire.com; Get a realistic smile simulation in 4 steps with GPS; a smile management software; 10 pages; retrieved from the internet (http://www.gpsdentaire.com/en/preview/) on Jun. 6, 2008.
Grayson; New Methods for Three Dimensional Analysis of Craniofacial Deformity, Symposium: Computerized Facial Imaging in Oral and Maxillofacial Surgery; American Association of Oral and Maxillofacial Surgeons; 48(8) suppl 1; pp. 5-6; Sep. 13, 1990.
Grest, Daniel; Marker-Free Human Motion Capture in Dynamic Cluttered Environments from a Single View-Point, PHD Thesis; 171 pages; Dec. 2007.
Guess et al.; Computer Treatment Estimates in Orthodontics and Orthognathic Surgery; Journal of Clinical Orthodontics; 23(4); pp. 262-268; 11 pages; (Author Manuscript); Apr. 1989.
Heaven et al.; Computer-Based Image Analysis of Artificial Root Surface Caries; Abstracts of Papers #2094; Journal of Dental Research; 70:528; (Abstract Only); Apr. 17-21, 1991.
Highbeam Research; Simulating stress put on jaw. (ANSYS Inc.'s finite element analysis software); 2 pages; retrieved from the Internet (http://static.highbeam.com/t/toolingampproduction/november011996/simulatingstressputonfa . . . ); on Nov. 5, 2004.
Hikage; Integrated Orthodontic Management System for Virtual Three-Dimensional Computer Graphic Simulation and Optical Video Image Database for Diagnosis and Treatment Planning; Journal of Japan KA Orthodontic Society; 46(2); pp. 248-269; 56 pages; (English Translation Included); Feb. 1987.
Hoffmann et al.; Role of Cephalometry for Planning of Jaw Orthopedics and Jaw Surgery Procedures; Informatbnen, pp. 375-396; (English Abstract Included); Mar. 1991.
Hojjatie et al.; Three-Dimensional Finite Element Analysis of Glass-Ceramic Dental Crowns; Journal of Biomechanics; 23(11); pp. 1157-1166; Jan. 1990.
Huckins; CAD-CAM Generated Mandibular Model Prototype from MRI Data; AAOMS, p. 96; (Abstract Only); (year of pub. sufficiently earlier than effective US filing date and any foreign priority date) 1999.
Invisalign; You were made to move. There's never been a better time to straighten your teeth with the most advanced clear aligner in the world; Product webpage; 2 pages; retrieved from the internet (www.invisalign.com/) on Dec. 28, 2017.
JCO Interviews; Craig Andreiko , DDS, MS on the Elan and Orthos Systems; Interview by Dr. Larry W. White; Journal of Clinical Orthodontics; 28(8); pp. 459-468; 14 pages; (Author Manuscript); Aug. 1994.
JCO Interviews; Dr. Homer W. Phillips on Computers in Orthodontic Practice, Part 2; Journal of Clinical Orthodontics; 17(12); pp. 819-831; 19 pages; (Author Manuscript); Dec. 1983.
Jerrold; The Problem, Electronic Data Transmission and the Law; American Journal of Orthodontics and Dentofacial Orthopedics; 113(4); pp. 478-479; 5 pages; (Author Manuscript); Apr. 1998.
Jia et al.; Epidermal biofuel cells: energy harvesting from human perspiration; Angewandle Chemie International Edition; 52(28); pp. 7233-7236; Jul. 8, 2013.
Jia et al.; Wearable textile biofuel cells for powering electronics; Journal of Materials Chemistry A; 2(43); p. 18184-18189; Oct. 14, 2014.
Jones et al.; An Assessment of the Fit of a Parabolic Curve to Pre- and Post-Treatment Dental Arches; British Journal of Orthodontics; 16(2); pp. 85-93; May 1989.

(56) References Cited

OTHER PUBLICATIONS

Kamada et. al.; Case Reports on Tooth Positioners Using LTV Vinyl Silicone Rubber; J. Nihon University School of Dentistry; 26(1); pp. 11-29; (year of pub. sufficiently earlier than effective US filing date and any foreign priority date) 1984.
Kamada et.al.; Construction of Tooth Positioners with LTV Vinyl Silicone Rubber and Some Case KJ Reports; J. Nihon University School of Dentistry; 24(1); pp. 1-27; (year of pub. sufficiently earlier than effective US filing date and any foreign priority date) 1982.
Kanazawa et al.; Three-Dimensional Measurements of the Occlusal Surfaces of Upper Molars in a Dutch Population; Journal of Dental Research; 63(11); pp. 1298-1301; Nov. 1984.
Karaman et al.; A practical method of fabricating a lingual retainer; Am. Journal of Orthodontic and Dentofacial Orthopedics; 124(3); pp. 327-330; Sep. 2003.
Kesling et al.; The Philosophy of the Tooth Positioning Appliance; American Journal of Orthodontics and Oral surgery; 31(6); pp. 297-304; Jun. 1945.
Kesling; Coordinating the Predetermined Pattern and Tooth Positioner with Conventional Treatment; American Journal of Orthodontics and Oral Surgery; 32(5); pp. 285-293; May 1946.
Kim et al.; Non-invasive mouthguard biosensor for continuous salivary monitoring of metabolites; Analyst; 139(7); pp. 1632-1636; Apr. 7, 2014.
Kim et al.; Wearable salivary uric acid mouthguard biosensor with integrated wireless electronics; Biosensors and Bioelectronics; 74; pp. 1061-1068; 19 pages; (Author Manuscript); Dec. 2015.
Kleeman et al.; The Speed Positioner; J. Clin. Orthod.; 30(12); pp. 673-680; Dec. 1996.
Kochanek; Interpolating Splines with Local Tension, Continuity and Bias Control; Computer Graphics; 18(3); pp. 33-41; Jan. 1, 1984.
Kumar et al.; Biomarkers in orthodontic tooth movement; Journal of Pharmacy Bioallied Sciences; 7(Suppl 2); pp. S325-S330; 12 pages; (Author Manuscript); Aug. 2015.
Kumar et al.; Rapid maxillary expansion: A unique treatment modality in dentistry; J. Clin. Diagn. Res.; 5(4); pp. 906-911; Aug. 2011.
Kunii et al.; Articulation Simulation for an Intelligent Dental Care System; Displays; 15(3); pp. 181-188; Jul. 1994.
Kuroda et al.; Three-Dimensional Dental Cast Analyzing System Using Laser Scanning; American Journal of Orthodontics and Dentofacial Orthopedics; 110(4); pp. 365-369; Oct. 1996.
Laurendeau et al.; A Computer-Vision Technique for the Acquisition and Processing of 3-D Profiles of 7 Dental Imprints: An Application in Orthodontics; IEEE Transactions on Medical Imaging; 10(3); pp. 453-461; Sep. 1991.
Leinfelder et al.; A New Method for Generating Ceramic Restorations: a CAD-CAM System; Journal of the American Dental Association; 118(6); pp. 703-707; Jun. 1989.
Manetti et al.; Computer-Aided Cefalometry and New Mechanics in Orthodontics; Fortschr Kieferorthop; 44; pp. 370-376; 8 pages; (English Article Summary Included); (year of pub. sufficiently earlier than effective US filing date and any foreign priority date) 1983.
Mantzikos et al.; Case report: Forced eruption and implant site development; The Angle Orthodontist; 68(2); pp. 179-186; Apr. 1998.
Martinelli et al.; Prediction of lower permanent canine and premolars width by correlation methods; The Angle Orthodontist; 75(5); pp. 805-808; Sep. 2005.
McCann; Inside the ADA; J. Amer. Dent. Assoc, 118:286-294; Mar. 1989.
McNamara et al.; Invisible Retainers; J. Clin Orthod.; pp. 570-578; 11 pages; (Author Manuscript); Aug. 1985.
McNamara et al.; Orthodontic and Orthopedic Treatment in the Mixed Dentition; Needham Press; pp. 347-353; Jan. 1993.
Methot; Get the picture with a gps for smile design in 3 steps; Spectrum; 5(4); pp. 100-105; (year of pub, sufficiently earlier than effective US filing date and any foreign priority date) 2006.
Moermann et al, Computer Machined Adhesive Porcelain Inlays: Margin Adaptation after Fatigue Stress; IADR Abstract 339; J. Dent. Res.; 66(a):763; (Abstract Only); (year of pub. sufficiently earlier than effective US filing date and any foreign priority date) 1987.
Moles; Correcting Mild Malalignments—as Easy as One, Two, Three; AOA/Pro Corner; 11(2); 2 pages; (year of pub. sufficiently earlier than effective US filing date and any foreign priority date) 2002.
Mormann et al.; Marginale Adaptation von adhasuven Porzellaninlays in vitro; Separatdruck aus:Schweiz. Mschr. Zahnmed.; 95; pp. 1118-1129; 8 pages; (Machine Translated English Abstract); (year of pub. sufficiently earlier than effective US filing date and any foreign priority date); 1985.
Nahoum; The Vacuum Formed Dental Contour Appliance; N. Y. State Dent. J.; 30(9); pp. 385-390; Nov. 1964.
Nash; CEREC CAD/CAM Inlays: Aesthetics and Durability in a Single Appointment; Dentistry Today; 9(8); pp. 20, 22-23 and 54; Oct. 1990.
Nedelcu et al.; "Scanning Accuracy and Precision in 4 Intraoral Scanners: An In Vitro Comparison Based on 3-Dimensional Analysis"; J. Prosthet. Dent.; 112(6); pp. 1461-1471; Dec. 2014.
Newcombe; DTAM: Dense tracking and mapping in real-time; 8 pages; retrieved from the internet (http://www.doc.ic.ac.uk/?ajd/Publications/newcombe_etal_iccv2011.pdf; on Dec. 2011.
Nishiyama et al.; A New Construction of Tooth Repositioner by LTV Vinyl Silicone Rubber; The Journal of Nihon University School of Dentistry; 19(2); pp. 93-102 (year of pub. sufficiently earlier than effective US filing date and any foreign priority date) 1977.
Nourallah et al.; New regression equations for prediciting the size of unerupted canines and premolars in a contemporary population; The Angle Orthodontist; 72(3); pp. 216-221; Jun. 2002.
Ogawa et al.; Mapping, profiling and clustering of pressure pain threshold (PPT) in edentulous oral muscosa; Journal of Dentistry; 32(3); pp. 219-228; Mar. 2004.
Ogimoto et al.; Pressure-pain threshold determination in the oral mucosa; Journal of Oral Rehabilitation; 29(7); pp. 620-626; Jul. 2002.
ormco.com; Increasing clinical performance with 3D interactive treatment planning and patient-specific appliances; 8 pages; retrieved from the internet (http://www.konsident.com/wp-content/files_mf/1295385693http_ormco.com_index_cmsfilesystemaction_fileOrmcoPDF_whitepapers.pdf) on Feb. 27, 2019.
OrthoCAD downloads; retrieved Jun. 27, 2012 from the internet (www.orthocad.com/download/downloads.asp); 2 pages; Feb. 14, 2005.
Page et al.; Validity and accuracy of a risk calculator in predicting periodontal disease; Journal of the American Dental Association; 133(5); pp. 569-576; May 2002.
Paredes et al.; A new, accurate and fast digital method to predict unerupted tooth size; The Angle Orthodontist; 76(1); pp. 14-19; Jan. 2006.
Patterson Dental; Cosmetic imaging; 2 pages retrieved from the internet (http://patterson.eaglesoft.net/cnt_di_cosimg.html) on Jun. 6, 2008.
Paul et al.; Digital Documentation of Individual Human Jaw and Tooth Forms for Applications in Orthodontics; Oral Surgery and Forensic Medicine Proc. of the 24th Annual Conf. of the IEEE Industrial Electronics Society (IECON '98); vol. 4; pp. 2415-2418; Sep. 4, 1998.
Pinkham; Foolish Concept Propels Technology; Dentist, 3 pages , Jan./Feb. 1989.
Pinkham; Inventor's CAD/CAM May Transform Dentistry; Dentist; pp. 1 and 35, Sep. 1990.
Ponitz; Invisible retainers; Am. J. Orthod.; 59(3); pp. 266-272; Mar. 1971.
Procera Research Projects; Procera Research Projects 1993 Abstract Collection; 23 pages; (year of pub. sufficiently earlier than effective US filing date and any foreign priority date) 1993.
Proffit et al.; The first stage of comprehensive treatment alignment and leveling; Contemporary Orthodontics, 3rd Ed.; Chapter 16; Mosby Inc.; pp. 534-537; (year of pub. sufficiently earlier than effective US filing date and any foreign priority date) 2000.

(56) References Cited

OTHER PUBLICATIONS

Proffit et al.; The first stage of comprehensive treatment: alignment and leveling; Contemporary Orthodontics; (Second Ed.); Chapter 15, MosbyYear Book; St. Louis, Missouri; pp. 470-533 Oct. 1993.
Raintree Essix & ARS Materials, Inc., Raintree Essix, Technical Magazine Table of contents and Essix Appliances, 7 pages; retrieved from the internet (http://www.essix.com/magazine/defaulthtml) on Aug. 13, 1997.
Redmond et al.; Clinical Implications of Digital Orthodontics; American Journal of Orthodontics and Dentofacial Orthopedics; 117(2); pp. 240-242; Feb. 2000.
Rekow et al.; CAD/CAM for Dental Restorations—Some of the Curious Challenges; IEEE Transactions on Biomedical Engineering; 38(4); pp. 314-318; Apr. 1991.
Rekow et al.; Comparison of Three Data Acquisition Techniques for 3-D Tooth Surface Mapping: Annual International Conference of the IEEE Engineering in Medicine and Biology Society: 13(1); pp. 344-345 (year of pub. sufficiently earlier than effective US filing date and any foreign priority date) 1991.
Rekow; A Review of the Developments in Dental CAD/CAM Systems; Current Opinion in Dentistry; 2; pp. 25-33; Jun. 1992.
Rekow; CAD/CAM in Dentistry: A Historical Perspective and View of the Future; Journal Canadian Dental Association; 58(4); pp. 283, 287-288; Apr. 1992.
Rekow; Computer-Aided Design and Manufacturing in Dentistry: A Review of the State of the Art; Journal of Prosthetic Dentistry; 58(4); pp. 512-516; Dec. 1987.
Rekow; Dental CAD-CAM Systems: What is the State of the Art ?; The Journal of the American Dental Association; 122(12); pp. 43-48; Dec. 1991.
Rekow; Feasibility of an Automated System for Production of Dental Restorations, Ph.D. Thesis; Univ. of Minnesota, 250 pages, Nov. 1988.
Richmond et al.; The Development of the PAR Index (Peer Assessment Rating): Reliability and Validity.; The European Journal of Orthodontics; 14(2); pp. 125-139; Apr. 1992.
Richmond et al.; The Development of a 3D Cast Analysis System; British Journal of Orthodontics; 13(1); pp. 53-54; Jan. 1986.
Richmond; Recording the Dental Cast in Three Dimensions; American Journal of Orthodontics and Dentofacial Orthopedics; 92(3); pp. 199-206; Sep. 1987.
Rose et al.; The role of orthodontics in implant dentistry; British Dental Journal; 201(12); pp. 753-764; Dec. 23, 2006.
Rubin et al.; Stress analysis of the human tooth using a three-dimensional finite element model; Journal of Dental Research; 62(2); pp. 82-86; Feb. 1983.
Rudge; Dental Arch Analysis: Arch Form, A Review of the Literature; The European Journal of Orthodontics; 3(4); pp. 279-284; Jan. 1981.
Sahm et al.; "Micro-Electronic Monitoring of Functional Appliance Wear"; Eur J Orthod.; 12(3); pp. 297-301; Aug. 1990.
Sahm; Presentation of a wear timer for the clarification of scientific questions in orthodontic orthopedics; Fortschritte der Kieferorthopadie; 51 (4); pp. 243-247; (Translation Included) Jul. 1990.
Sakuda et al.; Integrated Information-Processing System in Clinical Orthodontics: An Approach with Use of a Computer Network System; American Journal of Orthodontics and Dentofacial Orthopedics; 101(3); pp. 210-220; 20 pages; (Author Manuscript) Mar. 1992.
Sarment et al.; Accuracy of implant placement with a sterolithographic surgical guide; journal of Oral and Maxillofacial Implants; 118(4); pp. 571-577; Jul. 2003.
Schafer et al.; "Quantifying patient adherence during active orthodontic treatment with removable appliances using microelectronic wear-time documentation"; Eur J Orthod.; 37(1)pp. 1-8; doi: 10.1093/ejo/cju012; Jul. 3, 2014.
Schellhas et al.; Three-Dimensional Computed Tomography in Maxillofacial Surgical Planning; Archives of Otolaryngology—Head and Neck Surgery; 114(4); pp. 438-442; Apr. 1988.

Schroeder et al; Eds. The Visual Toolkit, Prentice Hall PTR, New Jersey; Chapters 6, 8 & 9, (pp. 153-210,309-354, and 355-428; (year of pub. sufficiently earlier than effective US filing date and any foreign priority date) 1998.
Shilliday; Minimizing finishing problems with the mini-positioner; American Journal of Orthodontics; 59(6); pp. 596-599; Jun. 1971.
Shimada et al.; Application of optical coherence tomography (OCT) for diagnosis of caries, cracks, and defects of restorations; Current Oral Health Reports; 2(2); pp. 73-80; Jun. 2015.
Siemens: CEREC—Computer-Reconstruction, High Tech in der Zahnmedizin: 15 pagesl; (Includes Machine Translation): (year of pub. sufficiently earlier than effective US filing date and any foreign priority date); 2004.
Sinclair; The Readers' Corner; Journal of Clinical Orthodontics; 26(6); pp. 369-372; 5 pages; retrived from the internet (http://www.jco-online.com/archive/print_article.asp?Year=1992&Month=06&ArticleNum=); Jun. 1992.
Sirona Dental Systems GmbH, CEREC 3D, Manuel utilisateur, Version 2.0X (in French); 114 pages; (English translation of table of contents included); (year of pub. sufficiently earlier than effective US filing date and any foreign priority date); 2003.
Smalley; Implants for tooth movement: Determining implant location and orientation: Journal of Esthetic and Restorative Dentistry; 7(2); pp. 62-72; Mar. 1995.
Smart Technology; Smile library II; 1 page; retrieved from the internet (http://smart-technology.net/) on Jun. 6, 2008.
Smile-Vision_The smile-vision cosmetic imaging system; 2 pages; retrieved from the internet (http://www.smile-vision.net/cos_imaging.php) on Jun. 6, 2008.
Stoll et al.; Computer-aided Technologies in Dentistry; Dtsch Zahna'rztl Z 45, pp. 314-322; (English Abstract Included); (year of pub. sufficiently earlier than effective US filing date and any foreign priority date) 1990.
Sturman; Interactive Keyframe Animation of 3-D Articulated Models; Proceedings Graphics Interface '84; vol. 86; pp. 35-40; May-Jun. 1984.
Szeliski; Introduction to computer vision: Structure from motion; 64 pages; retrieved from the internet (http://robots.stanford.edu/cs223b05/notes/CS%20223-B%20L.10%structurefrommotion1b.ppt, on Feb. 3, 2005.
The American Heritage, Stedman's Medical Dictionary; Gingiva; 3 pages; retrieved from the interent (http://reference.com/search/search?q=gingiva) on Nov. 5, 2004.
The Dental Company Sirona: Cerc omnicam and cerec bluecam brochure: The first choice in every case; 8 pages; (year of pub. sufficiently earlier than effective US filing date and any foreign priority date) 2014.
Thera Mon; "Microsensor"; 2 pages; retrieved from the internet (www.english.thera-mon.com/the-product/transponder/index.html); on Sep. 19, 2016.
Thorlabs; Pellin broca prisms; 1 page; retrieved from the internet (www.thorlabs.com); Nov. 30, 2012.
Tiziani et al.; Confocal principle for macro and microscopic surface and defect analysis; Optical Engineering; 39(1); pp. 32-39; Jan. 1, 2000.
Truax; Truax Clasp-Less(TM) Appliance System; The Functional Orthodontist; 9(5); pp. 22-24, 26-28; Sep.-Oct. 1992.
Tru-Tatn Orthodontic & Dental Supplies, Product Brochure, Rochester, Minnesota 55902, 16 pages; (year of pub. sufficiently earlier than effective US filing date and any foreign priority date) 1996.
U.S. Department of Commerce, National Technical Information Service, Holodontography: An Introduction to Dental Laser Holography; School of Aerospace Medicine Brooks AFB Tex; Mar. 1973, 40 pages; Mar. 1973.
U.S. Department of Commerce, National Technical Information Service; Automated Crown Replication Using Solid Photography SM; Solid Photography Inc., Melville NY,; 20 pages; Oct. 1977.
Vadapalli; Minimum intensity projection (MinIP) is a data visualization; 7 pages; retrieved from the internet (https://prezi.com/tdmttnmv2knw/minimum-intensity-projection-minip-is-a-data-visualization/) on Sep. 6, 2018.

(56) References Cited

OTHER PUBLICATIONS

Van Der Linden et al.; Three-Dimensional Analysis of Dental Casts by Means of the Optocom; Journal of Dental Research; 51(4); p. 1100; Jul.-Aug. 1972.
Van Der Linden; A New Method to Determine Tooth Positions and Dental Arch Dimensions; Journal of Dental Research; 51(4); p. 1104; Jul.-Aug. 1972.
Van Der Zel; Ceramic-Fused-to-Metal Restorations with a New CAD/CAM System; Quintessence International; 24(A); pp. 769-778; (year of pub. sufficiently earlier than effective US filing date and any foreign priority date); 1993.
Van Hilsen et al.; Comparing potential early caries assessment methods for teledentistry; BMC Oral Health; 13(16); doi: 10.1186/1472-6831-13-16; 9 pages; Mar. 2013.
Varady et al.; Reverse Engineering of Geometric Models' An Introduction; Computer-Aided Design; 29(4); pp. 255-268; 20 pages; (Author Manuscript); Apr. 1997.
Verstreken et al.; An Image-Guided Planning System for Endosseous Oral Implants; IEEE Transactions on Medical Imaging; 17(5); pp. 842-852; Oct. 1998.
Vevin et al.; Pose estimation of teeth through crown-shape matching; In Medical Imaging: Image Processing of International Society of Optics and Photonics; vol. 4684; pp. 955-965; May 9, 2002.
Virtual Orthodontics; Our innovative software; 2 pages; (http://www.virtualorthodontics.com/innovativesoftware.html); retrieved from the internet (https://web.archive.org/web/20070518085145/http://www.virtualorthodontics.com/innovativesoftware.html); (year of pub. sufficiently earlier than effective US filing date and any foreign priority date) 2005.
Warunek et al.; Physical and Mechanical Properties of Elastomers in Orthodonic Positioners; American Journal of Orthodontics and Dentofacial Orthopedics; 95(5); pp. 388-400; 21 pages; (Author Manuscript); May 1989.
Warunek et.al.; Clinical Use of Silicone Elastomer Applicances; JCO; 23 (10); pp. 694-700; Oct. 1989.
Watson et al.; Pressures recorded at te denture base-mucosal surface interface in complete denture wearers; Journal of Oral Rehabilitation 14(6); pp. 575-589; Nov. 1987.
Wells; Application of the Positioner Appliance in Orthodontic Treatment; American Journal of Orthodontics; 58(4); pp. 351-366; Oct. 1970.
Wiedmann; According to the laws of harmony to find the right tooth shape with assistance of the computer; Digital Dental News; 2nd vol.; pp. 0005-0008; (English Version Included); Apr. 2008.
Wikipedia; Palatal expansion; 3 pages; retrieved from the internet (https://en.wikipedia.org/wiki/Palatal_expansion) on Mar. 5, 2018.
Williams; Dentistry and CAD/CAM: Another French Revolution; J. Dent. Practice Admin.; 4(1); pp. 2-5 Jan./Mar. 1987.
Williams; The Switzerland and Minnesota Developments in CAD/CAM; Journal of Dental Practice Administration; 4(2); pp. 50-55; Apr./Jun. 1987.
Windmiller et al.; Wearable electrochemical sensors and biosensors: a review; Electroanalysis; 25(1); pp. 29-46; Jan. 2013.
Wireless Sensor Networks Magazine; Embedded Teeth for Oral Activity Recognition; 2 pages; retrieved on Sep. 19, 2016 from the internet (www.wsnmagazine.com/embedded-teeth/); Jul. 29, 2013.
Wishan; New Advances in Personal Computer Applications for Cephalometric Analysis, Growth Prediction, Surgical Treatment Planning and Imaging Processing; Symposium: Computerized Facial Imaging in Oral and Maxilofacial Surgery; p. 5; Presented on Sep. 13, 1990.
Witt et al.; The wear-timing measuring device in orthodontics-cui bono? Reflections on the state-of-the-art in wear-timing measurement and compliance research in orthodontics; Fortschr Kieferorthop.; 52(3); pp. 117-125; (Translation Included) Jun. 1991.

Wolf; Three-dimensional structure determination of semi-transparent objects from holographic data; Optics Communications; 1(4); pp. 153-156; Sep. 1969.
Wong et al.; Computer-aided design/computer-aided manufacturing surgical guidance for placement of dental implants: Case report; Implant Dentistry; 16(2); pp. 123-130; Sep. 2007.
Wong et al.; The uses of orthodontic study models in diagnosis and treatment planning; Hong Kong Dental Journal; 3(2); pp. 107-115; Dec. 2006.
WSCG'98—Conference Program, The Sixth International Conference in Central Europe on Computer Graphics and Visualization '98; pp. 1-7; retrieved from the Internet on Nov. 5, 2004, (http://wscg.zcu.cz/wscg98/wscg98.htm); Feb. 9-13, 1998.
Xia et al.; Three-Dimensional Virtual-Reality Surgical Planning and Soft-Tissue Prediction for Orthognathic Surgery; IEEE Transactions on Information Technology in Biomedicine; 5(2); pp. 97-107; Jun. 2001.
Yaltara Software; Visual planner; 1 page; retrieved from the internet (http://yaltara.com/vp/) on Jun. 6, 2008.
Yamada et al.; Simulation of fan-beam type optical computed-tomography imaging of strongly scattering and weakly absorbing media; Applied Optics; 32(25); pp. 4808-4814; Sep. 1, 1993.
Yamamoto et al.; Optical Measurement of Dental Cast Profile and Application to Analysis of Three-Dimensional Tooth Movement in Orthodontics; Front. Med. Biol. Eng., 1(2); pp. 119-130; (year of pub. sufficiently earlier than effective US filing date and any foreign priority date); 1988.
Yamamoto et al.; Three-Dimensional Measurement of Dental Cast Profiles and Its Applications to Orthodontics; Conf. Proc. IEEE Eng. Med. Biol. Soc.; 12(5); pp. 2052-2053; Nov. 1990.
Yamany et al.; A System for Human Jaw Modeling Using Intra-Oral Images; Proc. of the 20th Annual Conf. of the IEEE Engineering in Medicine and Biology Society; vol. 2; pp. 563-566; Oct. 1998.
Yoshii; Research on a New Orthodontic Appliance: The Dynamic Positioner (D.P.); 111. The General Concept of the D.P. Method and Its Therapeutic Effect, Part 1, Dental and Functional Reversed Occlusion Case Reports; Nippon Dental Review; 457; pp. 146-164; 43 pages; (Author Manuscript); Nov. 1980.
Yoshii; Research on a New Orthodontic Appliance: The Dynamic Positioner (D.P.); I. The D.P. Concept and Implementation of Transparent Silicone Resin (Orthocon); Nippon Dental Review; 452; pp. 61-74; 32 pages; (Author Manuscript); Jun. 1980.
Yoshii; Research on a New Orthodontic Appliance: The Dynamic Positioner (D.P.); I. The D.P. Manufacturing Procedure and Clinical Applications; Nippon Dental Review; 454; pp. 107-130; 48 pages; (Author Manuscript); Aug. 1980.
Yoshii; Research on a New Orthodontic Appliance: The Dynamic Positioner (D.P.); III—The General Concept of the D.P. Method and Its Therapeutic Effect, Part 2. Skeletal Reversed Occlusion Case Reports; Nippon Dental Review; 458; pp. 112-129; 40 pages; (Author Manuscript); Dec. 1980.
Zhang et al.; Visual speech features extraction for improved speech recognition; 2002 IEEE International conference on Acoustics, Speech and Signal Processing; vol. 2; 4 pages; May 13-17, 2002.
Zhou et al.; Biofuel cells for self-powered electrochemical biosensing and logic biosensing: A review; Electroanalysis; 24(2); pp. 197-209; Feb. 2012.
Zhou et al.; Bio-logic analysis of injury biomarker patterns in human serum samples; Talanta; 83(3); pp. 955-959; Jan. 15, 2011.
Merriam Webster; (Definition); Disintegrate; 7 pages; retrived from the internet; https://www.merriam-webster.com/dictionary/disintegrate) on Oct. 16, 2023.
Merriam Webster; (Definition); Integral; 7 pages; retrived from the internet (https://www.merriam-webster.com/dictionary/integral) on Oct. 16, 2023.

* cited by examiner

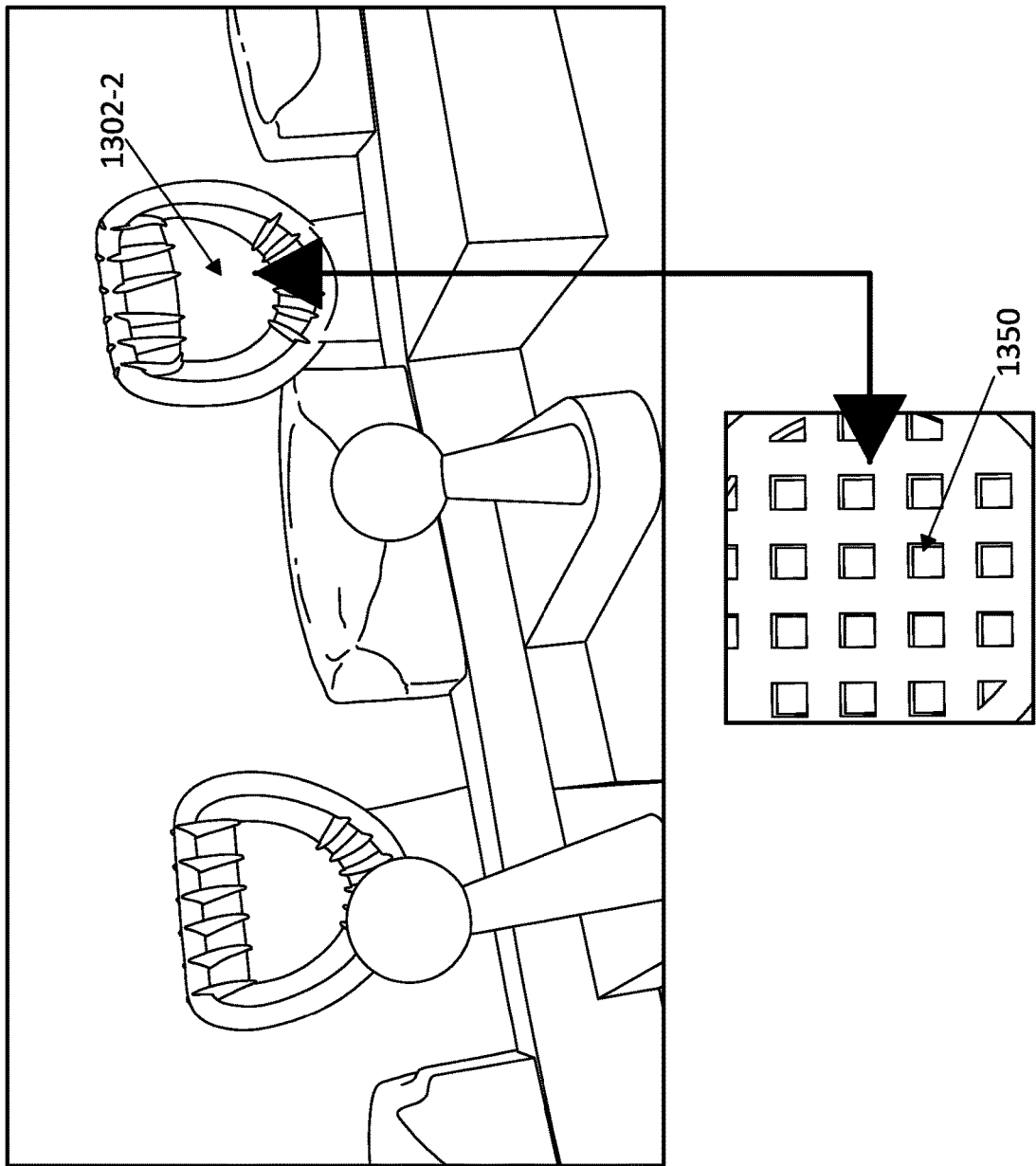

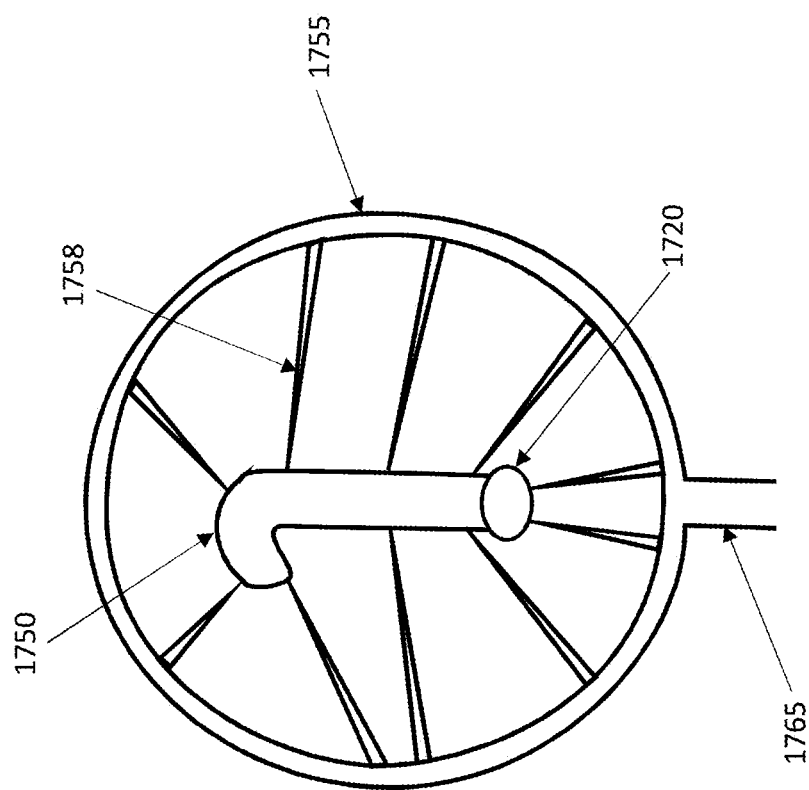

ant placement structure of FIGS. 1A and 1B positioned on a tooth of a patient.

DENTAL ATTACHMENT PLACEMENT STRUCTURE

CROSS REFERENCE TO RELATED APPLICATIONS

This application claims priority to U.S. Provisional Patent Application No. 62/648,698, filed on Mar. 27, 2018, which is incorporated herein by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

Described herein are apparatuses (e.g., devices, systems, etc.) and methods for reliably and easily positioning and placing dental attachments prior to or during a dental treatment, including restorative and/or orthodontic procedures.

BACKGROUND

Orthodontic procedures may include repositioning misaligned teeth and/or changing bite configurations for improved cosmetic appearance and/or dental function. Orthodontic repositioning can be accomplished, for example, by applying controlled forces to one or more teeth or a jaw of a patient over a period of time. As an example, orthodontic repositioning may be provided through a dental process that uses positioning appliances for realigning teeth. Such appliances may utilize a shell of material having resilient properties, referred to as an "aligner," that generally conforms to a patient's teeth but is slightly out of alignment with a current tooth configuration.

Placement of such an appliance over the teeth may provide controlled forces in specific locations to gradually move the teeth into a new configuration. Repetition of this process with successive appliances in progressive configurations can move the teeth through a series of intermediate arrangements to a final desired arrangement. Appliances can also be used for other dental conditions, such as application of medications, appliances to help with sleep apnea, and other issues.

Orthodontic treatments may use one or more attachments (dental attachments) that may be affixed to the one or more teeth of the patient, typically with an adhesive material, such as an attachment composite material, or directly cured to the tooth. These attachments may interact with surfaces on the appliance to impart forces on one or more teeth.

The positioning, orientation, and securing of attachments is typically done by a treatment professional at a dentist or orthodontist's office. However, treatment professionals can make one or more errors when mixing, forming, positioning, orienting, or securing one or more of the attachments and as such, the appliance and attachment combination may not fit together correctly or impart the correct one or more forces.

BRIEF DESCRIPTION OF THE DRAWINGS

FIG. 13D illustrates a side view of the dental attachment placement structure of FIG. 13A showing a textured surface of a dental attachment according to some embodiments.

FIG. 17 illustrates a power arm functional feature with an attachment frame and retention supports according to some embodiments.

SUMMARY

Figure 1A:
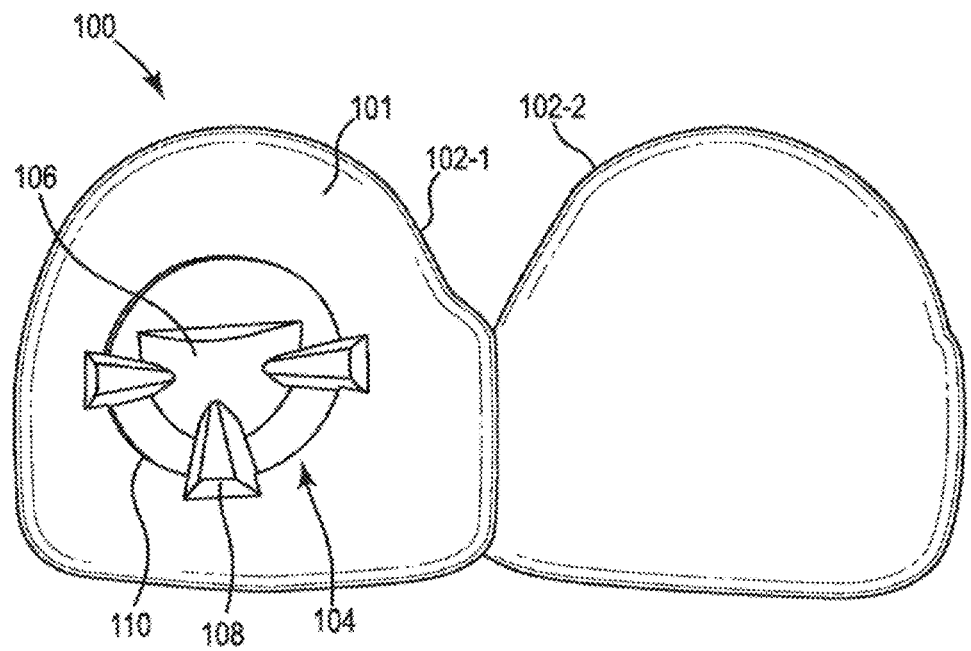
FIG. 1A illustrates a front view of a dental attachment placement structure for placement of an attachment according to a number of embodiments of the present disclosure.

Described herein are methods and apparatuses for positioning one or more dental attachments with respect to one or more corresponding teeth. The apparatuses can include a number of features for orienting and maintaining a dental attachment in a predetermined position on a tooth surface based on a virtual model of at least a portion of a patient's dentition. The apparatuses can be designed to position the attachment to any tooth surface. In some cases, the apparatuses are configured to place the attachment on a buccal tooth surface. The apparatuses can include a body or frame that one or more dental attachments are attached to. Once an attachment is affixed to the tooth surface in the desired location, the attachment can be decoupled from the apparatus. The apparatus can then be removed from the patient's mouth. The attachment may then be used in conjunction with one or more orthodontic appliances, such as an aligner, to apply controlled forces to the patient's teeth in accordance with a dental treatment.

An orthodontic system may utilize a set of appliances that can be used serially such that, as the teeth move, a new appliance from the set can be implemented to further move the teeth without having to take a new impression of the patient's teeth at every increment of tooth movement in order to make each successive appliance. The same attachments (dental attachments) may be utilized with successive appliances or attachments may be added, removed, or replaced with other attachment shapes that may impart different force characteristics than a previous appliance and attachment combination (i.e., appliance and one or more attachments).

Currently, attachments can be formed by hand by a treatment professional (e.g., a doctor or assistant). In this process, a treatment professional selects an attachment material to be used and inserts the material into a well, formed in a sheet of material, to the desired exterior shape of the attachment is provided to the treatment professional and the mixed attachment material is pushed into the well to form the attachment based on the shape of the well.

The attachment may then be removed from the well and then put on a tooth and cured. The mixing of the attachment material and amount of attachment composite put into attachment wells on templates are uncontrolled, and therefore errors can occur.

When manually applied, the absolute position of the attachment on the tooth is also subject to user error. When this occurs, the mismatch between the position and/or orientation of the attachment in relation to a contact surface on the appliance, may make using the appliance difficult or impossible and/or make the appliance less effective (reduction of one or more forces being applied by the combination of the attachment and appliance) or provide an incorrect effect (location and/or orientation of the attachment provides different force characteristics than was intended).

The embodiments of the present disclosure can provide a number of benefits. For example, the embodiments can improve the accuracy of placement and orientation of the attachments on tooth surfaces, allow more ability to create specialized attachment sizes and shapes, improve the experience of the patient and/or treatment professional in creating and/or securing the attachments, and save time and cost in manufacture, among other benefits.

According to some embodiments, a dental attachment placement device includes: a frame configured to extend over at least a portion of a dental arch; an attachment support extending from a buccal side of the frame; a dental attachment frangibly attached to the attachment support; a registration anchor extending from the frame and configured to hold the dental attachment against a tooth surface at a predetermined position; and a retention support extending from a lingual side of the frame and configured to maintain the frame over the dental arch.

The dental attachment may be coupled to the attachment support via one or more frangible portions of the device. The dental attachment may be adapted to break away from the attachment support at an interface region. The dental attachment may be surrounded by an attachment frame and attached to the attachment frame by one or more frangible portions. The dental attachment may include a textured surface to increase a bond strength of the dental attachment to the tooth surface. The registration anchor may have a contoured surface to complement a surface of one or more teeth of the dental arch. The contoured surface of the at least one anchor can corresponds to the surface of one or more of an incisor, canine, premolar, and molar of the dental arch. The dental attachment may be configured to attach to the surface of the same tooth as the registration anchor is configured to complement. The dental attachment may be configured to attach to the surface of a different tooth as the registration anchor is configured to complement. The device can include at least two registration anchors, where the attachment support is between the at least two registration anchors along a length of the base. The retention support can be adapted to contact one or more lingual tooth surfaces. The retention support can be adapted to contact an interproximal region between two teeth. The retention support can be adapted to contact a single lingual tooth surface. The device can include an integrated device identifier for identifying the device. The dental attachment may include one or more auxiliary features that extend from the dental attachment. The one or more auxiliary features may include a power arm, hook, button, spring, brace, bracket, wire, rod, band, blade, coil, elastic, ring, track, link and chain. The attachment support and the retention support may extend with respect to a bottom surface of the frame, where a top surface of the frame is substantially flat.

Also described herein are methods for using the dental attachment placement device described herein. For instance, a method can include: placing the registration anchor on a surface of a first tooth; and placing the retention support on a lingual surface of a second tooth, where placing the registration anchor and the retention support positions the dental attachment against the tooth surface at the predetermined position. The first tooth may be the same as or different than the second tooth. The methods can include affixing the dental attachment to the predetermined position on the tooth surface. The methods can include removing the dental attachment from the attachment support. Removal may be by breaking the dental attachment away from the attachment support at one or more interface regions with or without the use of a tool.

According to some embodiments, a dental attachment placement device includes: a frame configured to extend over a portion of a dental arch; an attachment support extending from a first side of the frame; a dental attachment removably attached to the attachment support and adapted to attach to a tooth surface; a first and second registration anchor extending from the frame such that the first anchor is separated by the second anchor by a gap portion of the frame that spans one or more teeth along the portion of the dental arch, the first and second registration anchors configured to place the dental attachment at a predetermined position on the tooth surface and to suspend the gap portion of the frame over the dental arch; and a retention support extending from a second side of the frame and adapted to maintain the dental attachment at the predetermined position.

The registration anchors can each have a contact surface adapted to contact a corresponding tooth. The contact surface can be a contoured surface corresponding to a surface of at least one tooth of the dental arch. The contoured surface can corresponds to one or more of a lingual, occlusal, buccal and distal tooth surface. The dental attachment can extend from a buccal side of the frame and retention support can extend from a lingual side of the frame. The retention support can be adapted to contact one or more tooth surfaces. The attachment support can extend from the gap portion of the frame and the dental attachment is positioned to attach to one of the one or more spanned teeth. The dental attachment can be configured to attach to the surface of the same tooth as the registration anchor is configured to contact. The device can include a second attachment support having a second dental attachment adapted to attach to a second tooth surface. The attachment support may extend from a first registration anchor. The dental attachment may include one or more auxiliary features that extend from the dental attachment. The one or more auxiliary features can include one or more of a power arm, hook, button, spring, brace, bracket, wire, rod, band, blade, coil, elastic, ring, track, link and chain. The one or more auxiliary features can be supported by an attachment frame. The attachment support and the retention support can extend with respect to a bottom surface of the frame, where a top surface of the frame is (e.g., substantially) flat.

Methods described herein include methods of forming a dental attachment placement device. For example, a method can include: forming a frame configured to extend over at least a portion of a dental arch; forming an attachment support extending from a first side of the frame and having a dental attachment removably attached thereto, the attachment support configured to hold the dental attachment against a tooth surface at a predetermined position; forming a registration anchor extending from the frame; and forming a retention support extending from a second side of the frame, the retention support configured to maintain the frame over the dental arch, where the frame, attachment support, dental attachment, registration anchor, and retention support are formed based on virtual three-dimensional model. The method may include forming a textured surface, e.g., with a grid pattern, to increase a bond strength of the dental attachment to the tooth surface. The frame, attachment support, dental attachment, registration anchor, and retention support may be formed from the same material, or different materials.

Any of the methods may involve an additive manufacturing process. For example, the frame, attachment support, dental attachment, registration anchor, and retention support can be formed together (e.g., in one piece) using an additive manufacturing process. One of the surfaces of the device, e.g., a top surface of the frame, may be formed directly on a build plate during the additive manufacturing process (i.e., without the use of supports). The process can include the printing of one material, or more than one material. For example, an entire dental attachment placement device, including the one or more attachments, may be made of the same material (e.g., same polymer). Alternatively, portions of the dental attachment placement device may be made of different materials (e.g., different polymers).

For example, described herein are dental attachment placement apparatuses (e.g., devices and systems). In some variations a dental attachment placement system may include: a frame configured to extend over at least a portion of a dental arch; an attachment support extending from a first side of the frame (e.g., a side configured to be adjacent to the buccal side of the patient's teeth when the dental attachment placement device is worn on the patient's dental arc); a dental attachment frangibly connected to the attachment support; a registration anchor extending from the frame and configured to hold the dental attachment against a tooth surface at a predetermined position; and a retention support extending from a second side of the frame (e.g., a side configured to be adjacent to the lingual side of the patient's teeth when the dental attachment placement device is worn on the patient's dental arch) and configured to maintain the frame over the dental arch.

The dental attachment (which may be referred to herein as simply an "attachment") may be coupled directly or indirectly to the attachment support via a plurality of frangible portions. The dental attachment may therefore be adapted to break away from the attachment support at an interface region.

The attachment support may be configured as an attachment frame around (e.g., partially or completely encircling and/or surrounding) the dental attachment, wherein the dental attachment is attached to the attachment frame by one or more frangible portions.

Any of the attachments described herein may include a textured surface on a tooth-facing side to increase a bond strength of the dental attachment to the tooth surface. The textured surface may be a grid, or other set of protrusions that leave gaps between the tooth and the attachment into which adhesive may be held (and subsequently crosslinked). Any of the attachments may permit the passage of a UV or other crosslinking wavelength.

In general the dental attachment placement devices described herein may be minimal dental attachment devices, meaning that the frame may be a curved bar or member from which the attachment support(s), registration anchor(s) and retention support(s) extend. In some variations the frame is flat on the top side and the attachment support(s), registration anchor(s) and retention support(s) extend generally downward, over the sides of the patient's teeth when worn.

In general, the registration anchor may have a contoured surface to complement a surface of one or more teeth of the dental arch. For example, the contoured surface of the registration anchor may correspond to the surface of one or more of an incisor, canine, premolar, and molar of the dental arch. The dental attachment may be configured to attach to the surface of the same tooth that the registration anchor is configured to hold the dental attachment against. Alternatively or additionally, the dental attachment may be configured to attach to the surface of a different tooth than the registration anchor is configured to hold the dental attachment against.

Any of these dental attachment placement devices may include at least two registration anchors. The attachment supports may be between the at least two registration anchors along a length of the frame.

The retention support may be adapted to contact one or more lingual tooth surfaces. The retention support may be adapted to contact an interproximal region between two teeth.

Any of these apparatuses (e.g., dental attachment placement devices) may include an integrated device identifier. The device identified may be formed as a code (e.g., alphanumeric code, bar code, QR code, etc.) on or attached to the apparatus. The device identified may correspond to a particular patient and/or stage of treatment for the patient.

In any of the apparatuses described herein, the dental attachment may be configured to include one or more auxiliary features that extend from the dental attachment. For example, the one or more auxiliary features may include a power arm, hook, button, spring, brace, bracket, wire, rod, band, blade, coil, elastic, ring, track, link and chain.

Any of the frame, attachment support(s), registration anchor(s) and retention support(s) may be configured as a spring, having a sinusoidal (e.g., s-shaped or repeating s-shapes), zig-zag, serpentine, etc. length expending down all or a region of the frame, attachment support(s), registration anchor(s) and/or retention support(s). This spring or spring-like region may provide flexibility when attaching the frame to the teeth of the dental arch, typically by securing the teeth between the attachment support(s) and the registration anchor(s). In general, these apparatuses may be configured so that they may be secured to the patient's teeth without requiring the user (doctor, orthodontist, dental technician) to hold them in place manually. In some variations the apparatus may be configured so that the patient may be able to bite down on the frame to hold it in place while the user anchors (e.g., cross-links) the dental anchors onto the teeth.

A dental attachment placement device may include: a frame configured to extend over a portion of a dental arch; an attachment support extending from a first side of the frame; a dental attachment removably attached to the attachment support and adapted to attach to a tooth surface; a first and second registration anchor extending from the frame such that the first anchor is separated by the second anchor by a gap portion of the frame that spans one or more teeth along the portion of the dental arch, the first and second registration anchors configured to place the dental attachment at a predetermined position on the tooth surface; and a retention support extending from a second side of the frame and adapted to maintain the dental attachment at the predetermined position.

A dental attachment placement device may include: a frame configured to extend over at least a portion of a dental arch, wherein a top of the frame is flat;
a plurality of attachment supports, wherein each attachment support is configured to extend over a buccal surface of the dental arch when the frame is worn over the dental arch; a plurality of dental attachments, wherein each dental attachment is frangibly connected to one of the attachment supports of the plurality of attachment supports; a plurality of registration anchors extending from the frame, wherein each registration anchor is configured to hold the dental attachment against a tooth surface at a predetermined position when the frame is worn over the dental arch; and a plurality of retention supports extending from the frame, wherein each retention support is configured to extend over a lingual surface of the dental arch when the frame is worn over the dental arch, further wherein each retention support is configured to maintain the frame over the dental arch when the frame is worn over the dental arch.

Also described herein are methods of attaching a dental attachment using any of these dental attachment placement devices. For example a method of attaching a dental attachment may include: placing a dental attachment placement device onto a dental arch, wherein the dental attachment placement device includes: a frame, an attachment support extending from the frame over a buccal surface of the dental arch, a dental attachment connected to the attachment support; a registration anchor extending from the frame, and a retention support extending over a lingual side of the frame; maintaining the frame over the dental arch with the retention support on a lingual surface of the dental arch and the registration anchor on a buccal surface of the dental arch; and affixing the dental attachment to a predetermined position on a tooth surface of the dental arch.

Any of these methods may include removing the dental attachment from the attachment support. Removing the dental attachment may comprise breaking the dental attachment away from the attachment support at one or more break-away interface regions.

Also described herein are methods of forming a dental attachment placement device. For example, a method of forming a dental attachment placement device may include: forming a frame configured to extend over at least a portion of a dental arch; forming an attachment support extending from a first side of the frame and having a dental attachment removably attached thereto, the attachment support configured to hold the dental attachment against a tooth surface at a predetermined position; forming a registration anchor extending from the frame; and forming a retention support extending from a second side of the frame, the retention support configured to maintain the frame over the dental arch, wherein the frame, attachment support, dental attachment, registration anchor, and retention support are formed based on virtual three-dimensional model.

Forming the dental attachment may comprise forming a textured surface on the dental attachment to increase a bond strength of the dental attachment to the tooth surface. The frame, attachment support, dental attachment, registration anchor, and retention support may be formed from the same material. In some variations, at least two of the frame, attachment support, dental attachment, registration anchor, and retention support are formed from different materials. In general, forming the frame, attachment support, dental attachment, registration anchor, and retention support may comprises using an additive manufacturing process. In some variations, a top surface of the frame is formed directly on a build plate during the additive manufacturing process.

DETAILED DESCRIPTION

The present disclosure provides methods, computing device readable medium, devices, and systems having a dental attachment placement structure (also referred to herein as a dental attachment placement device, apparatus or template). Such solutions should make positioning, orienting, securing, and forming attachments easier and quicker, and can make the patient's experience better than use of past procedures.

One dental attachment placement apparatus includes a body having an attachment placement surface that is to be placed on an attachment affixing surface of a tooth and wherein the attachment placement surface includes a portion that is shaped to allow placement of an attachment at a particular position on the affixing surface of the tooth and a portion of the body having a contour that is shaped to correspond with a contour of an alignment surface of a tooth and when the contour of the body and the corresponding contour is aligned, the attachment is located at the particular position and can be secured to the affixing surface of the tooth.

In the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, the designators "M", "N", "P", "R", "S", "T", and "V", particularly with respect to reference numerals in the drawings, indicate that any number of the particular feature so designated can be included. As used herein, "a number of" a particular thing can refer to one or more of such things (e.g., a number of teeth can refer to one or more teeth).

The FIGS. herein follow a numbering convention in which the first digit or digits correspond to the drawing figure number and the remaining digits identify an element or component in the drawing. Similar elements or components between different figures may be identified by the use of similar digits. For example, 101 may reference element "01" in FIG. 1A, and a similar element may be referenced as 301 in FIG. 3A.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present disclosure, and should not be taken in a limiting sense.

FIG. 1A illustrates a front view of a dental attachment placement structure for placement of an attachment according to a number of embodiments of the present disclosure. In the embodiment of FIG. 1A, the apparatus 100 includes a body 101 having at least one surface shaped to conform to one or more of the contours of an exterior surface of a tooth. In the case of the embodiment of FIG. 1A, the body has multiple surfaces, (inner surfaces of portions 102-1 and 102-2), each shaped to conform to the multiple contours of an exterior surface of a tooth, and other surfaces will be discussed in more detail in FIG. 1B.

The body 101 also includes an attachment mounting structure 104 including the attachment 106, an aperture 110 to allow placement of the attachment 106 on the surface of a tooth, and a number of supports 108. The structure illustrated in FIG. 1A, allows the treatment professional to place the apparatus 100 onto the teeth of a patient to provide a more accurate position and orientation for the attachment 106, with respect to the tooth surface, during the securing of the attachment 106 to the surface of the tooth than previous techniques.

The securing of the attachment can be accomplished in any suitable manner. For example, the attachment can be cured to the tooth surface, for instance, by use of a light source, such as ultra-violet (UV) light source, which will bond the attachment material directly to the surface of the tooth. In some embodiments, an adhesive material can be applied to the back side of the attachment and the adhesive can be used to secure the attachment to the tooth surface.

In various embodiments, the apparatus can be designed to have one surface shaped to conform to one or more contours of an exterior surface of a tooth (e.g., a surface that conforms to a portion of the front surface of a tooth), such that when the two surfaces are aligned, their contours match, thereby indicating to the treatment professional that the apparatus has been placed correctly.

This correct placement can be with respect to the placement of the apparatus with respect to the tooth in one or more dimensions (e.g., up, down, right, left, rotationally, etc. with respect to the tooth surface upon which the attachment will be applied). If the apparatus is correctly placed, then the attachment will also be correctly placed with respect to the tooth surface.

As used herein, "positioning" is the locating of the attachment at a particular point on the surface of a tooth and "orienting" is the movement of the attachment in a manner that does not change its position on the surface of the tooth (e.g., a rotation of the attachment about an axis or movement of the attachment in one or more directions that does not change its position on the surface of the tooth). For example, an attachment can be positioned at a particular point on the surface of a tooth and then can be oriented by rotating it, for example, parallel to the tooth surface, or along an axis perpendicular to the surface of the tooth. Other angles of rotation can also be used to orient the attachment without changing the attachment's position.

Figure 1B:
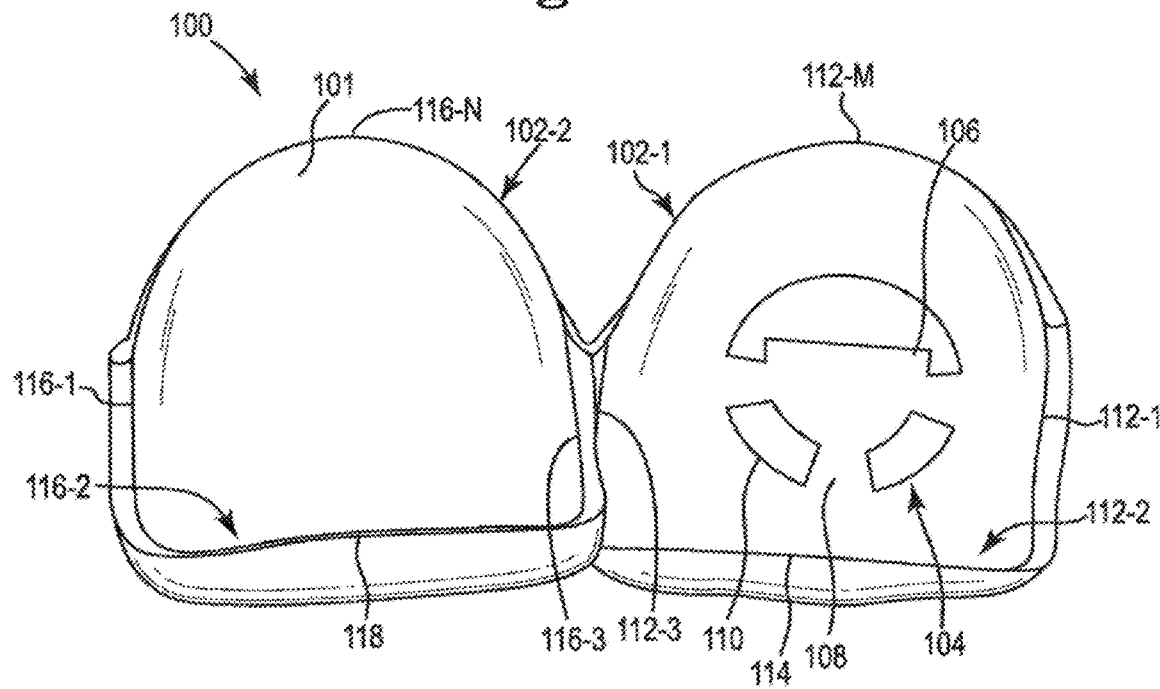
FIG. 1B illustrates a back view of the dental attachment placement structure of FIG. 1A.

In the embodiment of FIGS. 1A and 1B, the apparatus includes many surfaces that are shaped to conform to many contours of many exterior surfaces of multiple teeth (e.g., one or more contours of the front surface, side surfaces, edge surfaces, back surface, etc.).

Generally, the more surfaces used, the more accurate the positioning and/or orientation of the attachment, in relation to the tooth, can be to the desired correct placement. Also, when attaching multiple attachments, these surfaces can be used to accurately position and orient the attachments in relation to each other.

Once an attachment is placed on the tooth, it has to be secured to the tooth and the apparatus has to be removed. In some embodiments, such as that shown in FIGS. 1A and 1B, the apparatus can include one or more supports connecting the attachment to the body.

In such embodiments, the one or more supports can be made from a material that allows the support material 108 to be separated from the material of the attachment 106. For example, the support can be made from a material that can be broken at or near the location where the support and attachment are connected.

In some embodiments, the attachment between the support and the attachment can be released by a release agent, such as a chemical, heat, moisture, or other type of release agent. The release agent may, for example, dissolve a portion of the support and/or attachment in order to release the support and/or attachment from each other.

In various embodiments, the support and attachment can be fabricated from the same material, but the structure of the support can be such that it can be broken at a point to disconnect it from the attachment. Any suitable technique can be used to achieve the breaking or release of the support and/or attachment material in order to release the support from the attachment.

For example, the support structure may include a narrow section that is conducive to breaking at that location. In another embodiment, the support structure may include a scored section that is conducive to breaking at that location.

In various embodiments, the attachment can be mechanically mounted to the supports such that the attachment can be released from the supports once the attachment is secured to the surface of the tooth. This can be accomplished by any suitable releasable attachment structure. For example, one suitable structure is a groove located on each support and corresponding mating flanges on the attachment surface that can be slid out of the grooves to release the attachment from the supports.

FIG. 1B illustrates a back view of the dental attachment placement structure of FIG. 1A. In this view, the back side of the body 101 is shown including the back side of the attachment mounting structure 104 including the attachment 106 and supports 108, and the two inner surfaces of portions 102-1 and 102-2 of the body 101, each shaped to conform to the multiple contours of an exterior surface of a tooth are shown.

As used herein, a surface that is shaped to conform to a contour of an exterior surface of a tooth (i.e., an alignment surface) can be used to accurately position and/or orient the attachment on the tooth. For example, if surface of the apparatus is shaped to conform to a contour of the front surface of the tooth (e.g., surface 102-1 shown in FIG. 1A), then when the apparatus is pressed against the front surface of the tooth such that the contours of the tooth and the apparatus correspond to each other, the attachment will be correctly oriented with respect to the angle of the back side of the attachment to the surface of the tooth.

In the view shown in FIG. 1B, more surfaces shaped to conform to the multiple contours of an exterior surface of a tooth are shown than were visible in the view of FIG. 1A. As discussed above, if another surface is used, for example, a side surface 112-1, then the placement of the attachment can be more accurately accomplished with respect to its position and orientation.

For instance, when the side 112-1 is positioned along the corresponding side of the tooth such that their contours align, then the attachment should be the correct distance from the side of the tooth and will be correctly oriented with respect to the angle of the back side of the attachment to the surface of the tooth.

When more surfaces are utilized, the position and/or orientation of the attachment can be more precise. For example, the body 101 includes side surfaces 112-1, 112-3 of a first tooth, and side surfaces 116-1 and 116-3 of a second tooth. The body 101 also includes surfaces that are shaped to conform to the gingival line on a tooth 112-M and 116-N, and surfaces 112-2 and 116-2 that conform to the bottom edge of a tooth (and/or the bottom of the front and/or back side of the tooth).

Additionally, the embodiment of FIG. 1B includes a portion that conforms to the back side of the first tooth 114 and another portion that conforms to the back side of the second tooth 118. The use of such surfaces in conjunction with other surfaces can also allow for use of the corners of the teeth to be used to aid in positioning and/or orientation of an attachment. For example, the apparatus can be slid onto the tooth until the bottom edge of the tooth contacts the bottom edge 112-2 of the apparatus. When the front surface, the sides, corners, and bottom of the apparatus are aligned with their corresponding tooth surfaces, the attachment can be very precisely placed on its intended tooth surface.

Figure 1C:
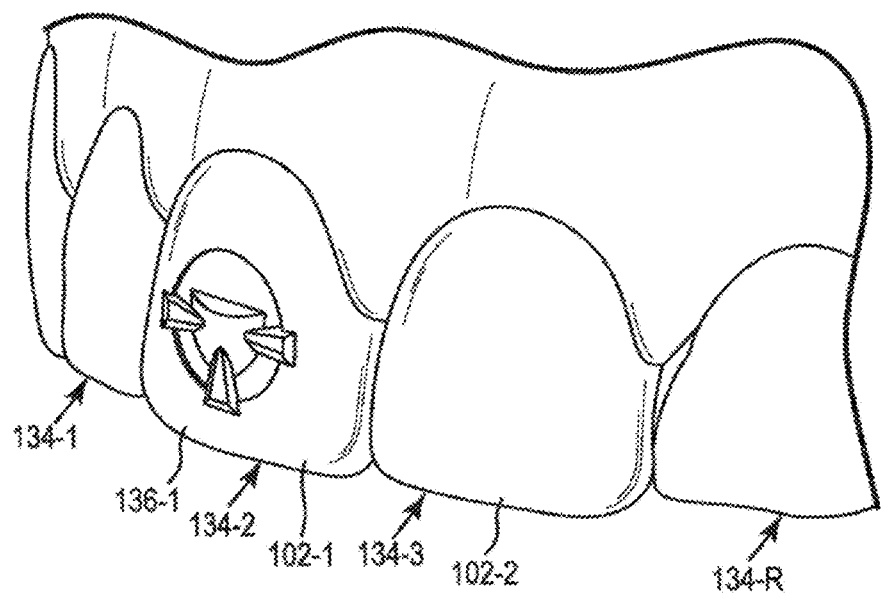
FIG. 1C illustrates a front view of the dental attachment placement structure of FIGS. 1A and 1B positioned on a tooth of a patient.

FIG. 1C illustrates a front view of the dental attachment placement structure of FIGS. 1A and 1B positioned on a tooth of a patient. In the view of FIG. 1C, several teeth and the gingiva of a patient are illustrated, including teeth 134-1, 134-2, 134-3, and 134-R. The apparatus 100 has been placed on the two of the teeth (134-2 and 134-3) such that the inner surfaces of portions 102-1 and 102-2 are placed in contact with tooth surfaces 136-1 and 136-2, respectively.

Figure 1D:
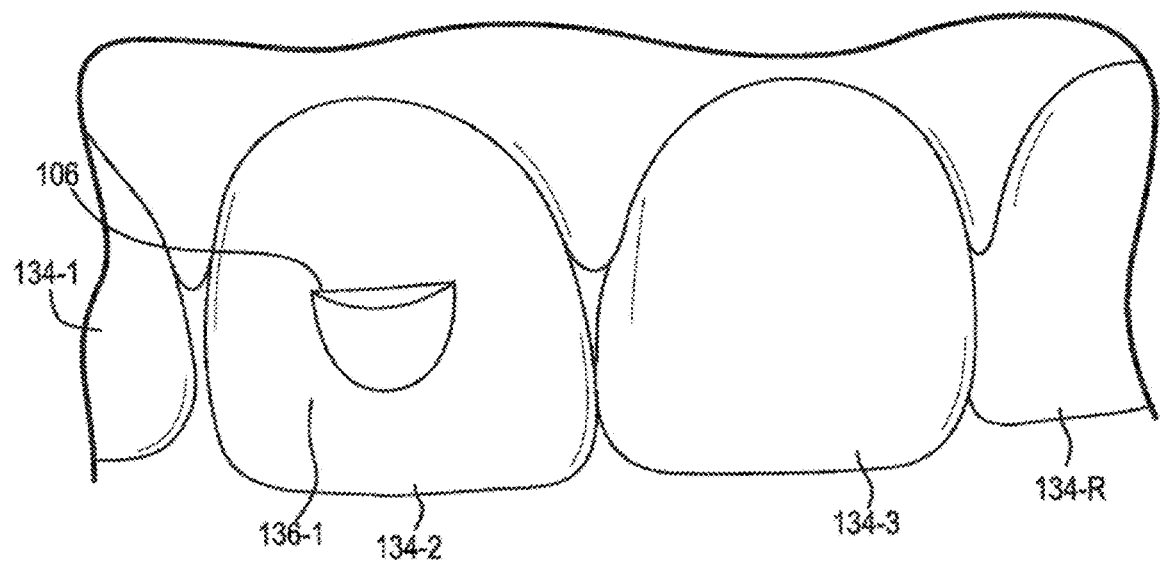
FIG. 1D illustrates a front view of a dental attachment attached to a tooth of a patient utilizing the dental attachment placement structure of FIGS. 1A and 1B.

FIG. 1D illustrates a front view of a dental attachment attached to a tooth of a patient utilizing the dental attachment placement structure of FIGS. 1A and 1B. The resultant placement has been accomplished via the attachment mounting structure illustrated in FIGS. 1A and 1B.

In this manner, the attachment 106 has been correctly positioned on the surface 136-1 of tooth 134-2 and oriented such that it can provide the desired force to the teeth of the patient (e.g., 134-1, 134-2, 134-3, 134-R, and/or other teeth of the patient) when combined with the dental appliance that will attach to the attachment.

In some embodiments, such as that shown in FIGS. 1A-1C, the attachment and/or the dental attachment placement structure, can be fabricated through direct fabrication, such as via a three-dimensional (3D) printer). This can be beneficial as the treatment profession can print these components at their location rather than at a manufacturing facility. Further, these components do not need to be formed around a mold of teeth when direct printed, this can save in manufacturing costs due to less time, materials, and employee time in creating such models and removing the components from the models.

Direct fabrication also allows for the design to be more easily and readily changed because the design can be altered via a computing device and direct printed from the modified design stored in memory on the computing device or a connected network or memory. Further, direct fabrication allows for creation of components of different material without substantial changes to equipment that may be used at a manufacturing facility, among other benefits.

For example, a dental attachment placement apparatus can be formed by printing, using a three-dimensional printing apparatus, an attachment, out of an attachment material and printing, using a three-dimensional printing apparatus, a dental attachment placement structure, connected to the attachment to hold the attachment in a particular position. In some embodiments, the dental attachment placement structure and the attachment can be fabricated from the same material. Material, examples include: polymers such as, polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, or a combination thereof, which can be used to make dental appliances, such as aligners, or curable composite (e.g., a resin material) that can be used to attach orthodontic appliances to teeth or create orthodontic structures.

In some embodiments, the dental attachment placement structure can be fabricated out of a second material that is different than the attachment material. For example, the attachment can be fabricated from a composite material and the dental attachment placement structure can be fabricated from a polymer, such as those discussed above. In some embodiments, the attachment and dental attachment placement structure can be constructed such that they are connected to each other. As discussed herein, this connection can be designed to be cut, broken, or otherwise released to allow the dental attachment placement structure to be removed while the attachment is positioned on the tooth.

As discussed herein, one other benefit to direct fabrication is that one or more surfaces that will be used to attach the attachment to a tooth and/or to position an attachment with respect to one or more teeth can be fabricated with surfaces that will mate with the corresponding surface of the one or more teeth to accomplish these functionalities (attachment and/or positioning of the attachment). This can be accomplished by virtual design of these surfaces and then using these virtual designs to fabricate the attachment and/or the dental attachment placement structure directly.

Figure 2:
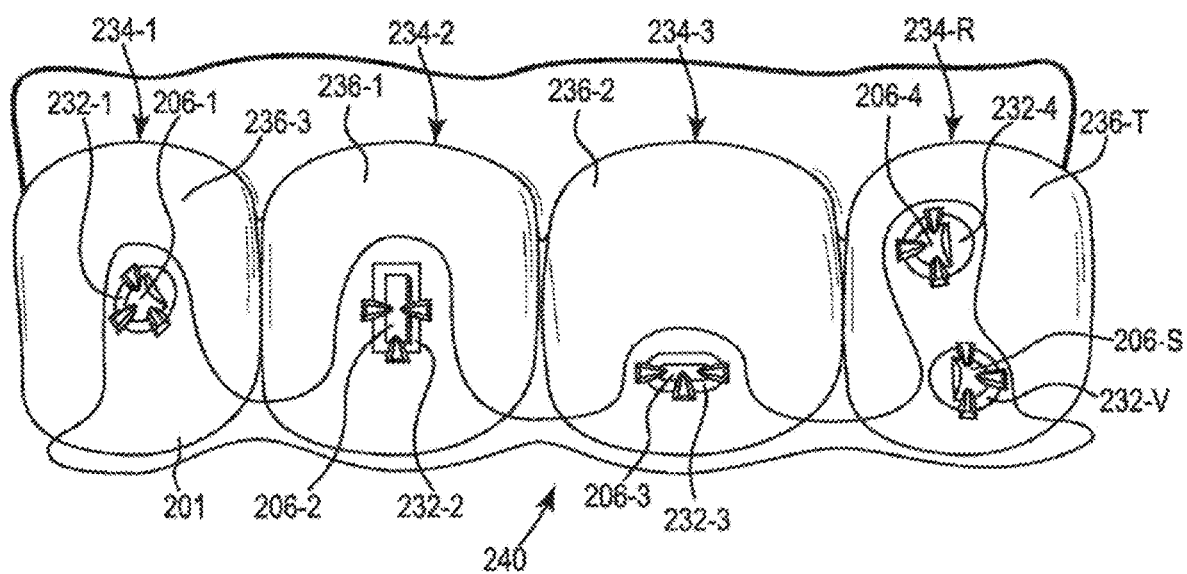
FIG. 2 illustrates a front view of a dental attachment placement structure having multiple attachment placement components provided on the structure according to a number of embodiments of the present disclosure.

FIG. 2 illustrates a front view of a dental attachment placement structure having multiple attachment placement components provided on the structure according to a number of embodiments of the present disclosure. In the embodiment of FIG. 2, the body 201 of apparatus 240 has an attachment mounting structure has an aperture 232-1 with an attachment 206-1 placed in the aperture. Through use of the apparatus 240, the attachment is in the desired position and orientation for securing to the surface 236-3 of tooth 234-1.

Attachments 206-2, 206-3, 206-4, and 206-S are also positioned in apertures 232-2, 232-3, 232-4, and 232-V on surface 236-1 of tooth 234-2, 236-2 of tooth 234-3, and 236-T of tooth 234-R. In such an embodiment, one or more of the teeth can have multiple attachments affixed thereon.

In order to save fabrication time and materials cost, the apparatus may include multiple attachment locations and only some may be used at any given time. In such applications, the apparatus 240 can, for example, be used to affix attachment 206-2 at one point in time and can be reused to attach 206-S at aperture 232-V or an attachment at one or more of the other locations on the apparatus (e.g., apertures 232-1, 232-2, and/or 232-3) at a different time.

Another feature of the embodiment of FIG. 2, is that in order to save fabrication time and materials cost, an apparatus with less material can be used. In such embodiments, the apparatus can be designed such that a reduced amount or minimized amount of material is used in order to properly position the attachment at a desired location.

Further, in prior concepts, treatment professionals may only have had access to a few, standardized attachment shapes. In this manner, the options for treatment may have been restricted based on the limited forces that could be provided by the standardized attachments. If any other attachment shape was desired, the treatment professional could file or grind the attachment surfaces to change its shape, but a treatment plan would not take these modifications into account and therefore the actual result would be different than the treatment plan result. This resulted in additional time spent in getting the proper shape, misshapen attachments that did not fit or function correctly, and other issues.

Although embodiments of the present disclosure can be used to form such standardized attachments, since the apparatus can be fabricated to be used with a specific patient's teeth positioning, specialized attachments can also be designed and can be made available to a treatment professional.

Such specialization can also, for example, include the size of the attachment, shape of the attachment, and other suitable specialized characteristics. Accordingly, the patient will be able to get a more customized treatment based on use of such embodiments. This can allow the apparatus to be specialized to the patient, but not be onerous on the treatment professional who, for example, may not have attachment design skills or capabilities.

In some embodiments, the treatment professional may also select one or more attachment materials or attachment types and/or select the location upon which they should be applied. Such embodiments can allow further customization of the apparatus and can be taken into account when the manufacture of the attachment templates are created. Further, in various embodiments, this customization can be made for each appliance (or for multiple appliances) in a set of appliances of a treatment plan.

In some embodiments, a computing device (such as that described in relation to FIG. 10 below) can be used to create a treatment plan to move the teeth of a patient in an incremental manner to improve their position within the patient's mouth. Other dental appliances can be created to aid patients with sleep apnea or medication delivery, among other types of appliances.

A computing device can be used to create such devices or molds to fabricate such dental appliances, attachments, and/or attachment placement structures. In some embodiments, a computing device can be used to virtually model such dental appliances, attachments, and/or attachment placement structures.

For example, through use of a treatment plan and/or virtual modeling, a dental appliance (e.g., an aligner for aligning teeth or jaws of a patient) or attachment placement structure can be made, for example, by thermal-forming a sheet of plastic over a physical dental mold. The physical dental mold, for instance, can represent an incremental position to which a patient's teeth are to be moved and can include attachment shapes formed in the mold.

In this manner, one or more surfaces of the dental appliance can engage with one or more surfaces of the one or more attachments (when the finished dental appliance is placed in the patient's mouth with the actual attachments). By having the attachments on the mold, the dental appliance is formed with the surfaces that will interact with the attachments.

The physical dental mold can be manufactured, for example, by downloading a computer-aided design (CAD) virtual dental model to a rapid prototyping process, such as, for example, a computer-aided manufacturing (CAM) milling, stereolithography, and/or photolithography process.

The dental mold (e.g., set of molded teeth and/or jaw) can be created from a virtual model of a number of teeth and/or jaw of a patient. A virtual model, for example, can include an initial virtual dental model and/or intermediate virtual dental model (wherein the teeth of the patient have been moved with respect to their actual physical position). A dental mold can be formed in accordance with a unique treatment file that, for example, identifies a patient, a stage of a treatment plan, the virtual model of the number of teeth and/or jaw, and/or whether the dental mold is of the upper and/or lower dental arch.

In some computing device system processes, a treatment file can be accessed by a rapid prototyping apparatus machine or direct fabrication device, such as a SLA or 3D printing machine, to form and/or create the dental mold. As discussed above, the result of the dental mold can include a set of molded teeth.

The set of molded teeth can include at least a replica of a number of teeth of the patient, but can also include other features such as gingival and jaw structures, among others. The dental mold can be used to make a dental appliance, for example, by creating a negative impression of the dental mold using polymeric sheets of material and vacuum forming the sheets over the dental mold, as discussed above.

For instance, a dental appliance or attachment placement structure can be formed by layering a thermoformable sheet of material and/or multiple sheets of one or more materials over the dental mold. The materials can include a polymeric material, for instance.

Generally, the dental appliance or attachment placement structure is produced and/or formed by heating the polymeric thermoformable sheet and vacuum or pressure forming the sheet over the dental mold (e.g., a number of molded teeth). A dental appliance or attachment placement structure can, for example, include a negative impression of the dental mold. Such molding techniques can be used to create the dental appliances and attachment placement structures.

Figure 3A:
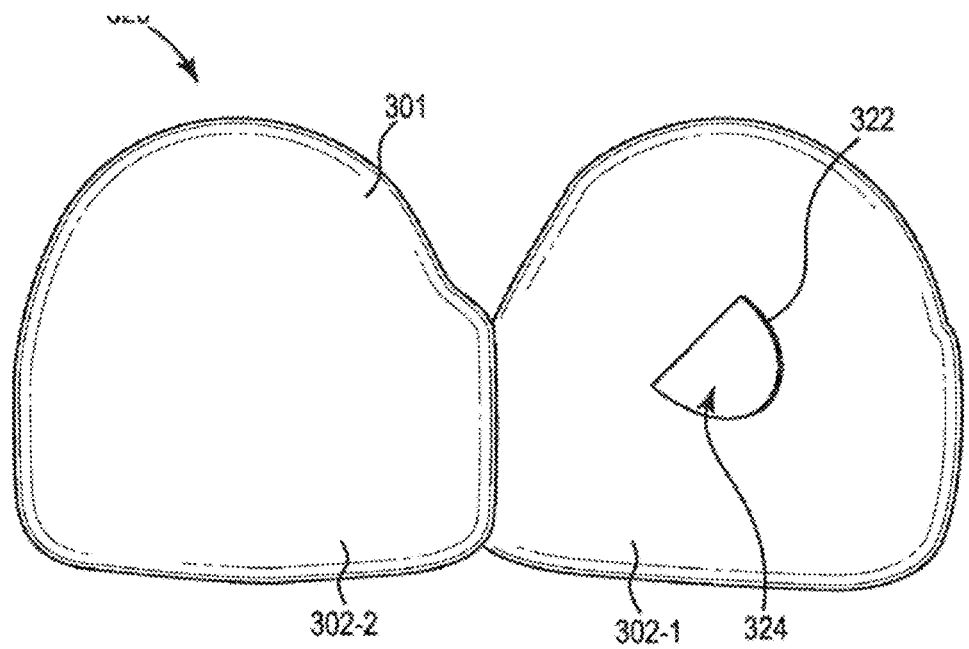
FIG. 3A illustrates a front view of a dental attachment placement structure for etching a tooth according to a number of embodiments of the present disclosure.
Figure 3B:
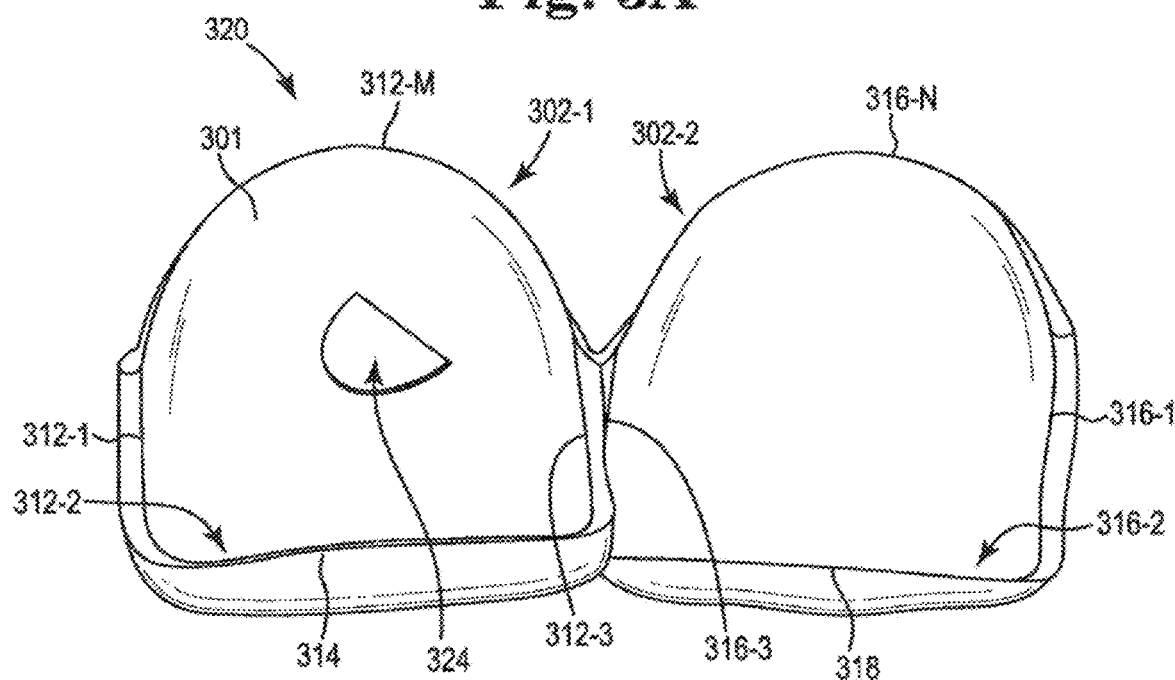
FIG. 3B illustrates a back view of the dental attachment placement structure of FIG. 3A.

FIGS. 3A and 3B illustrate another apparatus embodiment that can be used in the placement of an attachment on the surface of a tooth. FIG. 3A illustrates a front view of a dental attachment placement structure for etching a tooth according to a number of embodiments of the present disclosure. FIG. 3B illustrates a back view of the dental attachment placement structure of FIG. 3A.

In some instances, it may be beneficial to prepare the surface of the tooth for adhering of a dental attachment thereto. It is ideal if the preparation of the surface of the tooth takes place only at the area in which the attachment is to be attached.

Such preparation can include etching of the surface of the tooth which improves the adhesion between the tooth surface and the attachment or adhesive material used to adhere the attachment to the tooth. In embodiments such as that illustrated in FIGS. 3A, 3B, and 4, the dental attachment placement structure can be utilized as an etch mask that allows the etching to occur in the area to which the attachment is to be placed without etching other surfaces not at the attachment area.

Similar to the apparatus of FIG. 1A, in the embodiment of FIG. 3A, the apparatus 320 includes a body 301 having at least one surface shaped to conform to one or more of the contours of an exterior surface of a tooth. The body has multiple surfaces, 302-1 and 302-2, each shaped to conform to the multiple contours of an exterior surface of a tooth, and other surfaces will be discussed in more detail in FIG. 3B.

In the embodiment of FIG. 3A, the body 301 includes an aperture 324 formed in portion 302-1. The aperture 324 has a specific shape 322 that, when the apparatus 320 is placed correctly on the tooth, will allow the attachment area (i.e., the area at which the attachment will be attached) to be etched without etching other areas of the tooth. The structure illustrated in FIG. 3A, allows the treatment professional to place the apparatus 320 onto the teeth of a patient to provide a mask for purposes of etching in a more accurate position and orientation for placement of an attachment (e.g., the shape of aperture 324 would be appropriate for an attachment such as that illustrated in FIG. 1C (106)), with respect to the tooth surface, than previous techniques.

Similar to FIG. 1B, the embodiment illustrated in FIG. 3B includes multiple surfaces that can be used to assist in the alignment of the etch mask with respect to the intended surface of the tooth to which the attachment is to be secured. For example, one or more of surfaces: 312-1, 312-2, 312-3, 312-M, 314, 316-1, 316-2, 316-3, 316-N, 318, and/or inner surfaces of portions 302-1 and/or 302-2 can be utilized in various embodiments of the present disclosure.

In such an embodiment, the surface of the tooth can be etched with an etching material that can, for example be brushed onto the surface of the tooth by the treatment professional through the aperture 324. In the embodiment of FIGS. 3A and 3B, the shape 322 of the aperture 324 is sized and shaped to be as large or slightly larger or smaller than the attachment that is to be placed on the tooth. However, in some embodiments, the size and/or shape of the aperture may be different than the surface of the attachment that is to be placed in the tooth.

When shaped like the surface of the attachment that is to be placed in the tooth the treatment professional can align the shape of the attachment with the shape of the etched area such that the attachment is at the correct location and in the correct orientation with respect to the surface of the tooth.

Although a particular attachment shape and aperture shape are illustrated, any suitable attachment shape and corresponding aperture shape can be utilized in the embodiments of the present disclosure.

The present example also includes a portion of the body (e.g., surfaces 212-1, 212-2, 212-3, 212-M, and/or the inner surface of 202-1) having a contour that is shaped to correspond with a contour of an alignment surface of a tooth (e.g., front surface, back surface, side surface, edge surface, etc.) and when the contour of the body and the corresponding contour is aligned, the etching area is located at the particular position.

In another example embodiment, a dental attachment placement apparatus includes a body that has an attachment mounting structure. The body also includes a surface (e.g., surfaces 212-1, 212-2, 212-3, 212-M, and/or the inner surface of 202-1) having a contour that is shaped to correspond with a contour of an alignment surface (e.g., front surface, back surface, side surface, edge surface, etc.) of a tooth and when the contour of the body and the corresponding contour of the tooth are aligned, a dental attachment, when placed in the attachment mounting structure, is located at the particular position with respect to an exterior surface of the tooth.

In some embodiments, the body includes at least a second surface (e.g., inner surface of 102-2) shaped to correspond with a contour of an alignment surface of a second tooth. Further, the body can include a second attachment mounting structure (e.g., as shown in FIGS. 3, 332-1 and 332-P) for attaching a second dental attachment to an exterior surface of the second tooth (e.g., 434-3).

Another example embodiment provides a dental attachment placement apparatus having a body that includes an attachment mounting structure having an aperture that allows an attachment to be placed through the body and onto an exterior surface of the tooth. The body also includes a surface having a contour that is shaped to correspond with a contour of an alignment surface of a tooth and when the contour of the body and the corresponding contour of the tooth are aligned, a dental attachment, when placed in the aperture, is located at the particular position with respect to an exterior surface of the tooth.

As illustrated in FIGS. 1B and 2B, in some embodiments, the body includes multiple surfaces having contours that are shaped to correspond with contours of multiple alignment surfaces of a tooth. In some such embodiments, when the contours of the body and the corresponding contours of the tooth are aligned, they frictionally hold the apparatus in place against the tooth during securement of the attachment. For example, the inner surface of 102-1 and inner surface 114 can engage the corresponding surfaces of the tooth to hold the apparatus in place while the attachment is being placed and/or secured. This can be beneficial as it, for example, can allow the treatment professional to use both hands to address other tasks while the attachment is in position to be secured or is being secured.

Figure 3C:
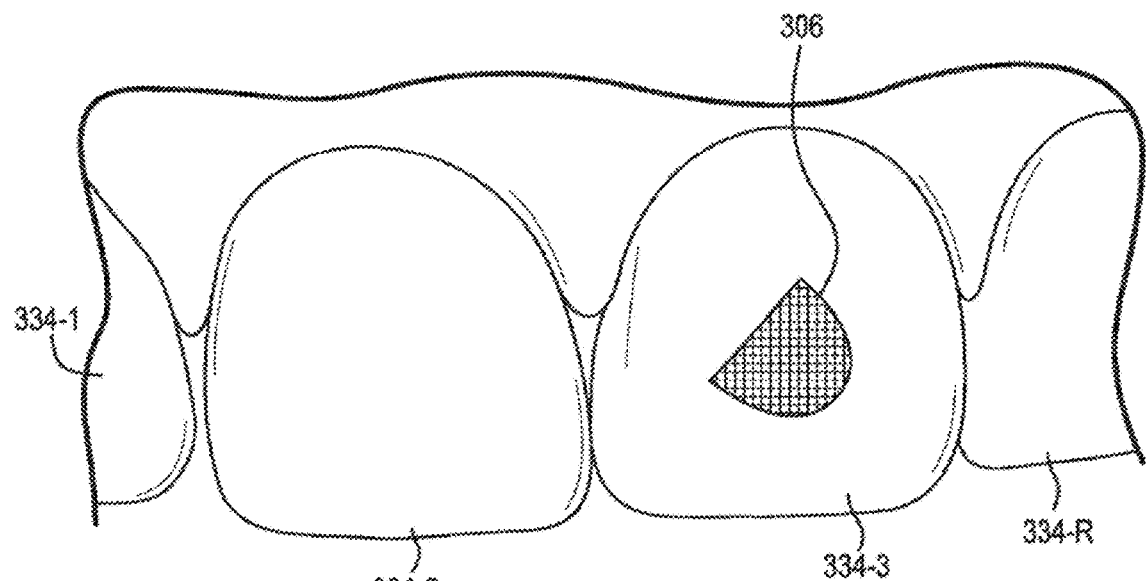
FIG. 3C illustrates a front view of an etched area of a tooth of a patient that has been etched utilizing the dental attachment placement structure of FIGS. 3A and 3B.

In some embodiments, the body can include multiple attachment mounting structures each having an aperture that allows an attachment to be placed through the body and onto an exterior surface of the tooth. For example, in the embodiment shown in FIG. 4, the apparatus 401 includes multiple attachment mounting structures each having apertures (e.g., 432-4 and 432-V) that allows an attachment (406-2 and 406-S) to be placed through the body and onto the exterior surface 436-T of tooth 434-R. FIG. 3C illustrates a front view of an etched area of a tooth of a patient that has been etched utilizing the dental attachment placement structure of FIGS. 3A and 3B. The resultant etched area 306 has been accomplished via the attachment mounting structure illustrated in FIGS. 3A and 3B.

In this manner, the surface of the tooth can be etched at an area that is large enough to secure an attachment, but not un-necessarily large. Also, in this manner, an attachment can be correctly positioned on the surface of tooth 334-3 and oriented such that it can provide the desired force to the teeth of the patient (e.g., 334-1, 334-2, 334-3, 334-R, and/or other teeth of the patient) when combined with the dental appliance that will attach to the attachment.

Figure 4:
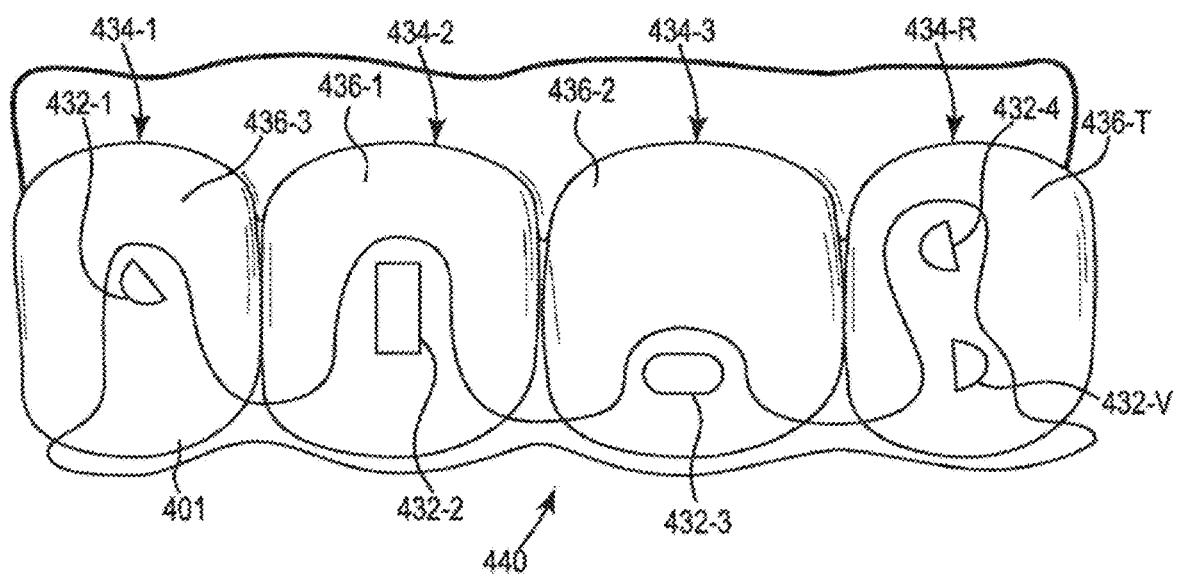
FIG. 4 illustrates a front view of a dental attachment placement structure having multiple attachment placement components provided on the structure according to a number of embodiments of the present disclosure.

FIG. 4 illustrates a front view of a dental attachment placement structure having multiple attachment placement components provided on the structure according to a number of embodiments of the present disclosure. In the embodiment of FIG. 4, the body 401 of apparatus 440 has an attachment mounting structure that includes multiple apertures 432-1, 432-2, 432-3, 432-4, and 432-V that can be used to etch portions of teeth 434-1, 434-2, 434-3, 434-R on surfaces 436-1, 436-2, 436-3, and 436-T.

In order to save fabrication time and materials cost, the apparatus may include multiple etch locations and only some may be used at any given time. In such applications, the apparatus 440 can, for example, be used to etch a location on a tooth at one point in time and can be reused to etch another location on a tooth at another point in time.

Similar to the embodiment of FIG. 2, another feature of the embodiment of FIG. 4, is that in order to save fabrication time and materials cost, an apparatus with less material can be used. In such embodiments, the apparatus can be designed such that a reduced amount or minimized amount of material is used in order to properly etch a surface of a tooth at a desired location.

Figure 5A:
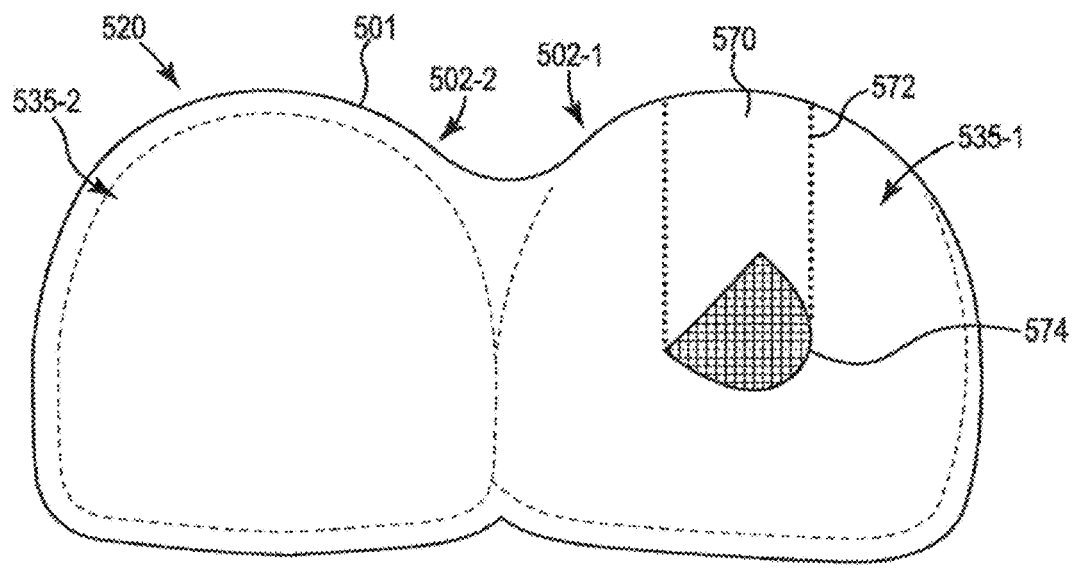
FIG. 5A illustrates a front view of another dental attachment placement structure for etching a tooth according to a number of embodiments of the present disclosure.

FIG. 5A illustrates a front view of another dental attachment placement structure for etching a tooth according to a number of embodiments of the present disclosure. The embodiment of FIG. 5A is similar to that of FIG. 3A.

In the embodiment of FIG. 5A, the apparatus 520 includes a body 501 having at least one surface shaped to conform to one or more of the contours of an exterior surface of a tooth. The body has multiple surfaces, 502-1 and 502-2, each shaped to conform to the multiple contours of an exterior surface of a tooth. Some embodiments may have one or more other surfaces similar to those shown in FIG. 3B to aid in the alignment of the dental attachment placement structure with the tooth. In the example of FIG. 5A, the surface 502-1 is positioned on tooth surface 535-1 and surface 502-2 is positioned on tooth surface 535-2.

In the embodiment illustrated in FIG. 5A, the dental attachment placement structure allows for the surface of the tooth to be etched through the aperture. The etched area is illustrated at 574. Adjacent to the aperture is a releasable portion 570.

The releasable portion can be released by any suitable release mechanism. For example, a series of perforations can be cut into the body 501 to allow the portion 570 to be torn away from the rest of the body 501. This can allow the dental attachment placement structure to also be used as a guide for the placement of an attachment to be placed in the correct position.

For example, once the area is etched as shown in FIG. 5A, an attachment can be secured to the etched area. If an attachment has a surface that is shaped to correspond to the shape of the aperture, then the edges of the aperture can be used as a guide to the correct positioning of the attachment. Once secured, the releasable portion 570 can be removed and the rest of the body 501 can be removed from the teeth while the attachment remains attached to the tooth surface 535-1.

Figure 5B:
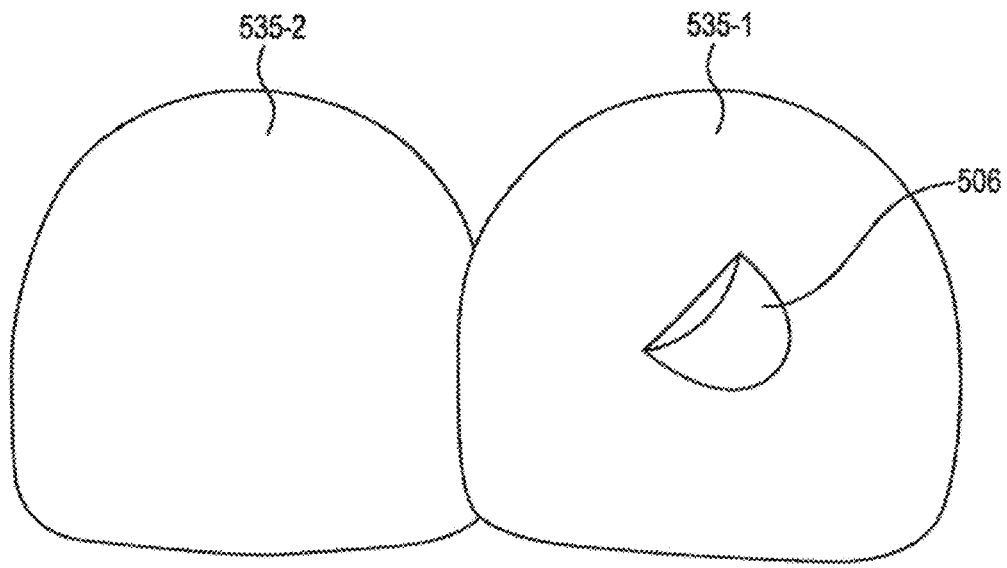
FIG. 5B illustrates front view of a dental attachment attached to a tooth of a patient utilizing the dental attachment placement structure of FIG. 5A.

FIG. 5B illustrates front view of a dental attachment attached to a tooth of a patient utilizing the dental attachment placement structure of FIG. 5A. This figure includes a tooth surface 535-1 of a first tooth and a tooth surface of a second tooth 535-2, and an attachment 506 mounted on the surface 535-1.

As can be seen from this figure, the attachment 506 is positioned and oriented on the surface of the tooth 535-1 in the same position and orientation as the etched area 574, thereby allowing better adhesion of the attachment 506 to the surface of the tooth 535-1. This is because the attachment was placed in the aperture of body 501 while it was positioned on tooth surfaces 535-1 and 535-2, then removed after the attachment 506 was adhered to etched area 574.

Figure 6A:
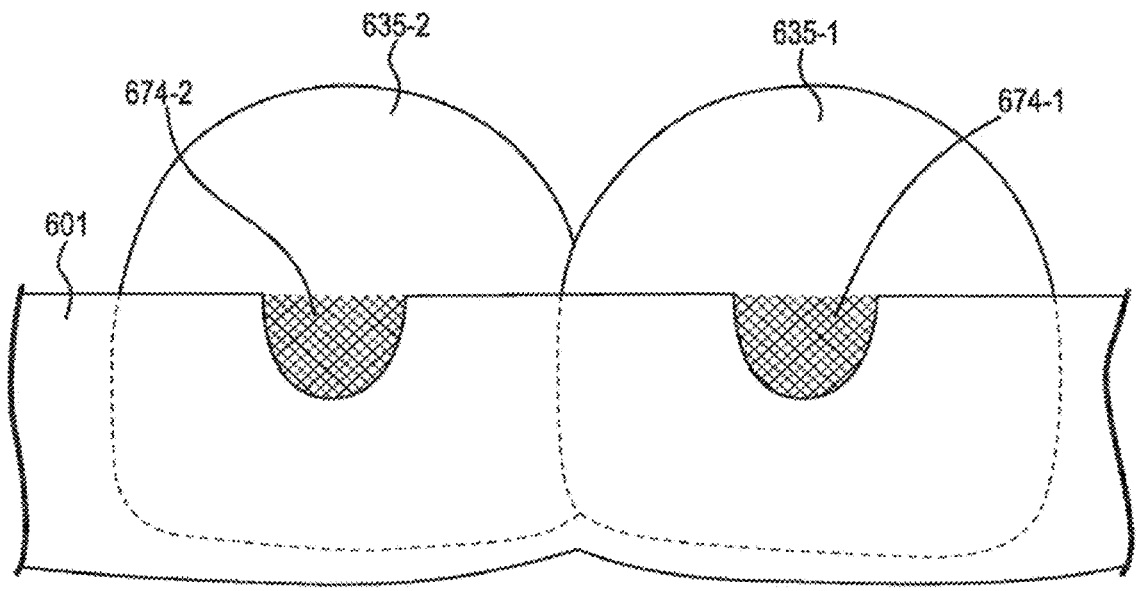
FIG. 6A illustrates a front view of another dental attachment placement structure for etching a tooth according to a number of embodiments of the present disclosure.

FIG. 6A illustrates a front view of another dental attachment placement structure for etching a tooth according to a number of embodiments of the present disclosure. FIG. 6A illustrates an embodiment wherein the body 601 of the dental attachment placement structure has apertures that do not fully surround the area to be etched. In such embodiments, the body can be used as a guide for what area is to be etched (e.g., areas 674-1 and 674-2), and as a guide to placement of one or more attachments (e.g., 606-1 and 606-2), but also allows for removal of the body 601, once the attachment has been secured to the surface of the tooth (e.g., 635-1 and/or 635-2).

Figure 6B:
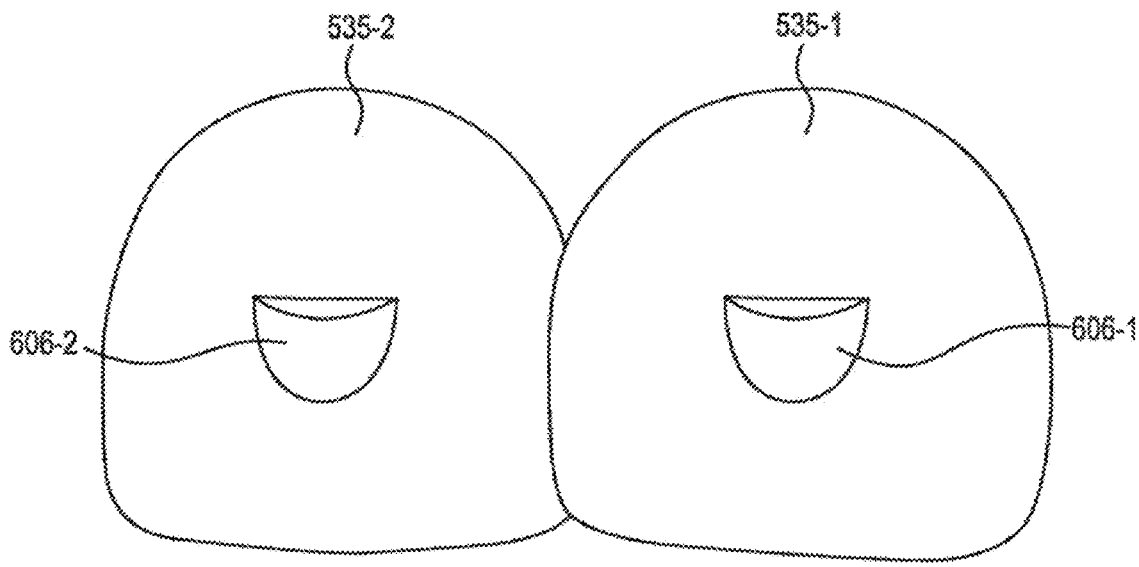
FIG. 6B illustrates front view of multiple dental attachments attached to multiple teeth of a patient utilizing the dental attachment placement structure of FIG. 6A.

For instance, FIG. 6B illustrates front view of multiple dental attachments attached to multiple teeth of a patient utilizing the dental attachment placement structure of FIG. 6A. This figure includes a tooth surface 635-1 of a first tooth and a tooth surface of a second tooth 635-2, and attachments 606-1 and 606-2 mounted on the surfaces 635-1 and 635-2, respectively.

As can be seen from FIG. 6B, the attachments 606-1 and 606-2 are positioned and oriented on the surface of the teeth 635-1 and 635-2 in the same position and orientation as the etched areas 674-1 and 674-2, thereby allowing better adhesion of the attachments 606-1 and 606-2 to the surface of the teeth 635-1 and 635-2. This is because the attachment was placed in the apertures of body 601 while it was positioned on tooth surfaces 635-1 and 635-2, then removed after the attachments 606-1 and 606-2 were adhered to etched areas 674-1 and 674-2.

Figure 7A:
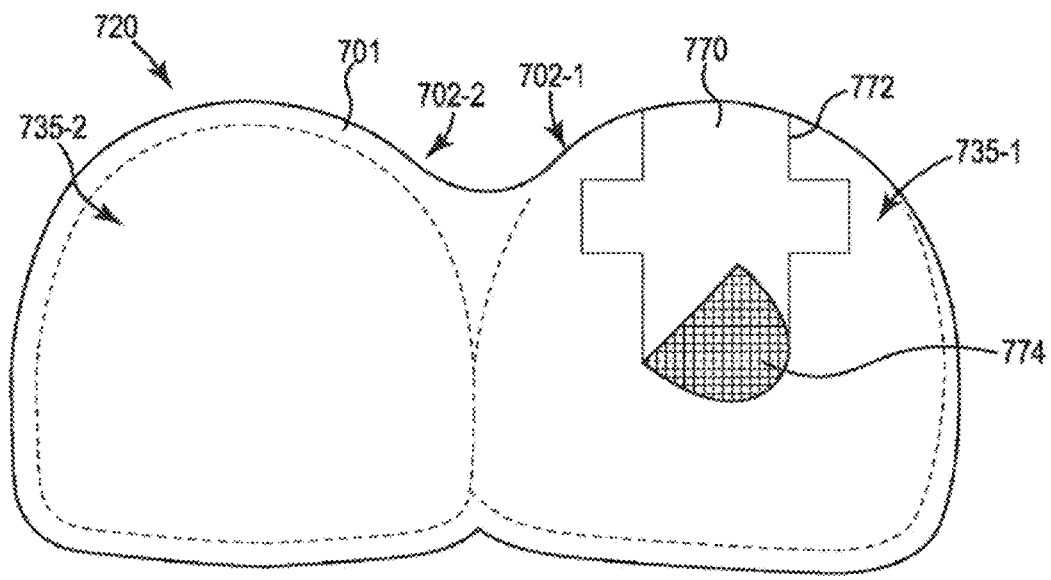
FIG. 7A illustrates a front view of another dental attachment placement structure for etching a tooth according to a number of embodiments of the present disclosure.

FIG. 7A illustrates a front view of another dental attachment placement structure for etching a tooth according to a number of embodiments of the present disclosure. The embodiment of FIG. 7A is similar to that of FIG. 5A.

In the embodiment of FIG. 7A, the apparatus 720 includes a body 701 having at least one surface shaped to conform to one or more of the contours of an exterior surface of a tooth. The body has multiple surfaces, 702-1 and 702-2, each shaped to conform to the multiple contours of an exterior surface of a tooth.

As with other embodiments discussed herein, some embodiments may have one or more other surfaces similar to those shown in FIG. 3B to aid in the alignment of the dental attachment placement structure with the tooth. In the example of FIG. 7A, the surface 702-1 is positioned on tooth surface 735-1 and surface 702-2 is positioned on tooth surface 735-2 to aid in positioning and/or orientation of the dental attachment placement structure with respect to the tooth to which an attachment is to be attached and thereby the positioning and/or orientation of the attachment to the tooth.

In the embodiment illustrated in FIG. 7A, the dental attachment placement structure allows for the surface of the tooth to be etched through the aperture. The etched area is illustrated at 774. Adjacent to the aperture is a removable portion 770.

The removable portion can be held in place by any suitable mechanism. For example, the removable portion can be shaped like a puzzle piece that mates with the rest of the body 701 in a particular orientation based on the removable portion 770 having an irregular shape. As used herein, an irregular shape is a shape that can only be positioned in one way with the rest of the body 501 such that the aperture has a desired shape for etching and/or positioning of an attachment therein. This can allow the dental attachment placement structure to be used for etching of the surface of a tooth and/or to be used as a guide for the placement of an attachment to be placed in the correct position.

For example, once the area is etched as shown in FIG. 7A, an attachment can be secured to the etched area. If an attachment has a surface that is shaped to correspond to the shape of the aperture, then the edges of the aperture can be used as a guide to the correct positioning of the attachment. Once secured, the removable portion 770 can be removed and the rest of the body 701 can be removed from the teeth while the attachment remains attached to the tooth surface 735-1.

In some embodiments, the edges of the removable portion and the edges on the body that correspond to the edges of the removable portion can be slanted such that when the removable portion is positioned into the rest of the body, it can be held in place. This can allow the treatment professional the ability to use their hands to do other things without having to hold the removable portion in place.

Also, in embodiments such as that shown in FIG. 7A, the apparatus can be positioned to accomplish etching (with the removable portion in place). The removable portion can be removed once the etch material and has been applied. Then, the removable portion can be repositioned with the rest of the body for securing of an attachment to the tooth. Once the attachment is secured to the tooth, the removable portion can be removed again to allow for removal of the apparatus for the patient's mouth without having to pull a portion of the apparatus over the attachment.

Figure 7B:
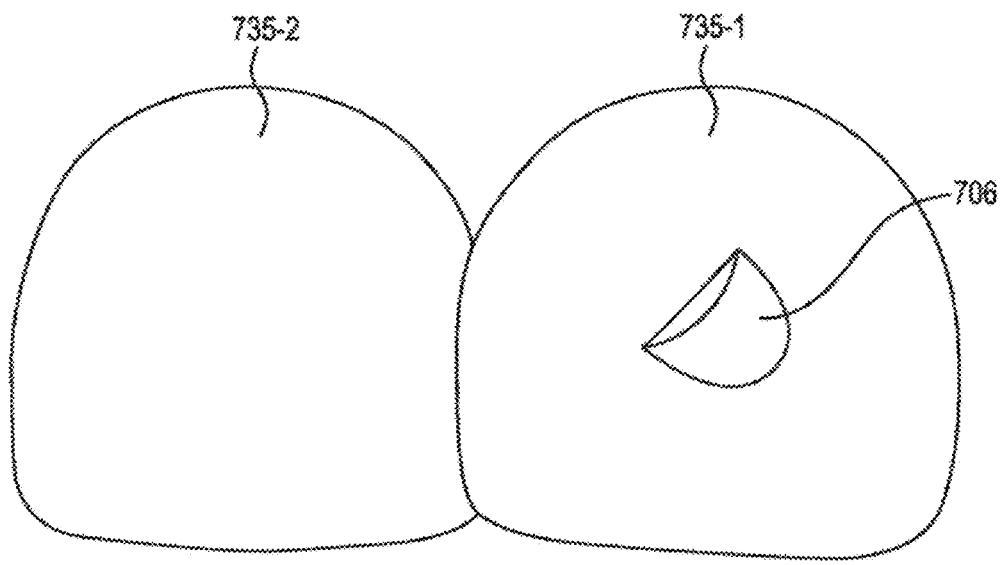
FIG. 7B illustrates front view of a dental attachment attached to a tooth of a patient utilizing the dental attachment placement structure of FIG. 7A.

FIG. 7B illustrates front view of a dental attachment attached to a tooth of a patient utilizing the dental attachment placement structure of FIG. 7A. This figure includes a tooth surface 735-1 of a first tooth and a tooth surface of a second tooth 735-2, and an attachment 706 mounted on the surface 735-1.

As illustrated in this figure, the attachment 706 is positioned and oriented on the surface of the tooth 735-1 in the same position and orientation as the etched area 774, thereby allowing better adhesion of the attachment 706 to the surface of the tooth 735-1. As with the embodiment of FIGS. 5A and 5B, this is because the attachment was placed in the aperture of body 701 while it was positioned on tooth surfaces 735-1 and 775-2, then removed after the attachment 706 was adhered to etched area 774.

FIGS. 8A-10C provide three embodiments that each include different support structures that make the connection between the body of the dental attachment placement structure and the attachment. These embodiments may each have benefits for some implementations and those differences and their benefits are discussed below.

As shown and described in the embodiments of FIGS. 8A-10C, the attachment is located within an aperture and the dental attachment placement structure includes at least one support connecting the attachment to the body. As can be seen from the embodiment of FIG. 8C, the attachment 806 can be connected to the one or more supports 808. The direct connection can be arched as shown to reduce or eliminate contact of the support to the surface of the tooth.

Such an arch may be beneficial, for example, because the treatment professional may not have to maneuver a detachment tool as close to the tooth as an embodiment where the support or the connection between the support and the attachment touch the tooth surface. In some such embodiments, the support can be connected to the attachment such that it can be released from the attachment.

For example, in some embodiments, the junction between the attachment and the support can include a feature to assist in the detachment of the attachment from the support. This feature can be located at or near the transition between the support material and the attachment material.

The feature can, for example, be a physical feature provided at the junction, such as one or more perforations, a portion that is thinner than the rest of the support and/or attachment, or a different material than the attachment and/or the support, among other attachment separation structures discussed herein. The feature can also be the use of a particular material at the junction that allows for a stimulant to be applied to that material that allows the attachment to be more easily removed. Such materials could, for example, make the material more brittle, thereby allowing it to be more easily broken, or cause the material to dissolve or disintegrate. Examples, of stimulants include wavelengths of light, such as UV, or chemical materials that cause the above affects based on interaction with the support material at the junction between the attachment and the one or more supports.

Once the attachment 806 is separated from the body 801, the attachment will remain on the tooth (e.g., attachment is affixed via adhesive to the surface of the tooth) during a portion or all of one or more treatment periods and the dental attachment placement structure body will be removed from the teeth of the patient. For example, this can be accomplished by lifting parts of the body over the attachment or by cutting/breaking the body into pieces and removing it in that manner.

The embodiment also includes a dental attachment placement structure, connected to a dental attachment to hold the attachment in a particular position. A portion of the body has a contour that is shaped to correspond with a contour of an alignment surface of a tooth such that when the contour of the body and the corresponding contour of the tooth are aligned, the aperture is located over the particular position on the surface of the tooth.

The attachment placement surface can include the portion of the body that is shaped to conform to corresponding contours of an alignment surface of the tooth. As stated herein, the alignment surface of the tooth is any shape on the surface of the tooth that can be used in connection of the attachment placement surface to more precisely position an attachment in the surface of the tooth. In this manner, when the contour of the body and the corresponding contour of the tooth are aligned, the aperture is located over the particular position in three dimensions on the surface of the tooth. For example, a ridge on the tooth can mate with a corresponding, but complementary surface of the attachment placement surface.

In some embodiments, a dental attachment placement structure, can include a body that includes a dental attachment placement structure, connected to a dental attachment to hold the attachment in a particular position, the body also can include a surface having a contour that is shaped to correspond with a contour of an alignment surface of a tooth. As used herein, an alignment surface of a tooth is any surface that when mirrored in the shape of a corresponding surface on the body can be used to properly locate the body with respect to the tooth. For example, when the contour of the body that mirrors the contour of the tooth and the corresponding contour of the tooth are aligned, a dental attachment, when placed in the attachment mounting structure, is located at the particular position with respect to an exterior surface of the tooth. Examples, of alignment surfaces on a tooth include: a ridge on a front surface of a tooth, a valley in a front surface, an edge of a tooth, a corner of a tooth, a contour of the gingival line of a tooth, a ridge or valley on a back surface of a tooth, among other such features that can be used to more precisely locate the dental attachment placement structure in relation to the tooth to aid in the correct placement of the attachment.

As discussed elsewhere in the specification the body can include at least a second surface shaped to correspond with a contour of an alignment surface of a second tooth. Such additional surfaces allow for greater accuracy in the placement of the attachment.

Figure 8A:
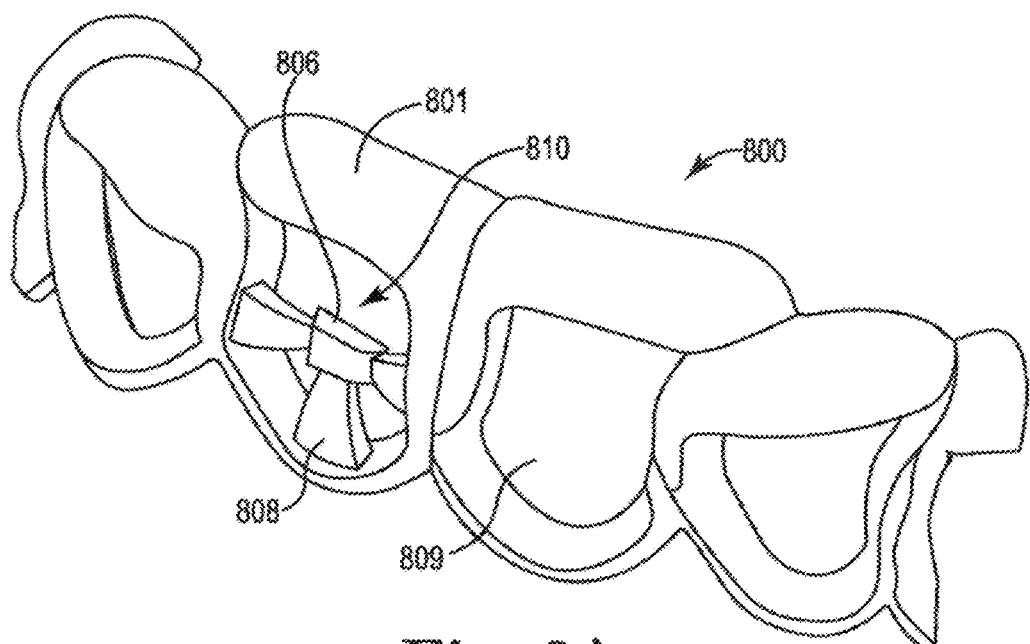
FIG. 8A illustrates an angled front view of a dental attachment placement structure having an attachment placement component provided on the structure according to a number of embodiments of the present disclosure.

FIG. 8A illustrates an angled front view of a dental attachment placement structure having an attachment placement component provided on the structure according to a number of embodiments of the present disclosure, conforming to the surface of the tooth. In the view of FIG. 8A, an attachment placement structure that conforms to the front surfaces of a tooth at a top of the tooth, sides of the tooth and bottom of the tooth (along the gingival line of the tooth). The illustrated structure is shown for a lower jaw, but such embodiments are not limited to use with the lower jaw. The attachment placement structure 800 of FIG. 8A includes a body 801 having several tooth shaped portions, at least one of those portions having an attachment 806 connected thereto by a number of supports 808, the supports separated by one or more apertures 810.

FIG. 8A shows the attachment 806 attached to the body 801 by three supports 808. One feature of the supports shown in FIG. 8A, is that they are arched along their direction of elongation. This feature can allow the surface of the supports that is closest to the tooth to be a distance that is further away from the tooth than the surface of the attachment that is closest to the tooth (the surface of the attachment that is to be attached to the tooth).

This can be beneficial for a number of reasons. For example, being farther away from the tooth reduces the potential for the support to be adhered to the tooth by stray adhesive that has leaked from between the tooth and the attachment during the securing process or that was sloppily applied during application of the adhesive to the surface of the attachment.

Additionally, the spaced nature of the arched support from the tooth may also allow separation of the attachment from the supports in a manner that reduces the potential for damage of the tooth during separation. For example, if the support is to be cut away from the attachment to form the separation, the tip of the cutting device may have space to pass between the support and the tooth during separation where there would be no space if the support were in contact with the tooth.

Further, as can be seen in the embodiment of FIG. 8A, the support can be tapered from a first thickness at its connection to the body 801 to a second, thinner thickness at its connection to the attachment 806. This can be beneficial in various ways. For example, the thinned connection at the attachment end of the support allows more space for a separation tool to be placed, while the thicker end allows a more stable and substantial support member during positioning and separation.

This can be beneficial in that when the structure is placed on the teeth of the patient, force may be applied to the supports and the thicker portion can resist the potential for the support to break during the placement of the structure. This could affect the positioning of the attachment or render the dental attachment placement structure ineffective to assist in placement of the attachment (e.g., the structure may not be able to hold the attachment in proper position for attachment at the correct location or orientation).

The tapering also makes separation of the attachment from the dental attachment placement structure body easier. For example, when a cutting tool is used to separate the attachment from the body, it must cut completely through the support to accomplish the separation.

A thinner support means that less cutting needs to be done. Furthermore, a tapered support may negate the need for a cutting tool and separation of the attachment from the support may only require the user to apply a compressive or tensile force on the thinner support end to initiate the break. Additionally, when the separation between the body and the attachment is accomplished, there may be a little of the support material still attached to the attachment (e.g., if the treatment professional did not cut exactly at the junction between the attachment and the support).

This may leave non-biocompatible material on the attachment and may make the attachment not fit with the dental appliance that is placed over the attachment (the attachment is a different shape in one or more dimensions than the cavity into which the attachment is to be placed). By using a thinner support end at the junction between the attachment and the support, the likelihood that extra support material is left on the attachment is reduced.

The illustration of the embodiment in FIG. 8A also shows that the body may not cover the entire front surfaces of the teeth adjacent to the tooth on which the attachment 806 is to be affixed. For example, an aperture 809 may be formed in the body over a portion that would cover a part of the adjacent tooth.

Having more or less material on the adjacent tooth surfaces provides several benefits and these can be weighed when designing various implementations. For example, having more material will increase the strength of the body which may be beneficial in some implementations, such as where the installation of the dental attachment placement structure may be difficult.

Having more material will increase the rigidity of the body which may be beneficial in some implementations, such as where accurate positioning is important. Further, having used less material for the body may be beneficial for reasons of reducing weight of the structure, reducing cost of manufacture as less materials and time may be used, and improving flexibility of the structure to aid in removal, among other benefits.

Figure 8B:
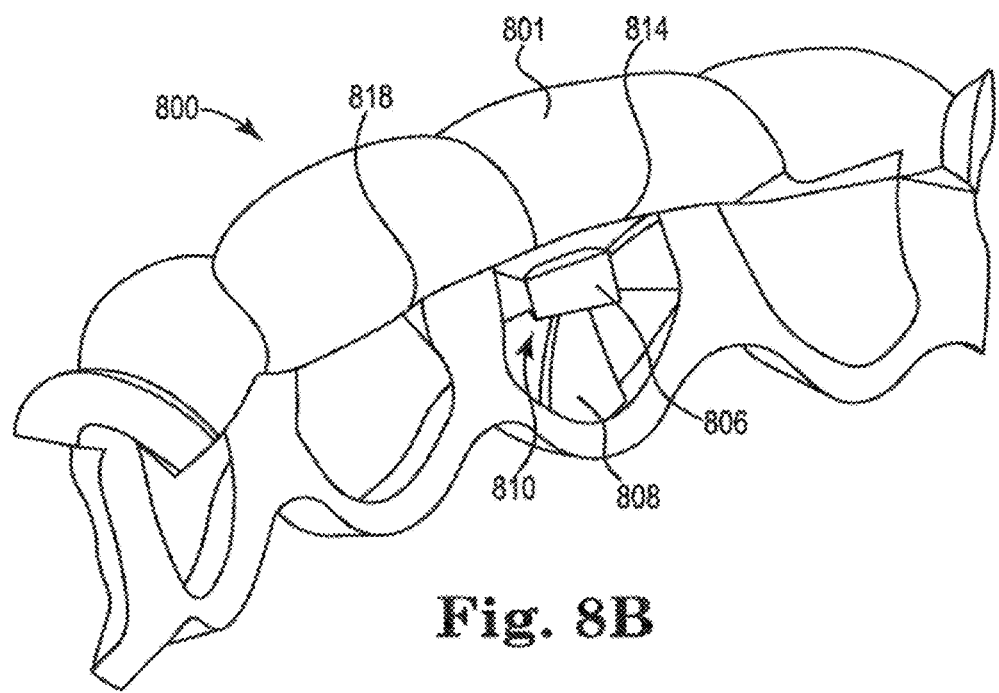
FIG. 8B illustrates an angled back view of the dental attachment placement structure of FIG. 8A.

FIG. 8B illustrates an angled back view of the dental attachment placement structure of FIG. 8A. In this view, the body 801 of the structure 800 has a number of tooth cavities for the placement of a tooth therein. In the example of FIG. 8B, four cavities are shown, however, embodiments are not limited to four teeth and more or less tooth cavities can be provided in various embodiments.

Each cavity is formed from a number of surfaces of the structure that are used to contact a corresponding surface of the tooth onto which the cavity is placed. As shown in FIG. 8A, those surfaces may represent complete surfaces of a tooth or parts of such surface (e.g., the aperture 809).

The apparatus includes a body 801 having a tooth-shaped surface that is shaped to conform to the front surface of a tooth and is to be placed against the front surface of the tooth. This tooth-shaped surface of the body can include an aperture (e.g., aperture 810) to allow placement of an attachment at a particular position on the tooth surface. It will be understood that, in some embodiments, the aperture may not be completely closed around its edge. Such designs should be considered to be within the embodiments of the present disclosure.

As shown in FIG. 8A, FIG. 8B also shows the apertures 810 that provide spaces between the supports 808. In the embodiment of FIG. 8B, the structure also includes a first back side portion 814 that conforms to the back side of the first tooth and a second back side portion 818 that conforms to the back side of the second tooth. As will be discussed with respect to FIG. 8C, a surface of the structure may also be used in conjunction with the biting surface of a tooth for improving the alignment of the attachment prior to affixing it to the tooth.

Also, it should be noted by the reader that the surface on which the line for element number 806 is positioned is the surface on the attachment that is to be attached to the tooth. It is on this surface that an adhesive material is to be placed (the adhesive is not shown). The adhesive can be applied to the entire surface or to a part thereof. The adhesive can be ultra-violet (UV) curable adhesive or any other suitable type of adhesive that can be used to affix the attachment to the tooth surface.

In some embodiments, the attachment can, for example, include an adhesive layer positioned to secure the attachment to an affixing surface of a tooth. In some embodiments, the adhesive is only located on the portion of the attachment that will contact the tooth. In this manner, it is unlikely that the adhesive will secure other parts of the apparatus to the tooth or create excess dried adhesive that may need to be removed from the tooth.

In some embodiments, the surface of the attachment that contacts the tooth may contain a recessed well or pocket in which an adhesive can be applied. This controls the location of where the adhesive is applied and avoids issues surrounding excess adhesive, for example, unwanted flash, unwanted adherence of the positioning structure supports to the tooth.

In some implementations, a release layer is provided over the adhesive. The release layer can be a thin film of plastic, wax paper, or other suitable covering that can be removable by the treatment professional when it is time for the attachment to be placed on the tooth of the patient. This can be beneficial, for example, to allow the adhesive to be applied at or shortly after fabrication of the apparatus, does not expose the adhesive to contaminants that may harden or make the adhesive less effective (e.g., dust).

The use of surfaces (e.g., 814, 818, and/or 812 of FIG. 8C) in conjunction with other surfaces can also allow for use of the corners of one or more teeth to be used to aid in positioning and/or orientation of an attachment. The use of corners can be beneficial in that they can be used to control the positioning of the attachment in more axes of movement than use of the edge surfaces of a tooth.

Figure 8C:
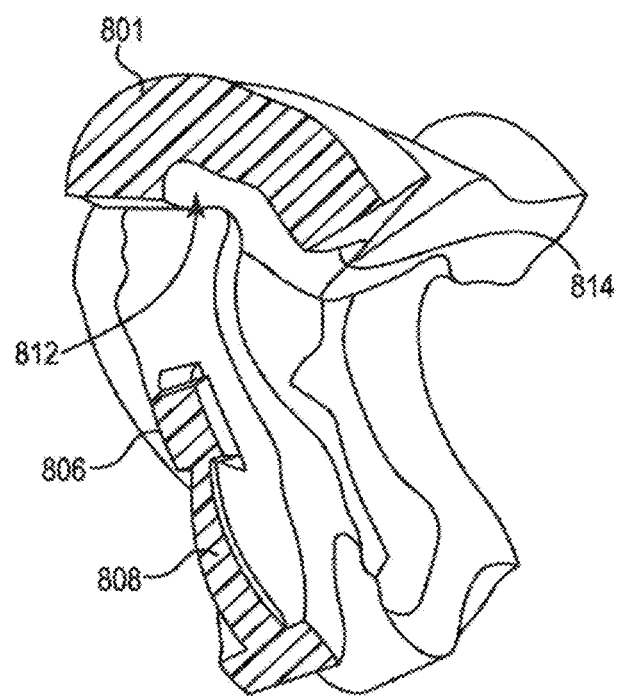
FIG. 8C illustrates a cutaway side view of the dental attachment placement structure of FIG. 8A.

FIG. 8C illustrates a cutaway side view of the dental attachment placement structure of FIG. 8A. FIG. 8C provides a view of the shape of the cavity described above as well and more detail regarding the supports 808 and attachment 806 and their connection.

As discussed above with respect to FIG. 8B, the cavity for placement of a tooth is formed from a number of surfaces of the body 801 of the structure. For example, the cavity, in the embodiment of FIG. 8A-8C is formed from the inside surface that conforms to the front side of the tooth (e.g., buccal side), a surface 812 that contacts and wraps around the tooth's incisal edge (top surface of the tooth in this embodiment, but may be bottom surface, if the structure is designed for the upper jaw), and surface 814 that conforms to the back side of the tooth (e.g., lingual side). In this manner, the three surfaces, when in contact with the tooth, can provide more precise locating of the attachment for placement on the tooth.

Figure 9A:
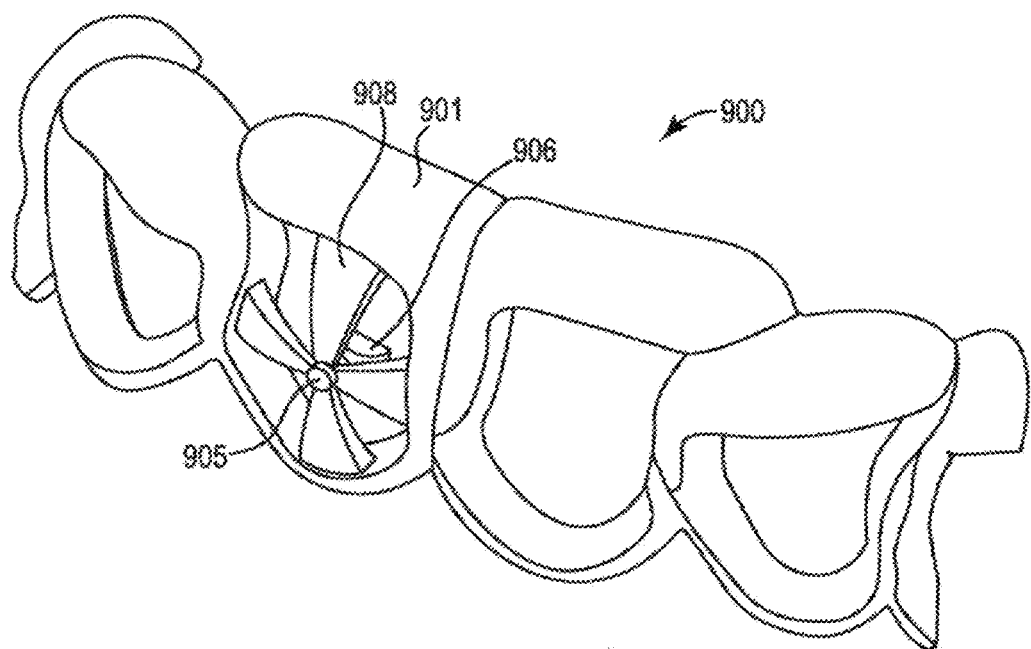
FIG. 9A illustrates an angled front view of a dental attachment placement structure having an attachment placement component provided on the structure according to a number of embodiments of the present disclosure.
Figure 9B:
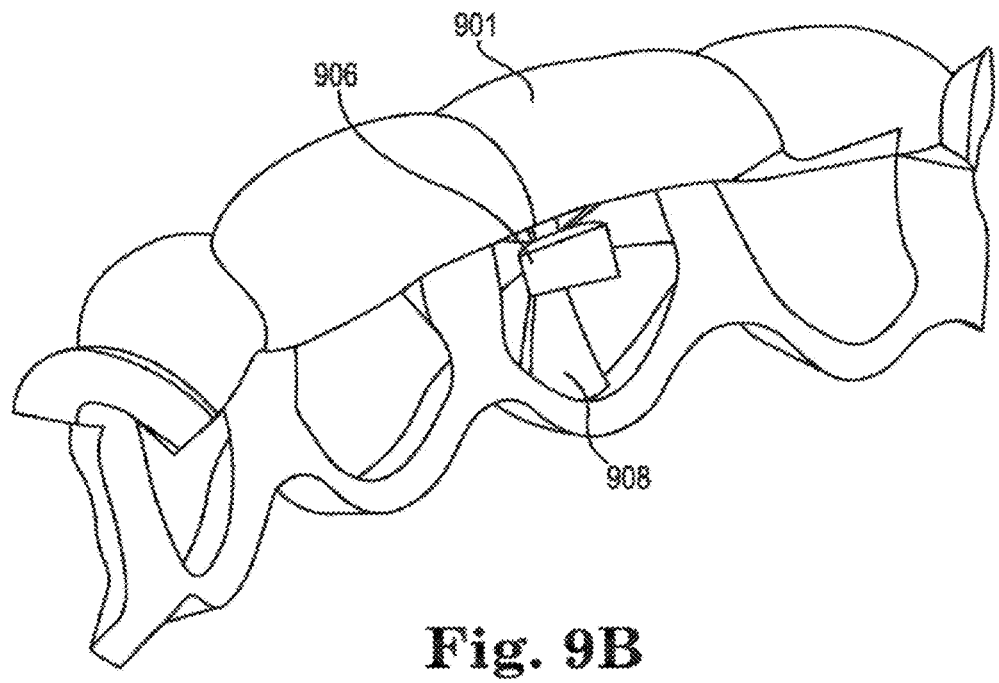
FIG. 9B illustrates an angled back view of the dental attachment placement structure of FIG. 9A.

FIG. 9A illustrates an angled front view of a dental attachment placement structure having an attachment placement component provided on the structure according to a number of embodiments of the present disclosure. FIG. 9B illustrates an angled back view of the dental attachment placement structure of FIG. 9A.

In FIGS. 9A and 9B, the structure 900 includes an attachment 906 that is connected by a single connection member 905 to four attachment supports 908 that are connected to the body 901. In this type of embodiment, the connection that is severed to detach the appliance from the rest of the dental attachment placement structure offers several benefits.

For example, the connection is a single connection allowing the detachment to be made with only one breaking of the connection with the attachment. Also, with a single connection, any residual material from the single connection member is located in one area of the attachment making removal of the extra material easier.

Figure 9C:
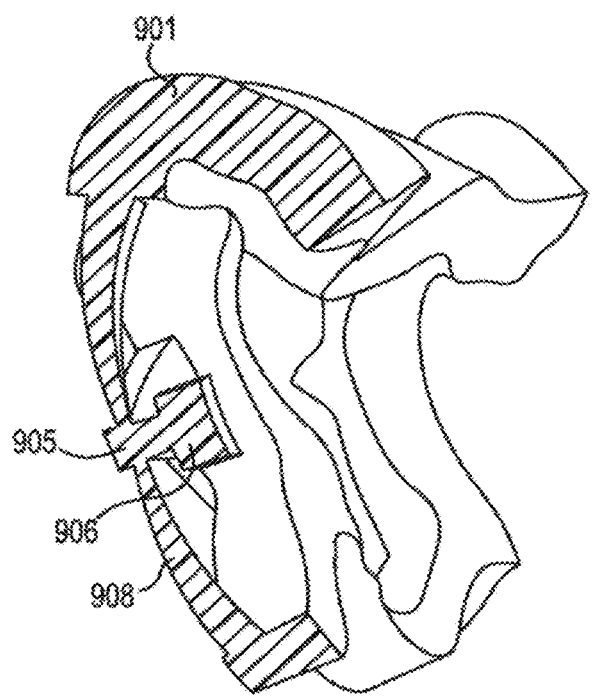
FIG. 9C illustrates a cutaway side view of the dental attachment placement structure of FIG. 9A.

Additionally, in the embodiment shown in FIGS. 9A-9C, the connection is at the top of the attachment which makes detachment and removal of any excess material easier as the connection area is away from the surface of the tooth and more easily accessible. In addition, only one surface of the attachment is affected by the presence of these supports, therefore preserving the integrity of all other attachment surfaces. This is important as these surfaces play a critical role in the orthodontic treatment and require a high degree of dimensional accuracy.

Any suitable number of supports can be utilized. For example, in FIGS. 9A-9C four supports 908 are used, but in other embodiments, for example, those shown in FIGS. 8-A-8C and 10A-10C, other numbers of supports are provided.

In some embodiments, the support functionality can be provided by a material that spans across at least part of the area covering the front surface of tooth. In such an embodiment, the attachment can be attached to the material or to one or more connection members such as the type shown at 905 in FIG. 9A.

In such embodiments, the material may, for example, be cut away to allow access to the connection between the connection member and the attachment in order to detach the attachment. In some embodiments, a stimulant that can be applied as discussed above. In such embodiments, the stimulant can be used, for example, to make the material (or a portion thereof) and/or connection member brittle or dissolve the material and/or connection to detach the attachment therefrom.

FIG. 9C illustrates a cutaway side view of the dental attachment placement structure of FIG. 9A. FIG. 9C, provides a better view of the single connection member 905 that connects the attachment 906 to the supports 908. As shown in FIGS. 9A-9C, in some embodiments, there is a single connection area between the attachment and the attachment placement structure. As stated herein, this, for example, allows the attachment to be separated from the rest of the apparatus more easily and/or with less potential for damage to the tooth or attachment during the separation process.

Figure 10A:
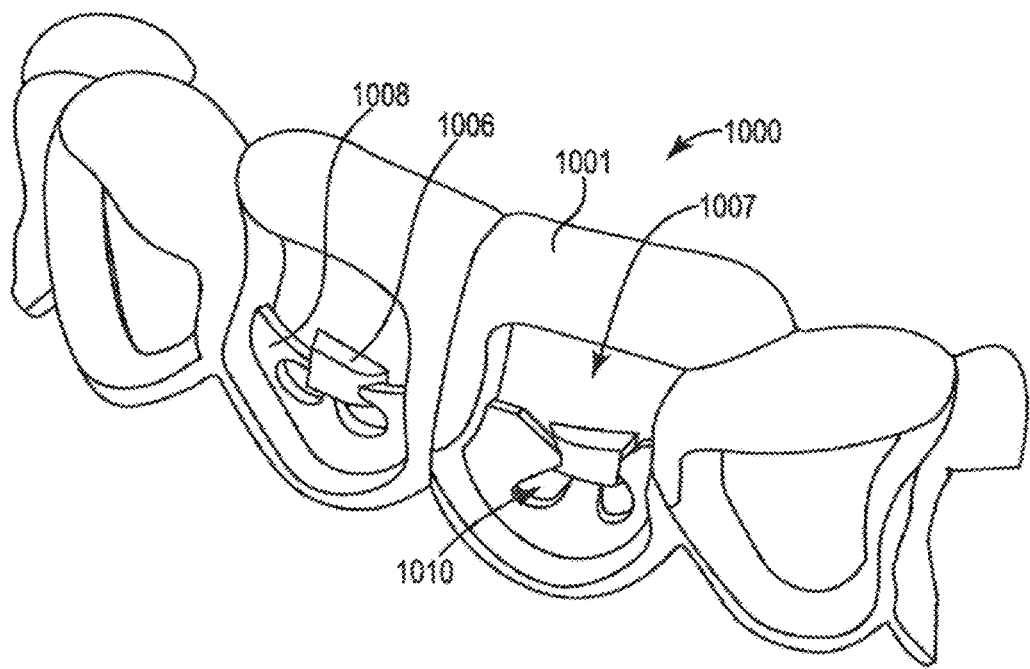
FIG. 10A illustrates an angled front view of a dental attachment placement structure having an attachment placement component provided on the structure according to a number of embodiments of the present disclosure.
Figure 10B:
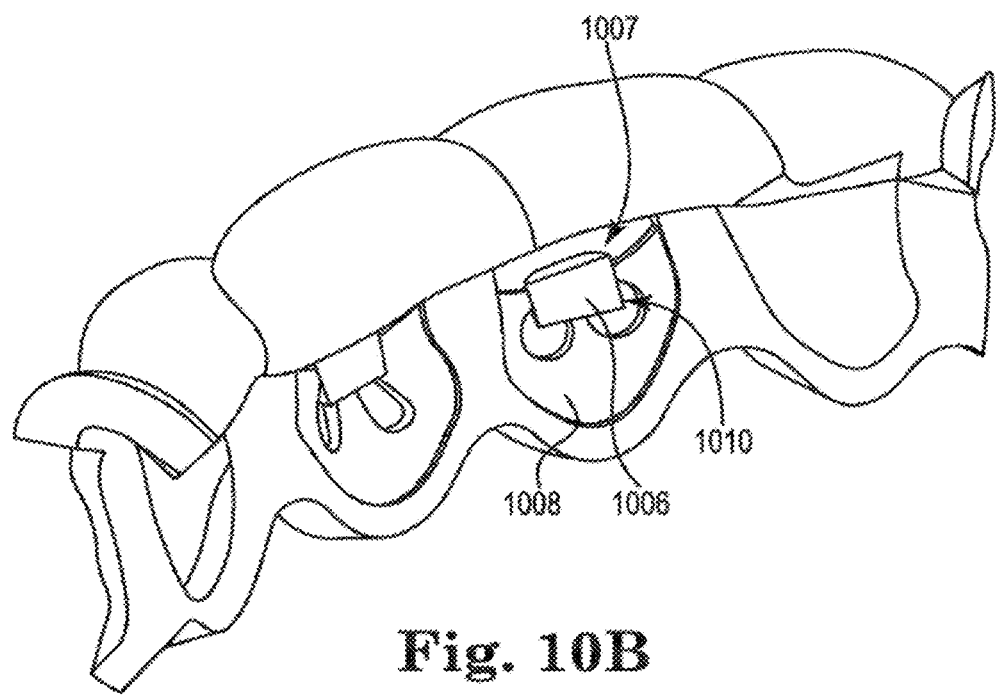
FIG. 10B illustrates an angled back view of the dental attachment placement structure of FIG. 10A.

FIG. 10A illustrates an angled front view of a dental attachment placement structure having an attachment placement component provided on the structure according to a number of embodiments of the present disclosure. FIG. 10B illustrates an angled back view of the dental attachment placement structure of FIG. 10A.

As shown in the embodiment illustrated in FIGS. 10A and 10B, at least one of the attachment mounting structures can have a support connected between the body and a dental attachment. In this manner the supports can be cut instead of a solid layer of material thereby making it easier to release the attachment from the rest of the apparatus.

For instance, in FIGS. 10A and 10B, the supports, that connect the attachment 1006 to the body 1001 of the structure 1000, can be formed individually or can be formed as a sheet of material and then apertures, such as apertures 1010 can be formed in the sheet of material. This sheet of material can be formed with the body 1001 or can be attached to the body after fabrication. The support structure can be fabricated as shown in FIGS. 10A and 10B or can be fabricated to fill the entire inside area of inside shape of the tooth of the body 1001 and then a part of the support can be removed to form aperture 1007.

The body can also include an additional attachment mounting structure (e.g., a second attachment mounting structure) for attaching one or more dental attachments to an exterior surface of another tooth. This allows further elements of the patient's mouth to be used to further corroborate the position of the appliance. This is, for example, because the surfaces and edges of the apparatus when they contact the mouth of the patient, at surfaces and edges of the tooth or teeth that those surface and/or edges of the apparatus.

For example, as shown in FIGS. 10A and 10B, more than one attachment can be provided on the structure for attachment to a user's teeth. In such embodiments, the supports can be the same type of configuration, as shown with respect to supports 1008 in FIG. 10A, or can be different types of configurations (e.g., a support type from 8A-8C could be utilized, and/or from another embodiment shown herein).

Figure 10C:
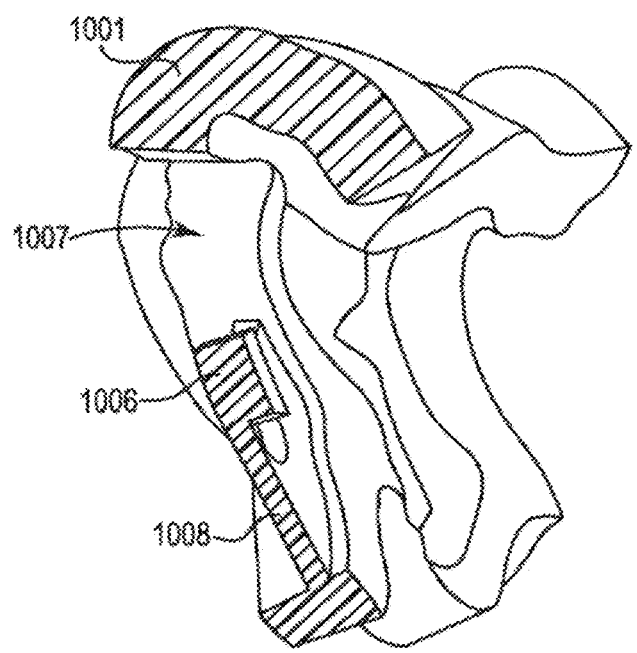
FIG. 10C illustrates a cutaway side view of the dental attachment placement structure of FIG. 10A.

In some embodiments, having more support material (e.g., the support structure of FIGS. 10A-10C compared to the thinner supports of FIGS. 8A-8C) may provide benefits in certain implementations. For example, a more stable structure may provide for better positioning of the attachment, due to its rigidity or other characteristics.

FIG. 10C illustrates a cutaway side view of the dental attachment placement structure of FIG. 10A. FIG. 10C better shows the arrangement of the support structure 1008 and the aperture 1007 formed with respect to the attachment 1006 and body 1001. In this embodiment, the support structure is not arched, which may be easier to manufacture, among other benefits, and its connections to the attachment 1006 are away from the surface that will contact the tooth of the patient. As stated elsewhere, this may be beneficial in allowing for easier detachment of the attachment 1006 from the support structure 1008 and less potential for damaging the tooth during the detachment process, among other benefits.

In one method of forming a structure as discussed in embodiments disclosed herein, the method includes forming an attachment out of an attachment material and a dental attachment placement structure body, connected to the attachment to hold the attachment in a particular position wherein there is a single connection area between the attachment and the attachment placement structure. In some embodiments, the dental attachment placement structure can be printed using the three-dimensional printing apparatus.

Another strategy method can include printing the dental attachment placement structure out of a second material that is different than the attachment material. Such embodiments can be beneficial in several ways. For example, the body can be made from a material that is easier to break, thereby making the separation occur on the body rather than on the attachment (which could deform the attachment in a manner that would make it unusable). The body material could also be made from a less expensive material or a non-biocompatible material (it could be compatible for the short time it is in the mouth of the patient, but may not be biocompatible over the course of a longer period, such as the treatment period).

In some embodiments, printing the attachment and dental attachment placement structure is done such that they are connected to each other at least one point when printed. For instance, the attachment is connected by three points in FIGS. 8A-8C, one point in FIGS. 9A-9C, and three points in FIGS. 10A-10C.

In another method of forming a dental attachment placement structure, the method includes receiving dental data of a patient's teeth to form a virtual dental model of a patient's dentition. From this dental data, a treatment plan for moving one or more of a patient's teeth, that includes the use of at least one attachment that is affixed to a tooth of the patient, can be created.

In this treatment planning process, the process further includes, locating a position and orientation of an attachment on the surface of a tooth of the patient. Then, a dental attachment placement structure can be designed, including a body, a number of supports, and an attachment connected to the number of supports, wherein the shape of the body is based on the virtual dental model.

In various embodiments, the attachment can be printed to include one surface of the attachment with a contour that will mate with a corresponding contour of an exterior surface of a tooth. In this manner, the attachment can be fitted closely to the surface of the tooth which may increase its ability to be secured to the surface of the tooth. In such implementations, more force may be applied to the attachment without it coming loose from the surface of the tooth, among other benefits.

Some embodiments can provide printing one surface of the dental attachment placement structure with a contour that will mate with a corresponding contour of an exterior surface of a tooth. Such embodiments may be able to more accurately place the attachment on the tooth surface due to the mating nature of the surface of the structure and the tooth surface, among other benefits.

As shown in FIG. 8C, for example, in some embodiments, the dental attachment placement structure includes printing multiple surfaces of the dental attachment placement structure having contours that will mate with corresponding contours of exterior surfaces of one or more teeth. As stated elsewhere herein, the more surfaces that can be used to align the placement structure with respect to the tooth on which the attachment is to be applied, the more accurate the placement of the attachment should be.

As can be appreciated by the discussion of the different embodiments described herein, in can be noted that each of these types of attachment mounting structures can provide an accurate mechanism for positioning and orienting the attachment with respect to the surface of the tooth to which the attachment is to be secured, but one type may have benefits over another in some applications based on one or more characteristics (e.g., whether etching is desired, space available for placement of the attachment, number of attachments to be placed on a single tooth, type of securement that will be used, etc.).

As discussed herein, the dental attachments are structures that are specifically shaped to provide particular forces to move one or more teeth of a patient. They can be used to move a tooth directly (e.g., to move a tooth to which they are attached) or indirectly (e.g., to act as an anchor and to direct force elsewhere to move a tooth toward another location in a patient's mouth). As described herein, the attachment can be used to apply a force to one or more teeth when used in conjunction with, for example, a cavity formed in an aligner. The cavity can be shaped to have at least one surface that contacts a surface of the attachment, with the aligner providing the force to the attachment, which is then used to move the one or more teeth. In order to impart a force accurately, the attachment should be placed at a precise position on a surface of a tooth and in a particular orientation to the tooth, such that when the aligner is placed over the teeth, the specialized cavity having the surface therein will contact the desired surface of the attachment in a manner that will accurately impart the desired force at the desired force vector.

In some cases, the attachment is configured to be used in conjunction with an alignment device instead of, or in addition to, an aligner. For example, the attachment may be adapted to engage with an elastic band or brace to provide more leverage and more force on the teeth. In a specific example, the attachment includes a hook or groove that an elastic band can hook around. Such attachment features are sometimes referred to as power arms or buttons. The elastic band can hook around two of the attachments to apply a pulling force that applies a force pulling the two attachments together. Accurate positioning and orientation of such attachment features on the tooth surfaces can be important in order to apply the forces in a desired direction.

The accurate positioning of an attachment is referred to herein as registration, which describes a condition of correct alignment or proper relative position and orientation with respect to a surface of a tooth. This term can be used to describe the proper positioning of an attachment, but can also be used to describe the proper fit between an attachment placement structure and a surface or edge of a tooth used to assure proper positioning and orientation of the attachment placement structure. As described herein, this can involve the use of a contoured surface on the attachment placement structure having unique undulations or grooves that match the unique undulations or grooves on the surface of a particular tooth of a patient, wherein registration refers to the alignment of the undulations or grooves of the surface of the attachment placement structure with those of the tooth surface and when aligned, and which indicates that the attachment placement structure is in the correct position and orientation for placement of the one or more attachments. This contoured surface can be formed based on a computer model (e.g., 3D or 2D) of at least a portion of a patient's dentition. In some cases, the more features (e.g., undulations, grooves, surfaces of a tooth, edges of a tooth, number of surfaces or edges of other teeth), the more accurate the positioning and orientation of the attachment can be.

In some embodiments, the attachment placement structure is formed with the one or more attachments attached thereto.

Such technologies can be particularly useful in some such embodiments as the two can be fabricated during the same process. For example, the attachment placement structure and attachments can be formed together using one or more of an additive manufacturing (3D printing) process, a subtractive manufacturing process (e.g., machining, cutting, milling, drilling, or etching), and a molding process.

In some embodiments, the body of the attachment placement structure can be in the form of a frame with the one or more attachments extending from the frame. In addition to the attachment(s), the frame can support other features for placing and aligning the attachment placement device on a dental arch. For example, one or more registration anchors used to register the position of the attachment(s) can also extend from the frame. In some embodiments, one or more retention supports used to support the position of the attachment placement device extend off the frame.

An advantage of a such a frame structure is that the attachment placement device can be made of a minimal amount of material and may be more easily fabricated. In some cases, the attachment placement device can be 3D printed without the use of supports used in conventional 3D printing processes. This can eliminate the need to remove such supports after the printing process, thereby decreasing the time and cost of manufacture. Thus, a portion of the attachment placement device may have a surface having a shape corresponding to a build plate used during a 3D printing process. In some cases, this surface is (e.g., substantially) flat. The frame structure may also allow for easier access to the parts of the dental arch during placement of the attachment as the frame may take up less space around the teeth compared to an attachment placement structure that covers and occludes more of the dental arch. Thus, the treatment professional can access portions of the teeth and/or gums that would not be accessible using a higher coverage placement apparatus.

Figure 12A:
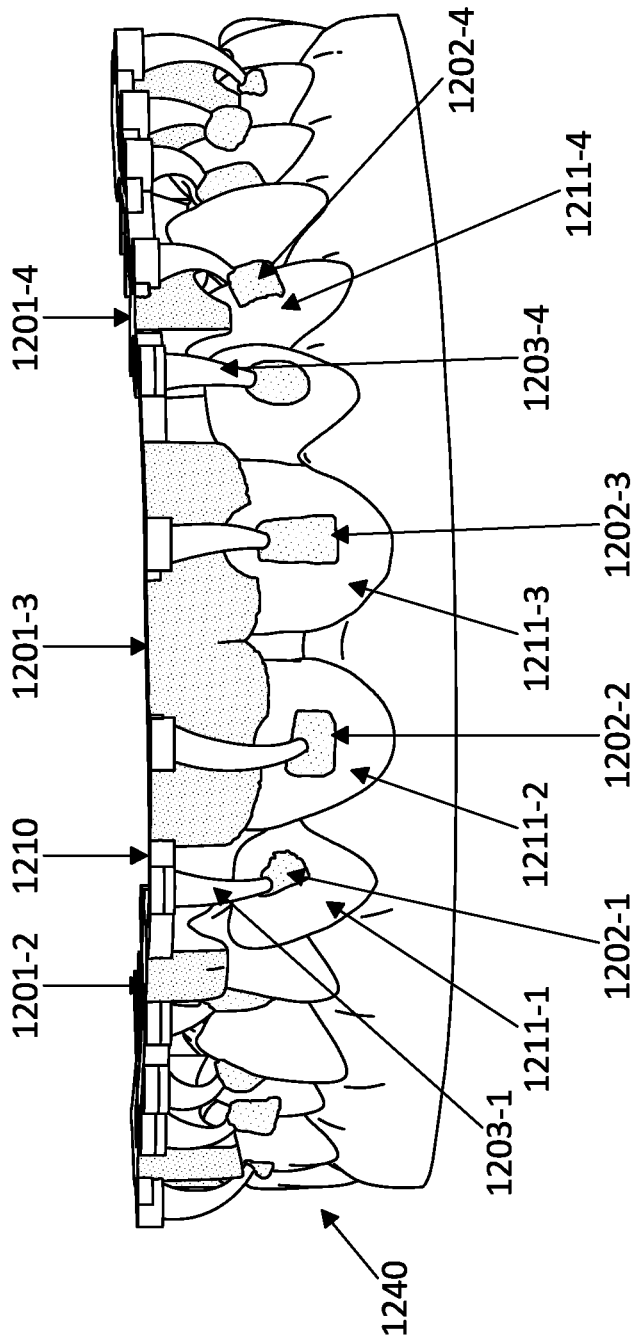
FIG. 12A illustrates a front view of a dental attachment placement structure that includes a frame according to a number of embodiments of the present disclosure.

FIG. 12A illustrates a front view of a dental attachment placement structure according to a number of embodiments of the present disclosure. The structure illustrated includes several components that when used together can be beneficial in the accurate placement and orientation of one or more attachments on one or more buccal tooth surfaces of a dental arch 1240. The features illustrated in this figure are a frame 1210 configured to extend over at least a portion of the dental arch. The frame may be a solid structure that follows the shape of the dental arch of the patient, or a portion of the dental arch. The frame can support one or more extending structures that cooperate with the frame to register the one or more dental attachments (examples of which are identified as 1202-1, 1202-2, 1202-3, and 1202-4) to predetermined tooth surface position(s). The dental attachment(s) may be attached to the frame via one or more an attachment supports (examples of which are identified as 1203-1 and 1203-4). This can allow the dental attachment to extend a distance from the frame and to access the predetermined position on a corresponding tooth surface. If multiple attachments are used, the attachment supports may extend in the same direction with respect to the frame. For instance, attachment supports may extend in a downward (or upward) direction from the frame to position the supports below (or above) the frame.

The dental attachment may be removably attached to the attachment support such that the attachment can be detached from the dental attachment placement structure, for example, after the attachment is affixed to the tooth surface. An attachment may be attached to an attachment support at an interface region between the attachment and attachment support. This interface region may be configured for easy detachment. For example, the attachment support may have a thicker end close to the frame that tapers to a lesser thickness at the interface region for easier detachment. In some embodiments, detachment is accomplished using a detachment tool, as described herein. In a number of embodiments, the interface region is sufficiently frangible to allow the attachment to break away from the attachment support without the use of detachment tool. In some cases, a user may be able to detach the attachment by applying a compressive, tensile or pressing force on the attachment (e.g., by the user's hand).

The frame may also include one or more registration anchors (examples of which are identified as 1201-2, 1201-3, and 1201-4) that extend from the frame and that include contact surfaces that register with corresponding one or more teeth. When the contact surfaces of the registration anchor(s) register with corresponding teeth, the dental attachments can also register with the corresponding tooth surfaces. In some cases, the registration anchor contact surface is contoured to complement the undulations and/or grooves of a corresponding surface of one or more teeth. The contoured surface may be adapted to complement the surfaces of any type of one or more teeth, such as one or more incisors, canines, premolars, and molars. The contoured surface may be adapted to complement any side of a tooth, such as one or more lingual, occlusal, buccal, and distal tooth surfaces. In some embodiments, the registration anchor may at least partially encapsulate an incisal edge of a tooth. The registration anchor may and extend over more than one side of a tooth, such as portions of the top (e.g., crown), buccal and/or lingual sides of the corresponding tooth. In the example shown in FIG. 12A, the registration anchors extend over the top and buccal sides of corresponding teeth.

In some cases, the dental attachment is configured to attach to the same tooth as the tooth that the registration anchor is configured to contact. For instance, attachment 1202-4 is aligned with a surface of tooth 1211-4, which is the same tooth that registration anchor 1201-4 is registered with. In some cases, the registration anchor is configured to registered with a different tooth that the tooth that the dental attachment is configured to attach to. For instance, attachment 1202-1 is aligned with a surface of tooth 1211-1, which is different than tooth 1211-2 that registration anchor 1201-3 is registered with. The registration anchor may be configured to registered with multiple teeth. For instance, registration anchor 1201-3 can adapted to registered with surfaces of tooth 1211-2 and tooth 1211-3. When the one or more registration anchors are correctly placed on and registered with corresponding tooth surface(s), the dental attachment placement structure can be properly aligned with the dental arch, and the attachment(s) can be precisely positioned with respect to the tooth surface(s).

Figure 12B:
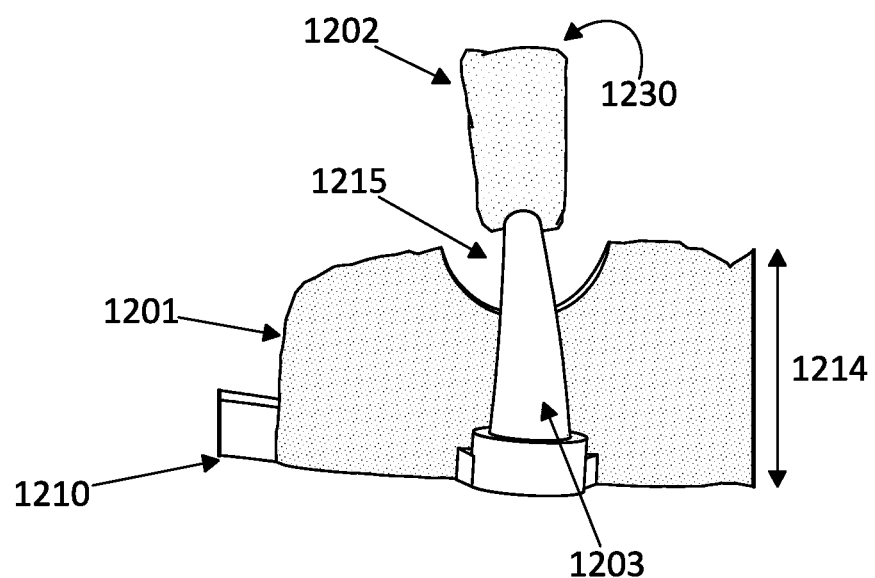
FIG. 12B illustrates a close-up view of a dental attachment of the attachment placement structure of FIG. 12A.

FIG. 12B illustrates a close-up view of an attachment portion of the dental attachment placement structure of FIG. 12A. In this example, the attachment support 1203 extends indirectly from the frame 1210 via registration the anchor 1201. This configuration can allow the attachment 1202 to be connected to the same tooth that the registration anchor 1201 is registered with. In the example shown, the registration anchor 1201 includes a clearance 1215 to provide proper positioning of the attachment 1202 without interference from the registration anchor 1201 and/or attachment support 1203. The shape and depth of the clearance 1214 may vary depending on the desired tooth position for the attachment 1202. The thickness and height 1214 of the registration anchor 1201, as well as its offset from the tooth, may also vary depending on the desired placement of attachment 1202. In some cases, the clearance 1215 provides access for the treatment professional around the attachment 1202 during, for example, the process of affixing the attachment 1202 to the tooth.

In addition to extending the attachment in a downward or upward direction away from the frame and toward the tooth, the attachment support may also align an attachment surface (e.g., 1230) of the attachment with respect to the tooth surface. In some cases, the attachment support points the attachment surface (e.g., 1230) in a direction toward the midline of the frame. For example, the attachment support may have an arched shape that orients the attachment such that the attachment surface is substantially parallel to the target tooth surface. In other embodiments, the attachment support has an angled shape. This arched or angled shape may also provide room for the user's hand or a detachment tool to access the attachment for detachment as the arched shape can bow outward. The shape and size of the dental attachment 1202 can vary depending on desired force characteristics and the shape and type of corresponding dental appliance (e.g., aligner), as described herein.

Figure 12C:
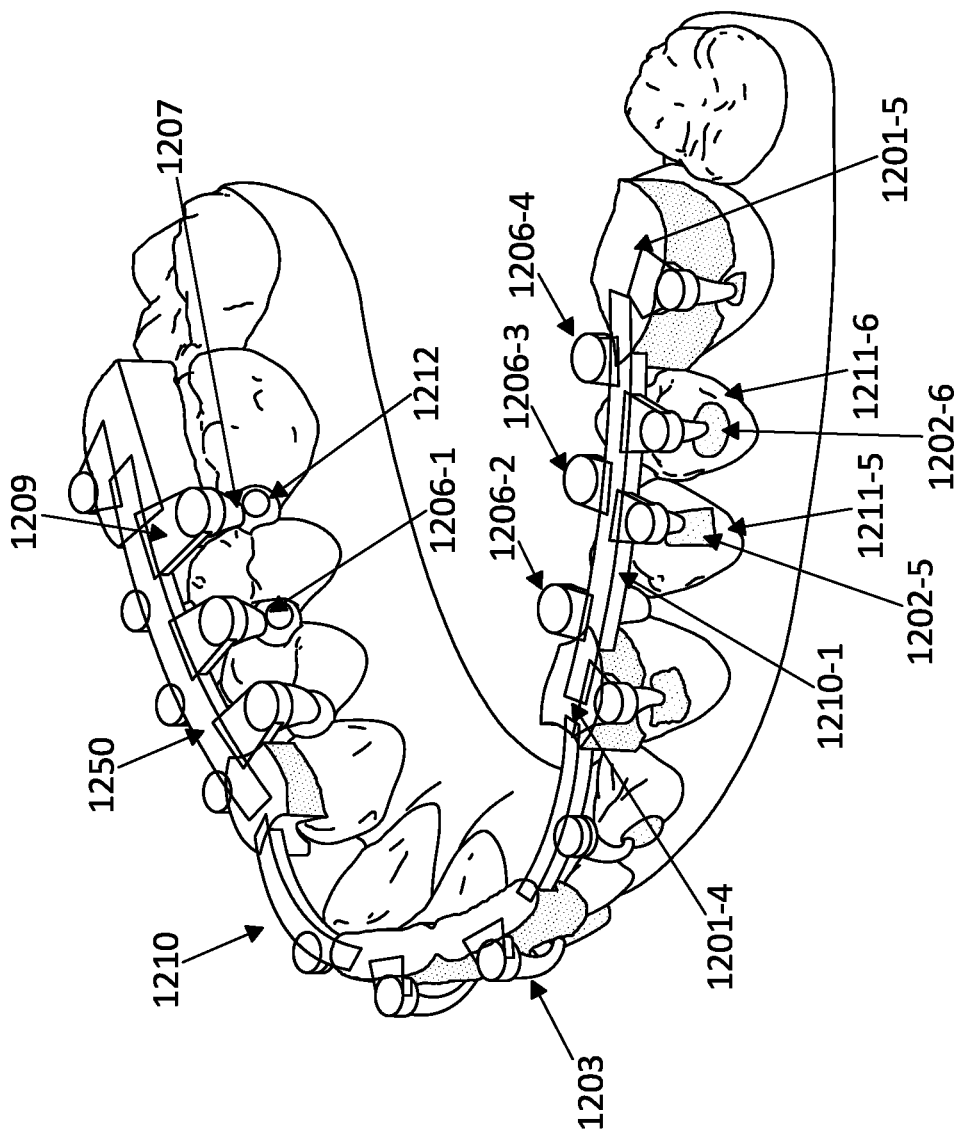
FIG. 12C illustrates a perspective side view of the dental attachment placement structure of FIG. 12A.
Figure 12D:
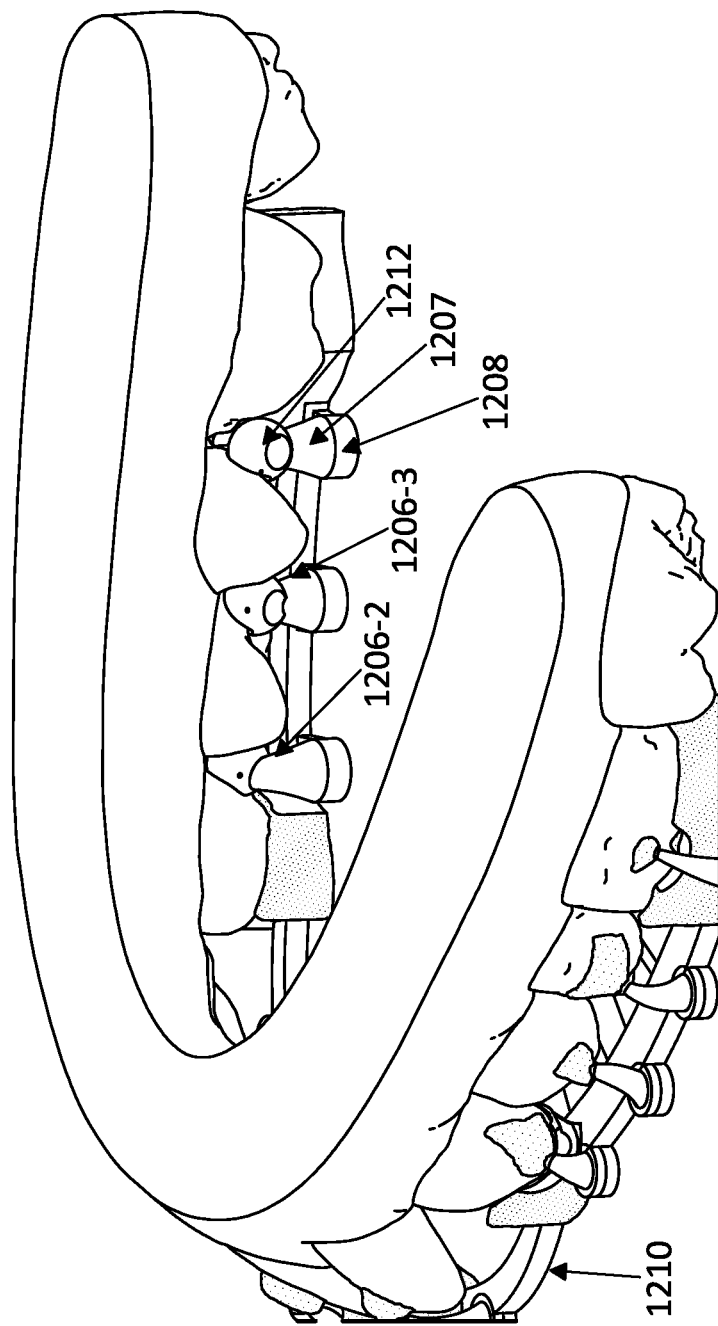
FIG. 12D illustrates an alternative perspective side view of the dental attachment placement structure of FIG. 12A.

In some embodiments, the dental attachment placement structure includes one or more retention supports that extends from the frame and is configured to maintain the dental attachment(s) at the predetermined position(s). FIGS. 12C and 12D illustrate top and bottom perspective views of the dental attachment placement structure of FIG. 12A on a dental arch, showing exemplary retention supports, examples of which are identified as 1206-1, 1206-2 and 1206-3. A retention support can include a contact portion 1212 that is configured to contact one or more teeth and/or gums of the dental arch. In the example shown, the contact portion 1212 is shaped and sized to contact an interproximal region between the teeth. The contact portion can have any shape. In some cases, the contact portion has a substantially spherical shape, as shown. Other non-limiting examples shapes can include a polyhedron (e.g., tetrahedron or cube), cone, cylinder and ovoid shapes. The retention support may include an arched or angled portion that extends the dental contact portion a distance from the frame. For example, the retention support may include a horizontal portion 1209 that extends in a horizontal direction with respect to the frame 1210, and a vertical portion 1207 that extends in a vertical direction with respect to the frame 1210, which position the dental contact portion 1212 on a surface (e.g., lingual surface) of the dental arch.

In some cases, the retention support extends from a different side of the frame than the attachment support. For example, the retention support can extend from a first side of the frame and the attachment support may extend from a second side of the frame. In the example shown in FIGS. 12C and 12D, the retention supports extend from a lingual side of the frame such that the retention supports can contact a lingual portion of the dental arch, and the attachment supports (e.g., 1203) extend from a buccal side of the frame such that the attachments (e.g., 1202) can register at positions on buccal surfaces of the teeth. The retention support can support the lingual side of the frame to stabilize the position of the dental attachment placement structure on the dental arch in three-dimensions.

The frame (e.g., 1210) can be shaped and sized for following at least a portion of the dental arch. In some instances, the frame has an arched shape (e.g., U-shaped) in accordance with the dental arch. In other embodiments, the frame covers only a portion of the dental arch. The frame may be one continuous piece or may include multiple pieces that are joined together. Such sections may be have a curved (e.g., arched) shape or be straight and joined together to provide a generally curved (e.g., arched) shape. Although the example shown shows frame 1210 that is adapted to follow along occlusal sides of the teeth (e.g., top of the dental arch), other variations are encompassed by the instant disclosure. For example, the frame may be adapted to follow along the lingual and/or buccal sides of the teeth (e.g. inside of the dental arch and/or outside of the dental arch). In some embodiments the frame is adapted to follow along multiple sides of the teeth (e.g., two or more of the occlusal, lingual and buccal sides). In some cases, the dental attachment placement structure includes more than one frame. For example, two or more frames may be adapted to follow along one or more of the occlusal, lingual and buccal sides of the teeth. Such variations may be included in any of the dental attachment placement structures described herein.

In some embodiments, the registration anchors register with only a subset of the teeth of the dental arch. In some examples, two or more registration anchors are used to span the frame over one or more teeth. For instance, registration anchors 1201-4 and 1201-5 extend from the frame 1210 such that they are separated by a gap portion 1210-1 of the frame. The registration anchors 1201-4 and 1201-5 are configured to register with non-adjacent teeth such that the gap portion 1210-1 of the frame spans teeth 1211-5 and 1211-6. This can allow the gap portion 1210-1 of the frame to suspend over the dental arch and allow dental attachments 1202-5, 1202-6 and retention supports 1206-2, 1206-3, 1206-4 to be positioned over their respective target teeth. This allows the dental attachment placement structure to occlude less of the dental arch than a dental attachment placement structure that covers more tooth surfaces. For instance, the treatment professional can more easily access regions around the intervening teeth 1211-5 and 1211-6 for attaching the attachments 1202-5 and 1202-6.

As described herein, the dental attachment placement structure can be formed using additive manufacturing techniques. In some cases, this involves printing portions of the dental attachment placement structure on a build plate (sometimes referred to as a build platform or base plate) of an additive manufacturing machine without the use of supports. As known, manufacturing supports are often used in 3D printing to support the 3D object on a build plate during the printing process. Such manufacturing supports are typically used to support portions of the 3D object, such as overhangs, that tend to deform during the printing process and are generally removed from the 3D object after the printing process is complete. Such manufacturing supports adds extra material, and adds extra manufacturing time and expense for removing the supports. In some embodiments, the dental attachment placement structure is printed without the use of manufacturing supports, thereby saving material, time and money. In the example shown in FIG. 12C, the frame 1210 can have a surface 1250 (e.g., top or bottom surface) that can be formed on a build plate without the use of manufacturing supports to provide the advantages described above. The surface 1250 may be a substantially flat surface in accordance with a flat build plate surface. The flat surface 1250 may correspond to a top (or bottom) surface of the dental attachment placement structure, where the attachment support(s) (e.g., 1203) and/or retention support(s) (e.g., 1206-1, 1206-2, 1206-3, 1206-4) extend with respect to a bottom (or top) surface of the frame. In some cases, portions of the attachment support(s) and/or retention support(s) can also be built on the build plate and have a correspondingly flat surface.

To use the dental attachment placement apparatus, a treatment professional can position the one or more registration anchors on corresponding tooth surfaces. In the embodiment shown in FIGS. 12A-12D, the registration anchors start at the frame and extend until the anchors encapsulate at least a portion of an incisal edge and extend over one or more sides of corresponding teeth. This positions the one or more dental attachments against corresponding tooth surfaces at predetermined positions. The one or more retention supports can also be positioned on (and in some cases, registered with) surfaces of one or more teeth (e.g., on a lingual side of the dental arch) to maintain the position of the dental attachments. The dental attachment can be affixed to the predetermined position on the tooth surface using, for example, one or more adhesives, as described herein. The dental attachments can be detached from the dental supports such that only the dental attachments from the structure remain coupled to the patient's dental arch.

Figure 12E:
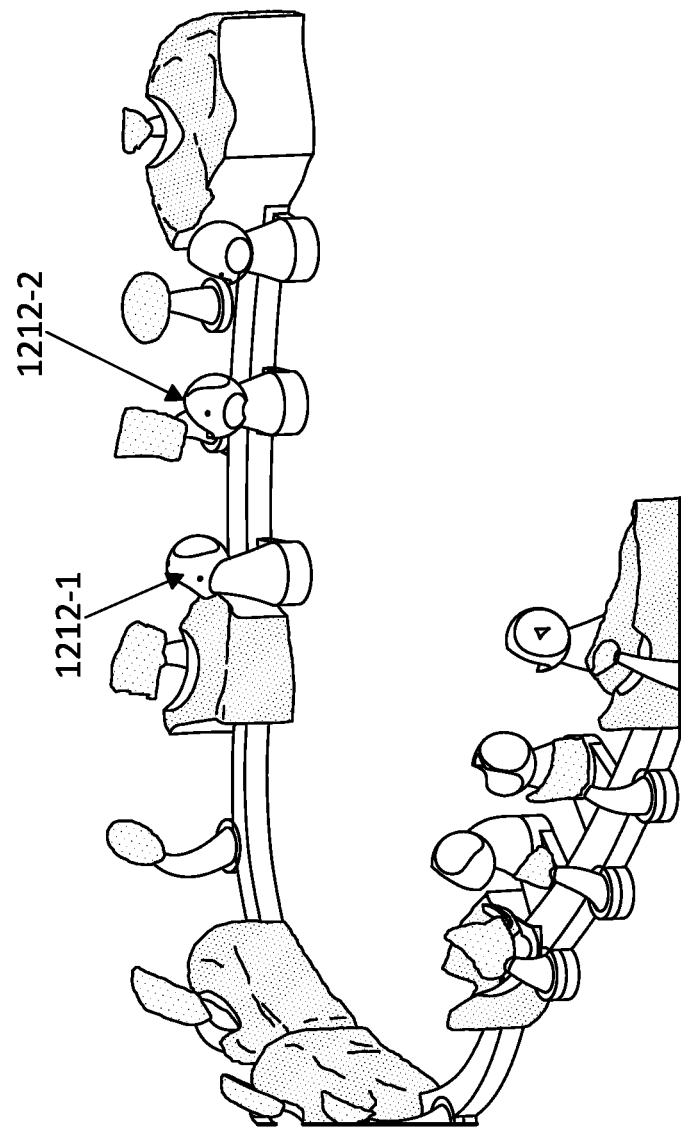
FIG. 12E illustrates a perspective side view of the dental attachment placement structure of FIG. 12A without a dental arch.
Figure 12F:
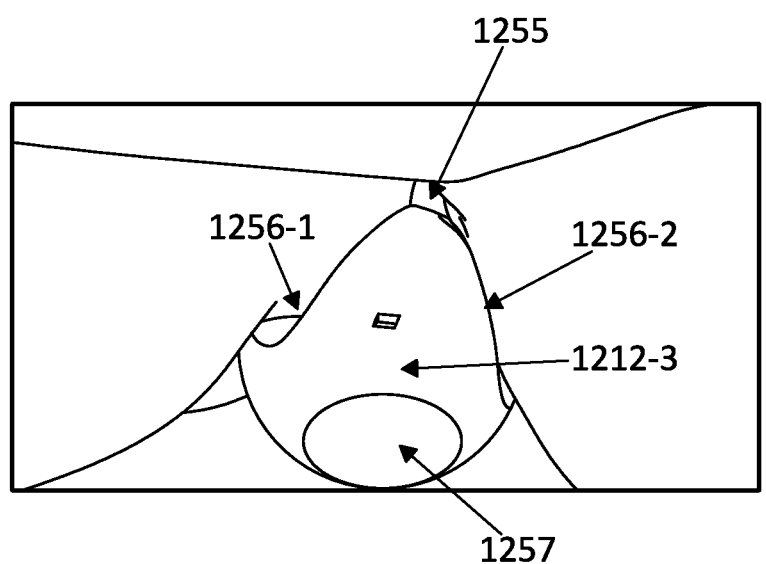
FIG. 12F illustrates a close-up view of a contact portion of a retention support of the dental attachment placement structure of FIG. 12A.

FIG. 12E illustrate a perspective view of the dental attachment placement structure of FIG. 12A without a dental arch, showing aspects of various contact portions (e.g., 1212-1 and 1212-2) of retention supports. 12F shows a close-up view of a contact portion 1212-3. The contact portion can be configured to be placed in the interproximal region 1255 between adjacent teeth. The contact portion can include one or more conforming surfaces (e.g., 1256-1 and 1256-2) that is configured to conform to the shape of teeth and/or gums. The conformed shape may allow the contact portion to grip onto a surface of the dental arch (e.g., on the lingual side). The shape of the contact portion 1212 can be determined based on virtual model. For instance, a virtual sphere (or cone, tetrahedron, etc.) can be placed in a virtual model of the interproximal region (based on a scan of the patient's dentition) and subtracting regions from the virtual sphere where the teeth would be. In this process, in some embodiments, the gingiva are also taken into account. In some instances, the virtual model of the gingiva can be enlarged by a scaling factor (e.g., making the gingiva 10% larger), and thus any portions of the virtual sphere that are contacting the scaled up gingiva are subtracted from the sphere. In this manner, the contact portion of the retention feature can be formed such that its surfaces will match those of the teeth that it will be in contact with and without interfering with (e.g., contacting) the gingiva, which may cause discomfort to the patient. In some embodiments, the contact portion of the retention feature includes one or more chamfered surfaces (e.g., 1257), e.g., to reduce the amount of protrusion of the contact portion from the dental arch, which may also increase the comfort to the patient.

Figure 12G:
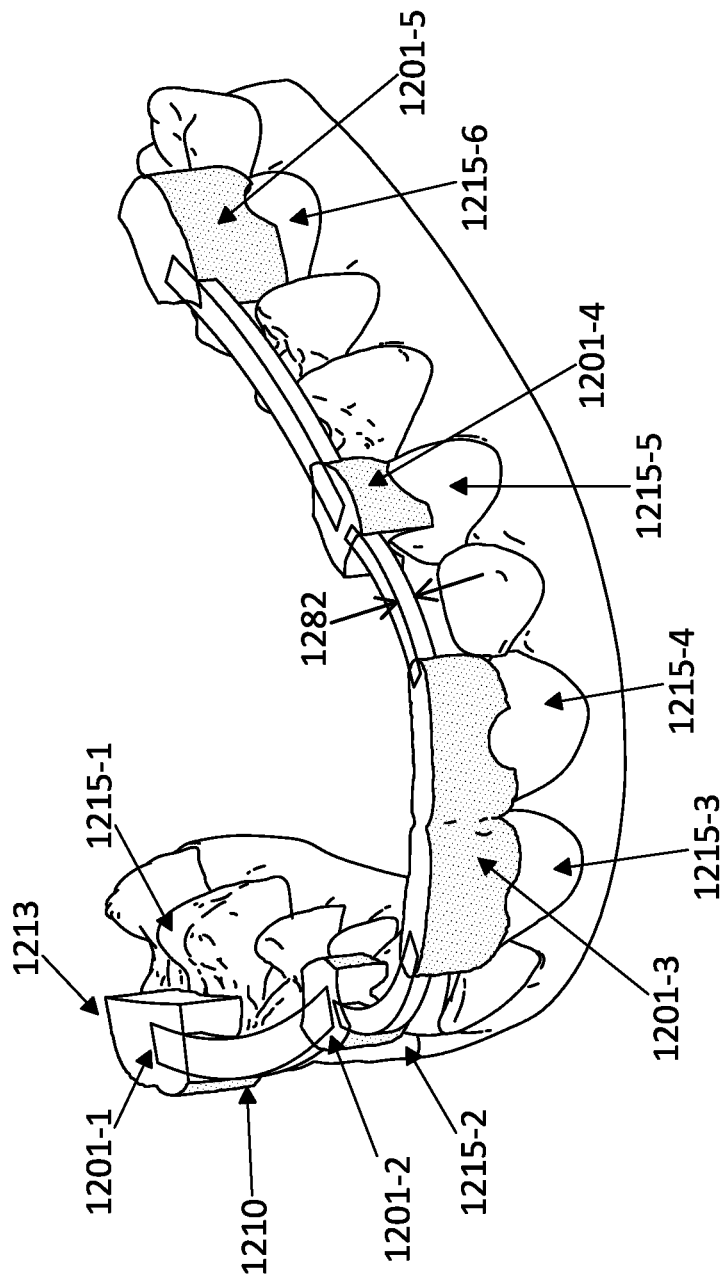
FIG. 12G illustrates a perspective side view of the frame and registration anchors of the dental attachment placement structure of FIG. 12A.
Figure 12H:
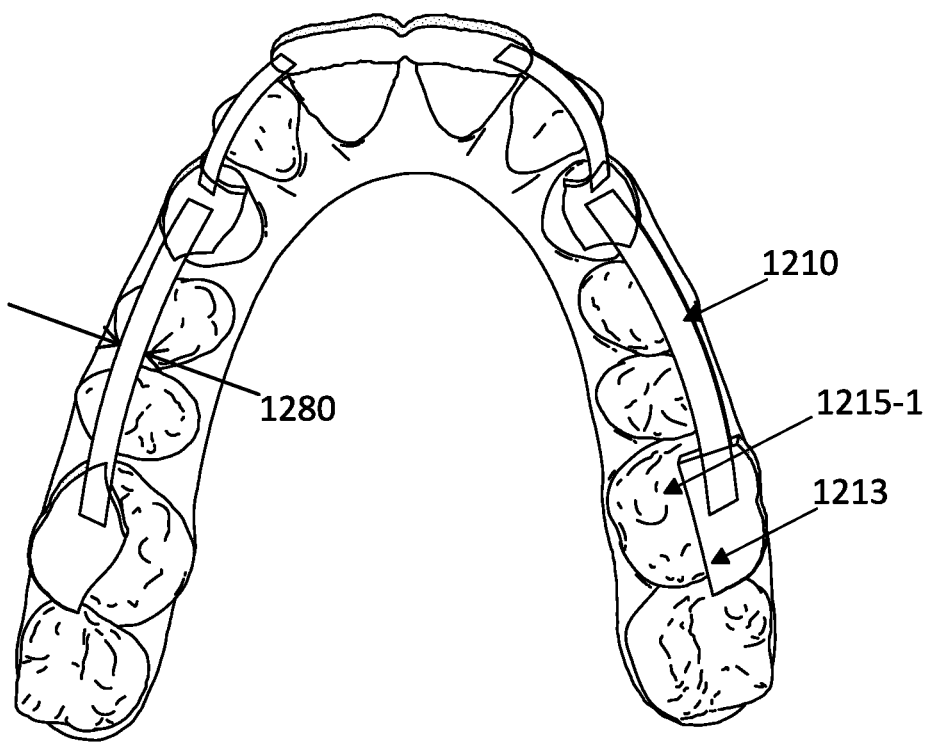
FIG. 12H illustrates an alternative perspective side view of the frame and registration anchors of the dental attachment placement structure of FIG. 12A.
Figure 12I:
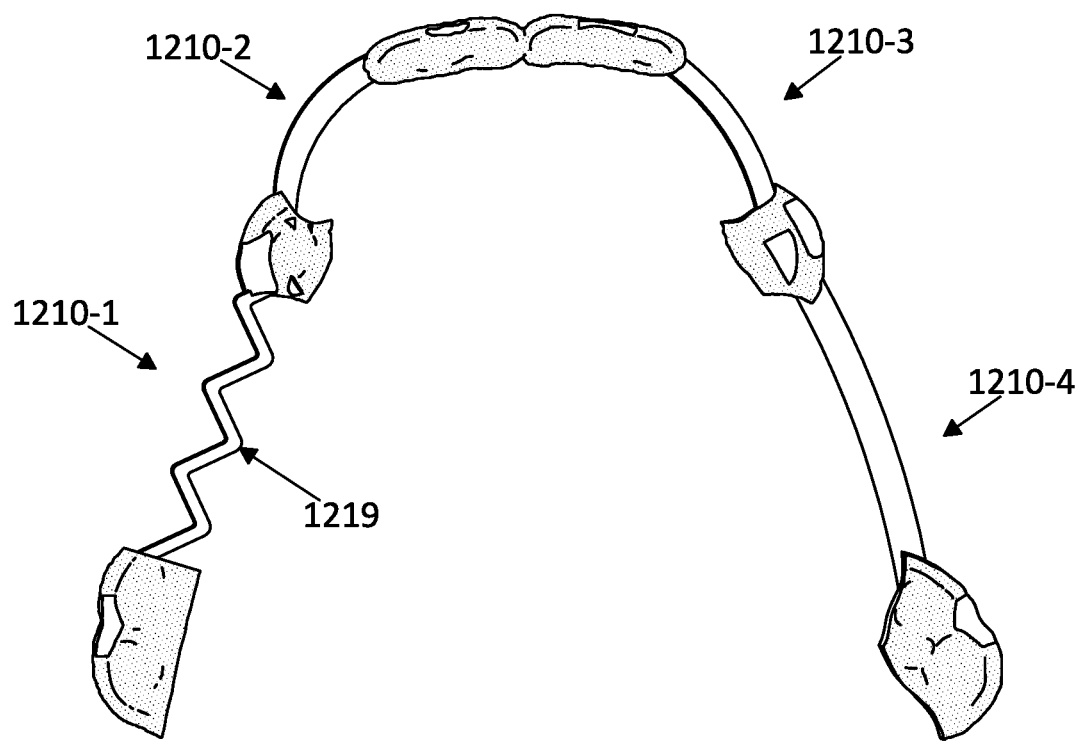
FIG. 12I illustrates an overhead view of an alternative of the dental attachment placement structure of FIG. 12A having a flexible frame portion.

FIGS. 12G and 12H show alternative views of the dental attachment placement structure of FIG. 12A without the dental attachments and retention supports to allow certain features to be examined and discussed more closely and to aid the reader's understanding. One or more registration anchors (e.g., 1201-1, 1201-2, 1201-3, 1201-4 and 1201-5) can be configured to register with one or more corresponding anchor teeth (e.g., 1215-1, 1215-2, 1215-3, 1215-4, 1215-5 and 1215-6). According to some embodiments, the buccal aspect 1213 (i.e., the tallest point of the buccal surfaces of a tooth) of the one or more anchor teeth can be used as the outermost limit of the dental attachment placement structure. A thickness (e.g., 1280) and width (e.g., 1282) of the frame (or portions of the frame) can be varied such that distance between the frame and the buccal aspect 1213 is as small as practical, thereby minimizing the distance between the frame and the dental arch.

In some embodiments, one or more portions of the dental attachment placement structure is flexible in order to reduce stress concentrations in portions of the structure. Since the dental attachment placement structure may be made of brittle material (e.g., some composite materials), such flexible features can allow the structure to be more resilient and less prone to breakage while still being made of material(s) having desirable properties such as stiffness. The flexible features can reduce the occurrence of breakage during handling (e.g., during manufacture and shipping) of the structure. Having flexible features may allow more structures to be printed (e.g., on a build plate) per 3D printing run. The flexible features may also allow the structures to bend in ways that reduce the dimensions of the structures for more efficient packaging. The flexible features may also provide some tolerance so that the structure can fit on the patient's dental arch more easily. FIGS. 12G-12K show variations of the dental attachment placement structure 12A with various flexible features, in accordance with some embodiments. FIGS. 12G-12K do not show certain features, such as dental attachments and retention supports for simplicity; however, such features can be included.

FIG. 12G illustrates an overhead view of the dental attachment placement structure where a portion 1210-1 of the frame is modified to have a zig-zag or "Z" shape as an alternative to an arch shape. In other variations, the flexible portion can have a sinusoidal or "S" shaped pattern. Such geometries may allow the flexible portion 1210-1 to bend or twist in response to forces (e.g., pushing, pulling, twisting) that may be applied to the frame, thereby distributing the stress and reducing stress concentrations. One or more of portions 1210-1, 1210-2, 1210-3 and 1210-4 of the frame may include such modified curved geometry, depending on particular needs. These types of changes in geometry of the frame allow the frame (or portions thereof) to be flexible without changing the material of the frame. That is, flexible portion 1210-1 may be made of the same material as one or more of portions 1210-2, 1210-3 and 1210-4 of the frame, attachment supports, attachment supports and retention anchors. This solution may be more cost effective than manufacturing the structure with different materials having different degrees of flexibility.

Figure 12J:
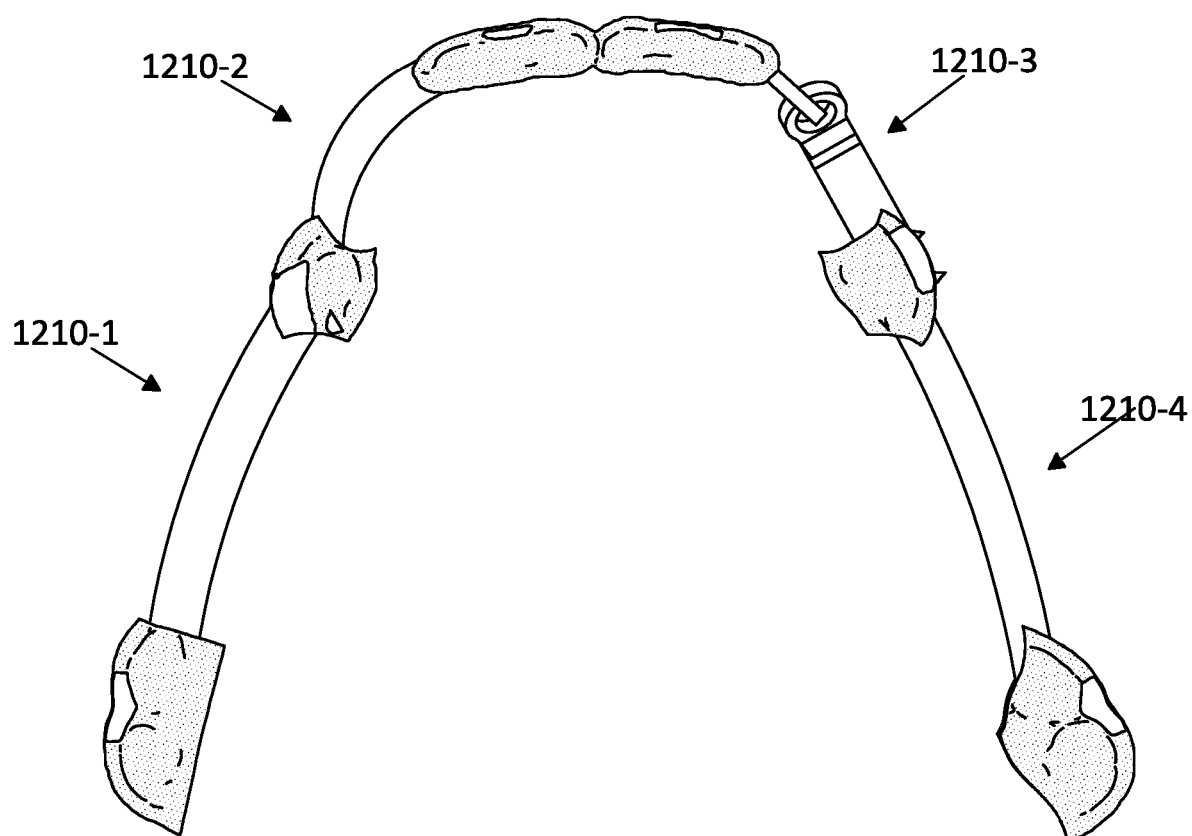
FIGS. 12J and 12K illustrate an overhead view and perspective side views of another alternative of the dental attachment placement structure of FIG. 12A having a flexible frame portion.
Figure 12K:
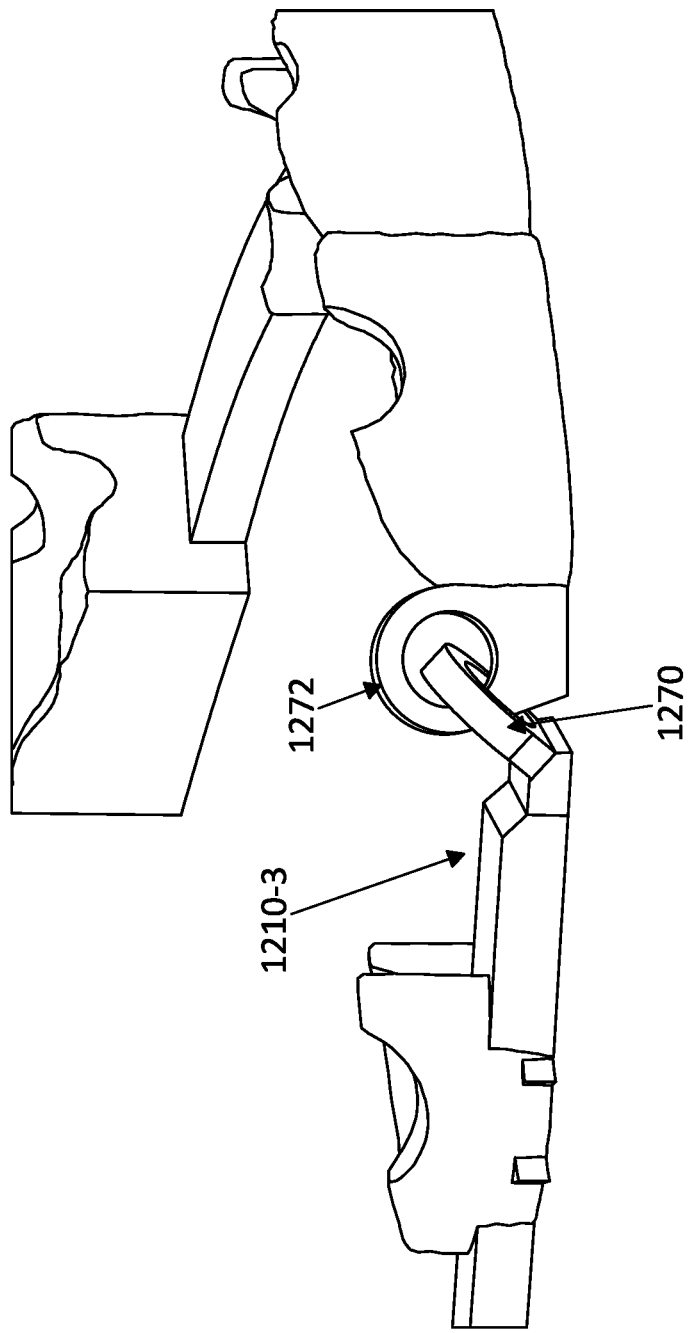

FIGS. 12J and 12K illustrate a link joint alternative to the arch-shaped frame portions of FIG. 12A. The link joint can include interlocking links, such as a first link 1270 and second link 1272 denoted in FIG. 12K. The link joint can include any number of interlocking links (e.g., 2, 3, 4, 5, 6, 10, 20). The interlocking nature of the link joint may allow the links to move with respect to each other while remaining connected with each other. As with a zig-zag or sinusoidal geometry, the link joint geometry can give the frame portion 1210-3 flexibility for resisting breakage when a force (e.g., pushing, pulling, twisting) are applied to the frame. The link joint can be placed anywhere along the frame as needed, including one or more of portions 1210-1, 1210-2, 1210-3 and 1210-4 of the frame. It should be noted that the linked link joint geometry may efficiently be formed using a 3D printing process, whereby the interlocking links can be formed intact (i.e., linked).

Figure 12L:
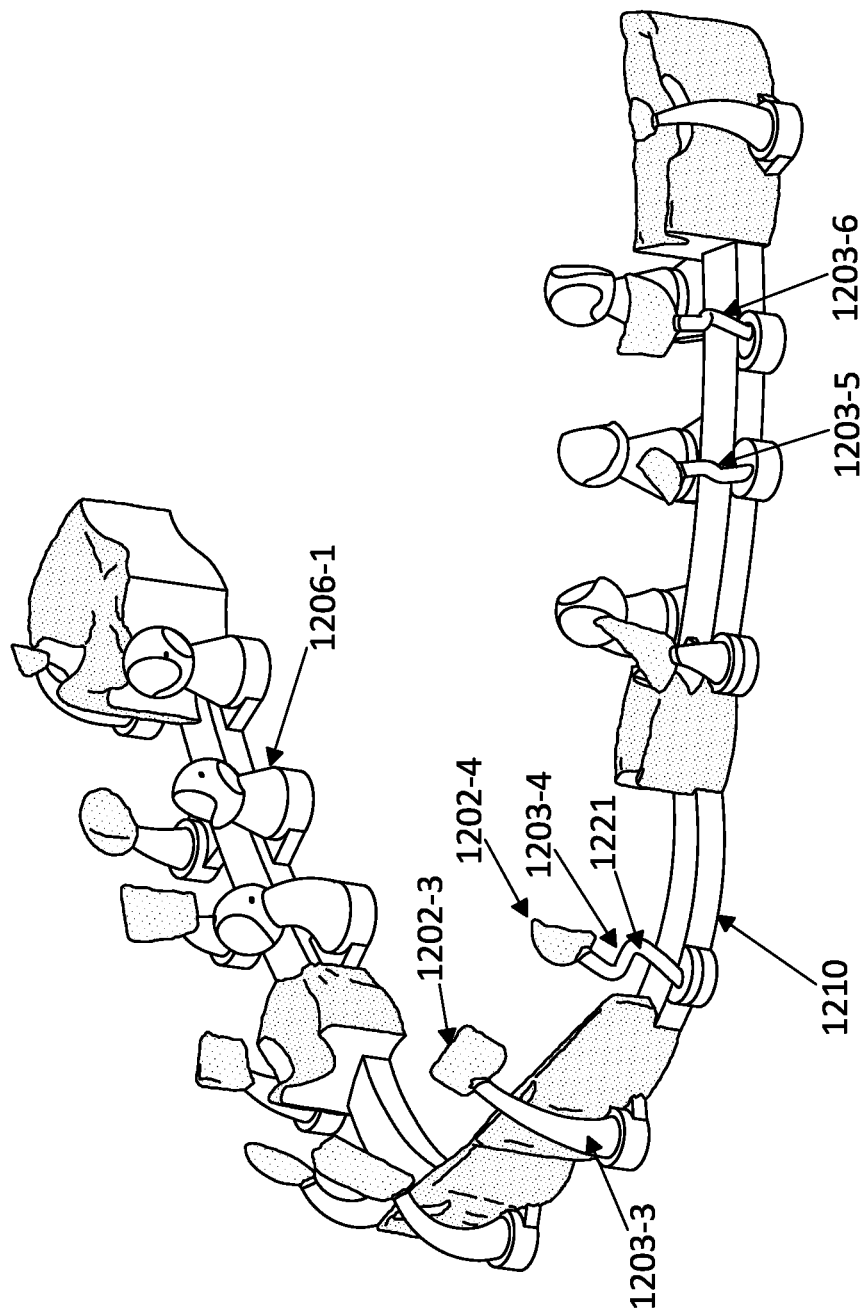
FIG. 12L illustrates a perspective side view of an alternative of the dental attachment placement structure of FIG. 12A having a flexible attachment support.

The dental attachment placement structure may have flexible portions other than the frame. FIG. 12L illustrates an alternative variation of the structure of FIG. 12A having flexible attachment supports 1203-4, 1203-5 and 1203-6. As opposed an attachment support which tapers from a thicker diameter near the frame to a thinner diameter near the attachment (e.g., 1203-3), the flexible attachment supports may be thinner in diameter and have a sinusoidal or zig-zag shape that provides increased flexibility and resilience in response to an applied force (e.g., pushing, pulling, twisting). Having a more flexible attachment support can also allow for more maneuverability of the attachment (e.g., 1203-4) by the treatment specialist during placement and affixing of the attachment, and may reduce the risk of the attachment support being accidently adhered to the tooth surface. The flexible attachment support can have any shape and is not limited to the sinusoidal or zig-zag shape shown in FIG. 12K. For example, a spring (e.g., spiral), arc, bow or hook shape may also provide a desired amount of flexibility. The dental attachment placement structure can have any number of flexible attachment supports (e.g., 1, 2, 3, 4, 5, 8, 10). In some cases, one or more of the retention supports (e.g., 1206-1) may have a flexible geometry (e.g., sinusoidal or zig-zag shape).

Figure 18:
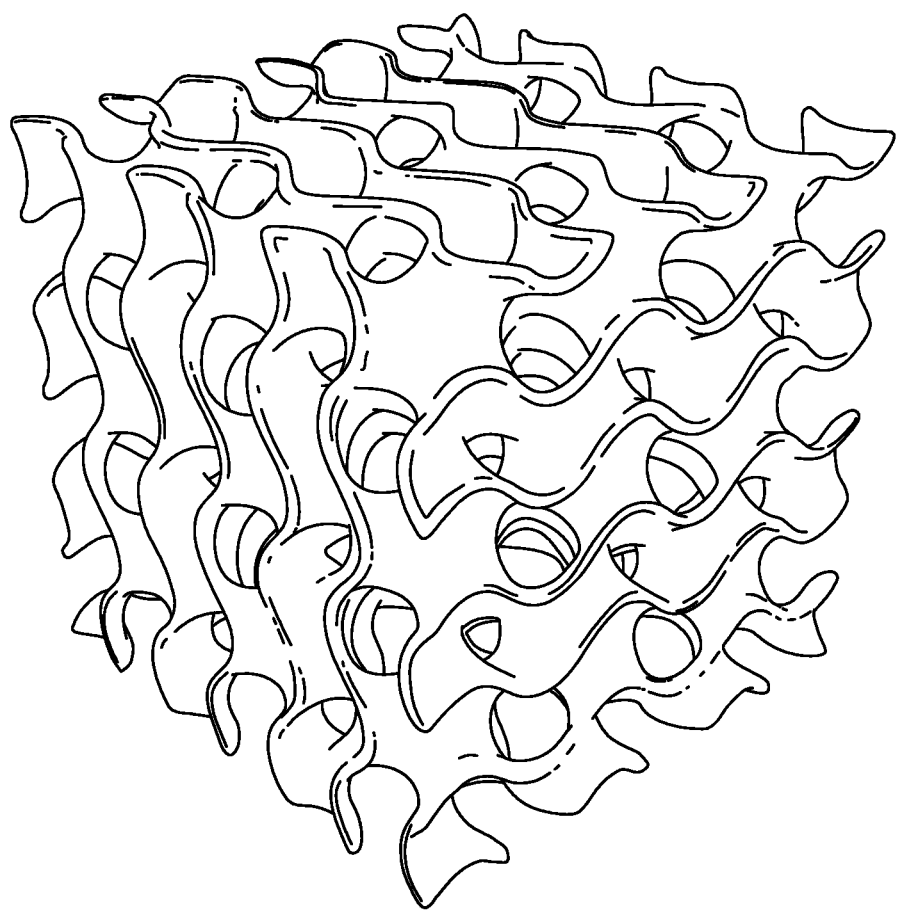
FIG. 18 illustrates an angled side view of lattice structures that can be incorporated into a portion of a dental attachment placement structure, such as an attachment, according to some embodiments.

According to some embodiments, the material forming the one or more features of the dental attachment placement structure provides flexibility. FIG. 18 illustrates a perspective view of an example of a lattice structure that can be incorporated into one or more portions of any of the dental attachment placement structures described herein. The lattice structure can include cavities that can increase the flexibility and/or reduces material consumption and weight of the structure. The lattice structure is incorporated into one or more of the frame, registration anchors, attachments, attachment supports, retention supports, or other portion of a dental attachment placement structure. As such, the rigidity or flexibility of the elements can be adjusted based upon the desired implementation.

A dental attachment placement structure may include any combination of the flexible features of FIGS. 12G-12L and 18. For example, the structure can include one or more flexible frame portions 1219 (e.g., FIG. 12I), one or more flexible attachment supports 1221 (e.g., FIG. 12L) and/or one or more flexible retention supports. The number of flexible features can vary depending on particular needs. Generally, the structure may have some flexibility to resist breakage and rigid enough to support and maintain the attachment(s) when placed on a patient's dental arch. In some embodiments, the flexible features are made of the same material as other portions of the structure, as described above. The flexibility may arise, at least in part, due to the shape; e.g., sinusoidal, zig-zag, etc. shapes may be used. In some embodiments, the flexible features are made of a different material (e.g., more flexible) than other portion of the structure.

Figure 12M:
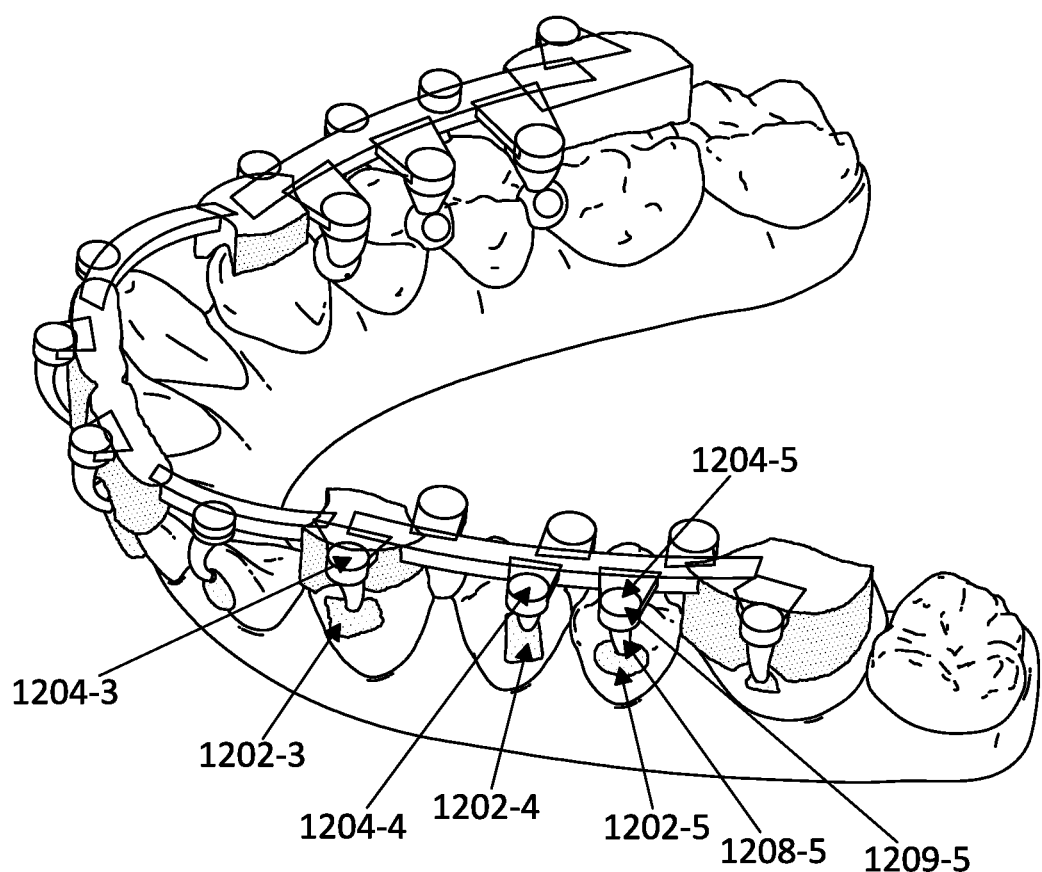
FIGS. 12M and 12N illustrate various perspective side views of the dental attachment placement structure of FIG. 12A showing aspects of the attachment supports.
Figure 12N:
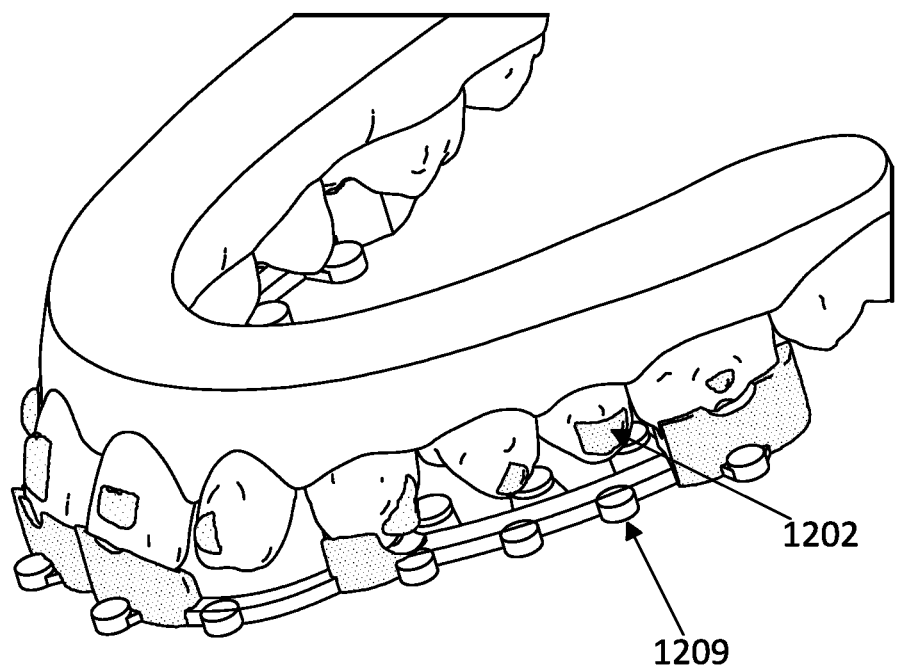

As described herein, the dental attachment placement structure can be formed based on a virtual model. According to some embodiments, the location and orientation of the frame and other features of the structure are determined based on the location of the dental attachments in the virtual model. FIGS. 12M and 12N illustrate one example of how features of the dental attachment placement structure of FIG. 12A can be formed from a virtual model. The side perspective view of FIG. 12M illustrates a side perspective view of the structure showing how the attachment support 1204-5 that supports attachment 1202-05 can include a base portion 1209-5 and a bridge portion 1209-5. Although not necessary in all embodiments, the base portion 1209-5 can be a solid, extruded, circular structure. The diameter and thickness of the attachment support may vary. The base portion 1209-5 may have a greater thickness (e.g., diameter) than the bridge portion 1208-5.

To determine the location and orientation of the frame 1210, a center of the attachment 1202-3 can be located and projected vertically until it intersects with the plane of the frame 1210. This point can be used as a reference (e.g., correspond to the center of a circle) used to create the base portion 1209-5, thereby informing the location and orientation of the frame 1210. The bridge portion 1209-5 can be formed to connect the base portion 1209-5 to the frame or registration anchor. The dental attachments 1202-4 and 1202-5 can likewise be used to create corresponding base portions and bridge portions for connecting the attachment supports 1204-4 and 1204-5 to the frame or a registration anchor, as well as the remaining dental attachments and attachment supports, until the location and orientation of the entire frame 2101 is determined. During, for example a 3D printing process, the attachment support may be centered under the dental attachment. FIG. 12N illustrates a different view of a base portion 1209 of an attachment support (without the bridge portion) with respect to a corresponding attachment 1202.

Figure 13A:
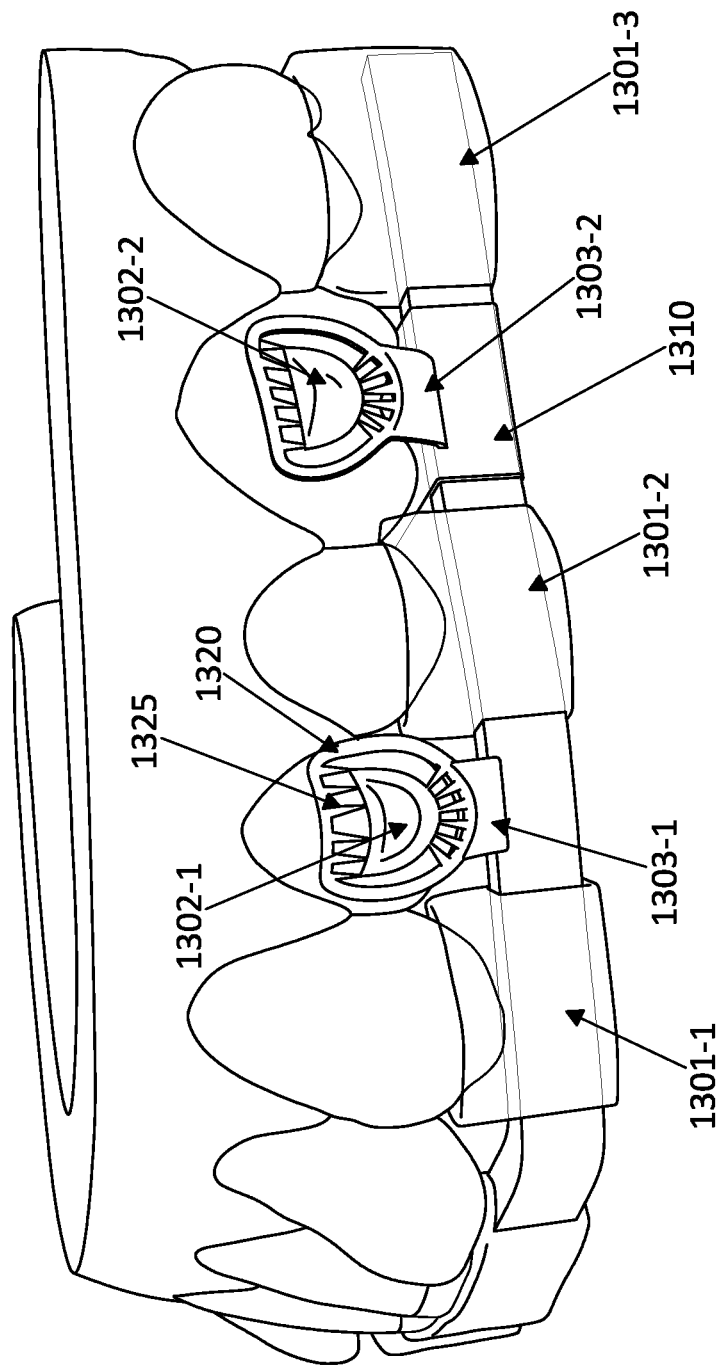
FIG. 13A illustrates a buccal side view of a dental attachment placement structure showing an attachment frame that supports a dental attachment according to a number of embodiments.
Figure 13B:
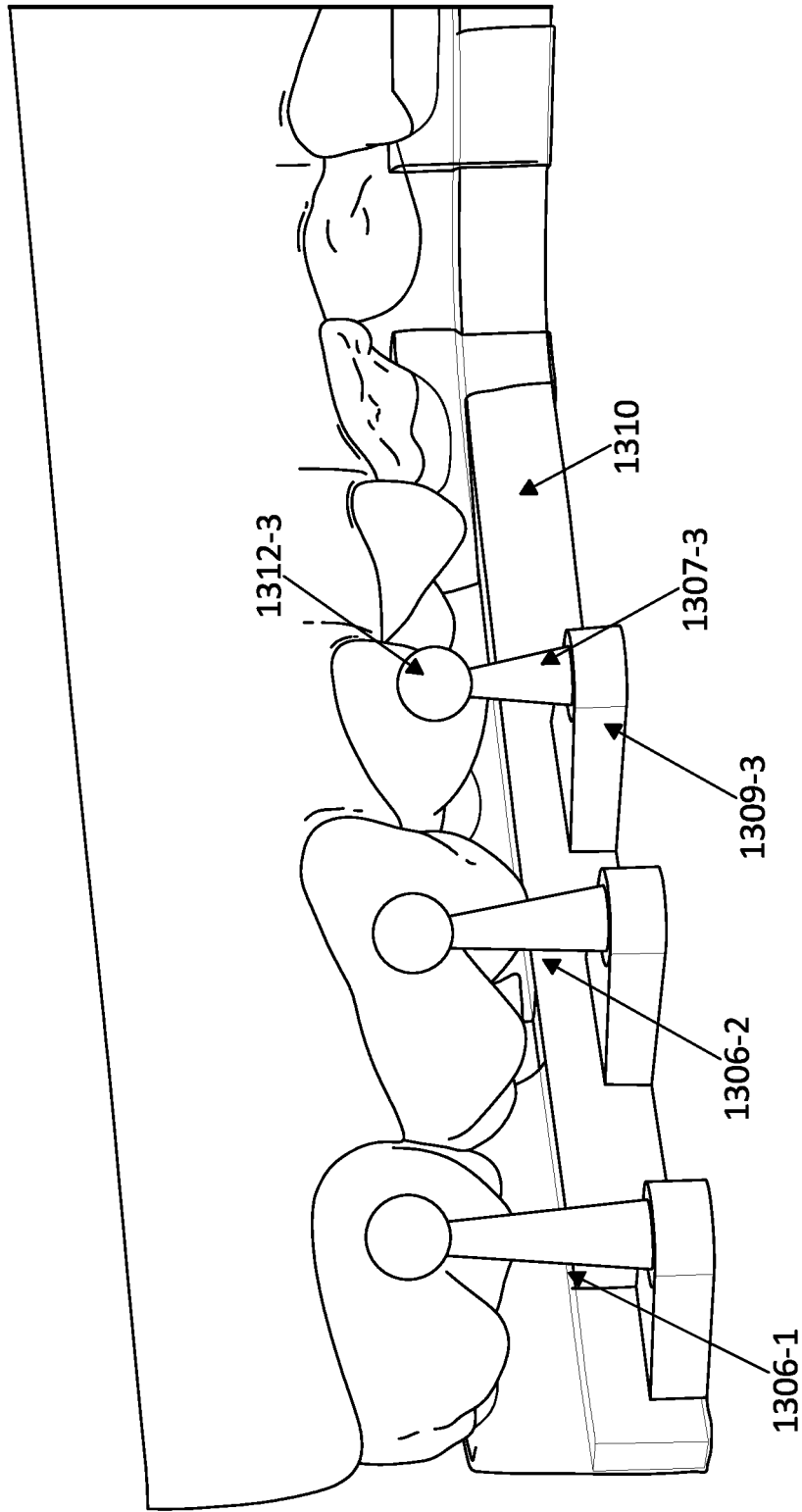
FIG. 13B illustrates a lingual side view of the dental attachment placement structure of FIG. 13A showing an attachment frame and retention supports according to some embodiments.

FIG. 13A shows a buccal side view and FIG. 13B shows a lingual side view of an alternative dental attachment placement structure according to a number of embodiments. The dental attachment placement structure can have similar features of the dental attachment placement structure of FIGS. 12A-12N, such as a frame 1310, one or more attachments (e.g., 1302-1 and 1302-2), one or more attachment supports (e.g., 1303-1 and 1303-2), one or more registration anchors (e.g., 1301-1, 1302-2 and 1301-3), and one or more retention supports (e.g., 1306-1 and 1306-2). The one or more retention supports can include a contact portion (e.g., 1312-3), a horizontal portion 1309-3 that extends in a horizontal direction with respect to the frame 1310, and a vertical portion 1307-3 that extends in a vertical direction with respect to the frame 1310.

As illustrated in Figured 13A, an attachment may be supported by an attachment frame (e.g., 1320) attached to the attachment support (e.g., 1303-1) and which may at least partially surround a perimeter of the attachment (e.g., 1302-1). The attachment may be connected to the attachment frame via one or more struts (e.g., 1325), which may correspond to a frangible portion of the attachment frame. For example, an interface region between a strut and the attachment may be sufficiently frangible such that the attachment can be detached from the attachment frame without the use of a detachment tool (e.g., by the user's hands). In some instances, the struts have a tapered geometry, whereby a thickness of the strut tapers down from the attachment frame to the attachment. The attachment frame can include any number of struts (e.g., 1, 2, 3, 4, 5, 10, 20). I some cases, the struts at least partially surround the perimeter of the attachment to maintain the attachment in position within the attachment frame. The attachment frame may be configured to protect the attachments and/or struts from being detached and/or damaged during manufacturing, handling and shipping.

As illustrated in Figured 13B, the one or more retention supports (e.g., 1306-1 and 1306-2) can be configured to contact a tooth surface between interproximal regions (e.g., a single tooth). In some cases, the one or more retention supports is configured to contact a crown surface of one or more teeth. This non-interproximal regions contact configuration can provide greater retention through increased surface contact with the one or more teeth. Further, this may provide a more accurate registration surface for the contact portion (e.g., 1312-3) since in some cases a digital scan of the interproximal region may be less accurate than a scan of a tooth surface between interproximal regions. In some embodiments, the dental attachment placement structure includes a combination of one or more retentions supports configured to contact one or more interproximal regions and one or more retentions supports configured to contact a tooth surface between one or more interproximal regions.

Figure 13C:
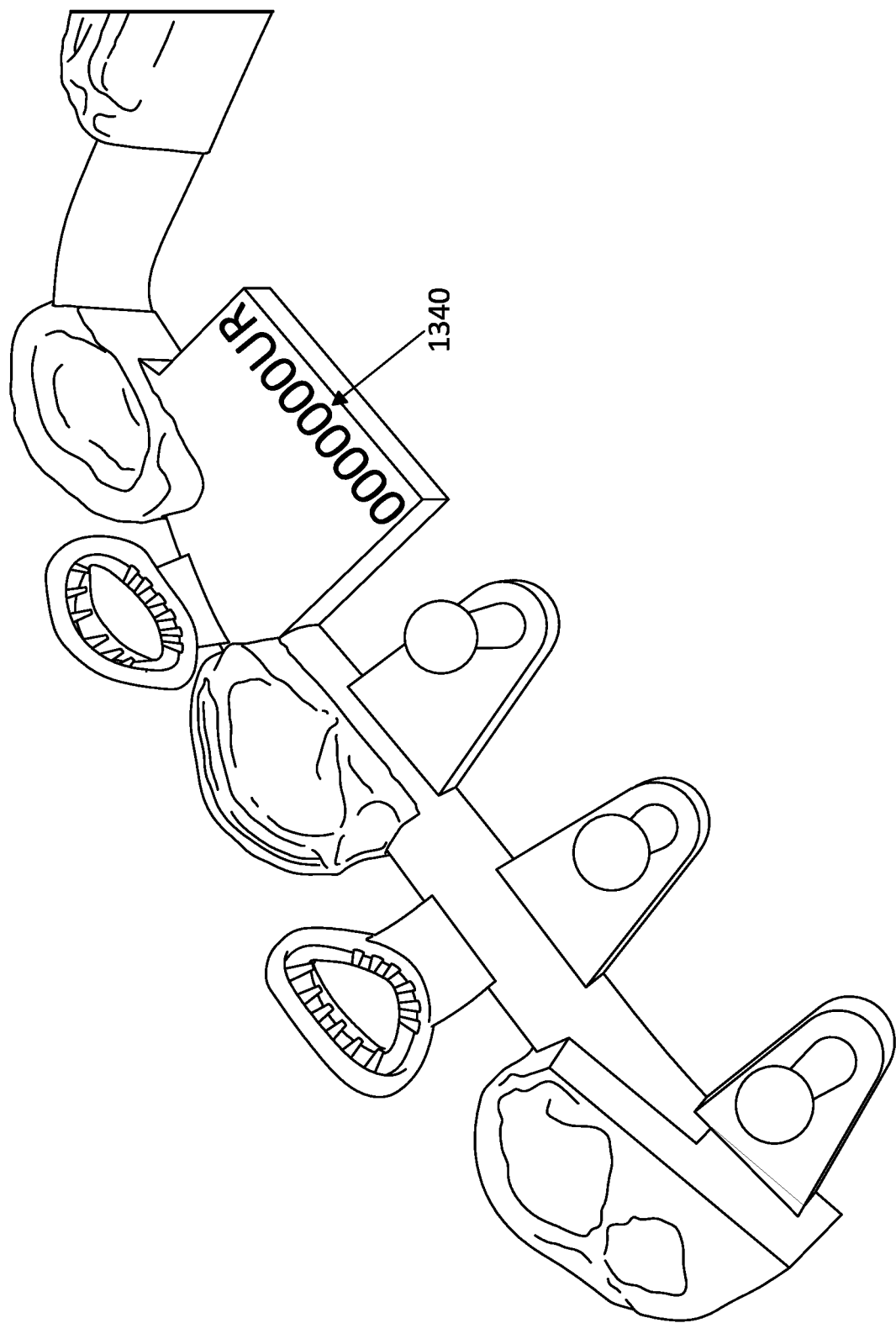
FIG. 13C illustrates an overhead view of the dental attachment placement structure of FIG. 13A showing a device identifier according to some embodiments.

FIG. 13C illustrates an overhead view of the dental attachment placement structure of FIG. 13A showing an identifier 1340 according to some embodiments. The identifier may be a device identifier 1340 that uniquely identifies the model, lot number, specific device, patient or other identifying characteristic of the dental attachment placement structure. The identifying may include one or more number, letters and symbols. In some cases, the identifier is integrated into the device during manufacture. For example, the identifier may be added in a virtual model of the dental attachment placement structure such that the identifier is integrated into the structure when 3D printed. In some cases, the identifier is added after forming the dental attachment placement structure.

FIG. 13D illustrates a side view of the dental attachment placement structure of FIG. 13A showing an exemplary attachment surface 1350 of an attachment 1302-2 according to some embodiments. The attachment surface may be textured surface to provide more surface area and to increase the shear bond strength between attachment and the surface of the target tooth. In some embodiments, the textured surface is a grid pattern, as shown in the inset view of FIG. 13D. Other variations of textured surfaces can include one or more lines or bars (e.g., horizontal, vertical, diagonal and/or radial), cross-hatches, circular, zig-zag, sinusoidal, and polygonal (e.g., squares, rectangles, triangles, hexagons) patterns. In some cases, the textured surface is added to a virtual model of the dental attachment placement structure and integrated into the structured during manufacture (e.g., 3D printing). In some cases, the textured surface is added after forming the dental attachment placement structure.

In some embodiments, one or more of the dental attachments includes an auxiliary feature to provide a particular function according to a treatment plan. The one or more auxiliary features may be used in conjunction with one or more orthodontic appliances, such as an aligner, elastic band, brace and/or bracket, to apply prescribed forces to the patient's teeth. According to some embodiments, the dental attachment placement structure includes attachments with integrated auxiliary features for easier and more accurate placement of the auxiliary features on the dental arch. Examples of auxiliary features can include one or more of a power arm, hook, button, spring, brace, bracket, wire, rod, band, blade, coil, elastic, ring, track, link and chain.

Figure 14A:
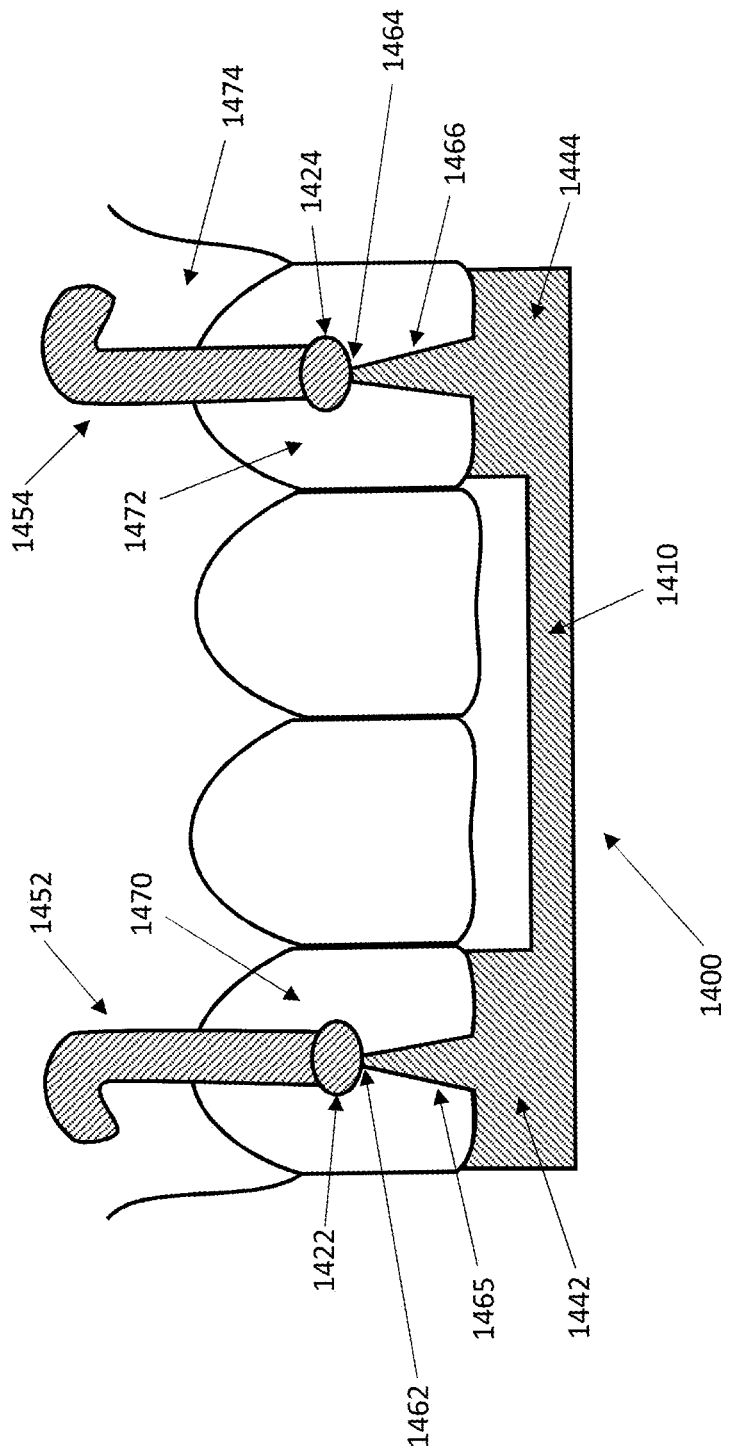
FIG. 14A illustrates a side view of a dental attachment placement structure having dental attachments with power arms according to a number of embodiments.
Figure 14B:
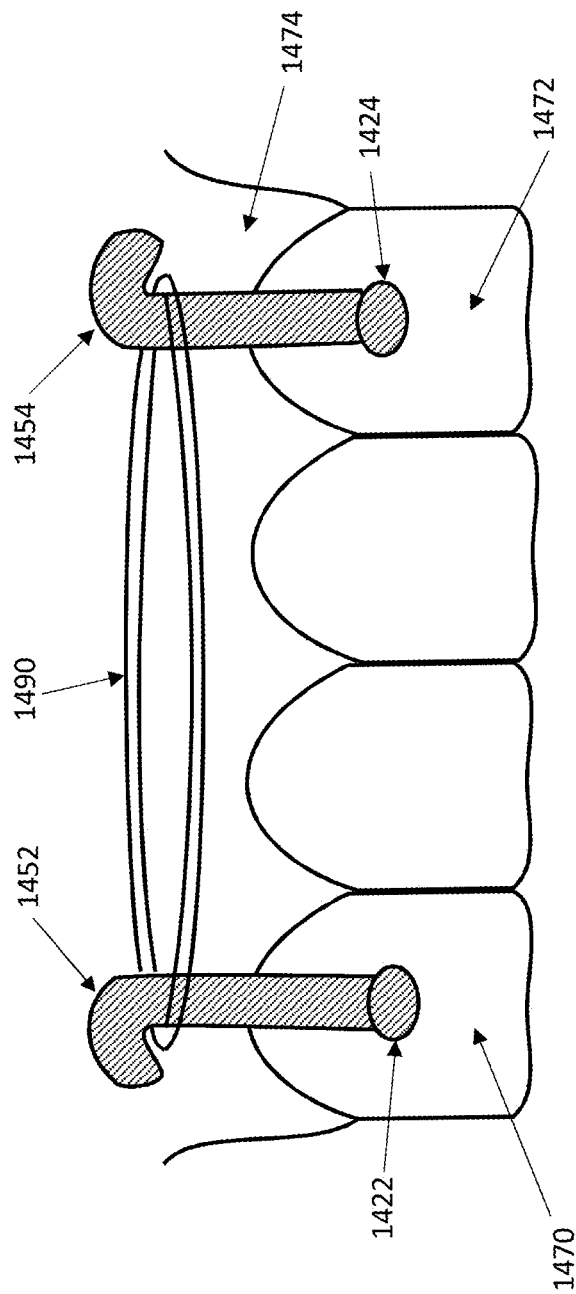
FIG. 14B illustrates the dental attachments with power arms of FIG. 14A after the dental attachment placement structure is removed and a resilient member is coupled thereto.

FIGS. 14A and 14B illustrate side views of exemplary dental attachments having power arm auxiliary features being attached to a dental arch using a dental attachment placement structure 1400. The dental attachment placement structure 1400 can include similar features as the structures of FIGS. 12A-12N and 13A-13D such as one or more frames (e.g., 1410), one or more dental attachments (e.g., 1422 or 1424), one or more registration anchors (e.g., 1442 or 1444), and one or more retention supports. One or more of the attachments can include an auxiliary feature (e.g., 1452 or 1454) that extends from the attachment. In the example shown, the auxiliary feature is an elongated hook, also referred to as a power arm. In some cases, the auxiliary feature is added to a virtual model of the dental attachment placement structure and integrally formed with the structure (e.g., using 3D printing). The placement, size, angle and other aspects of the auxiliary feature can be determined (e.g., calculated) depending on a desired movement of teeth according to a treatment plan.

Once the dental attachment placement structure is formed, it may be positioned on the patient's dental arch, such as shown in Figured 14A. For example registration anchors 1442 and 1444 can be placed on and adjusted to register with corresponding teeth 1470 and 1472, respectively. The retention supports (if any) may also be positioned on an opposing (e.g., lingual) side of the dental arch for support. Once registered in the predetermined position of a tooth, the attachment can be affixed to the tooth using methods described herein, such as using an adhesive. The attachment and auxiliary feature can be detached from the dental attachment placement structure at an interface region (e.g., 1462 or 1464) between the attachment and an attachment support (e.g., 1465 or 1466). In some embodiments, the interface region may be frangible such that the attachment may be removed without a detachment tool. In some embodiments, the attachment is configured to be removed using a detachment tool.

FIG. 14B shows the dental attachments with the auxiliary features on corresponding teeth after the dental attachment placement structure is removed and a resilient band 1490 is hooked onto the auxiliary features. In the some embodiments, the auxiliary feature is configured to extend above (or below) the gum line such that a portion of the auxiliary feature extends in the direction of the gingiva 1474 and the root of the tooth. This may allow the auxiliary feature to increase the moment arm of the auxiliary feature, as desired in some power arm applications. For example, the longer the auxiliary features 1452 and 1454, and the higher the band 1490 is placed on the auxiliary features 1452 and 1454, the greater the pulling force for pulling teeth 1470 and 1472 together. In some embodiments, the attachments (e.g., 1422 or 1424) and/or auxiliary features (e.g., 1452 or 1454) are also used in conjunction with one or more additional orthodontic devices, such as an aligner, to move teeth in the dental arch according to a treatment plan.

Figure 15:
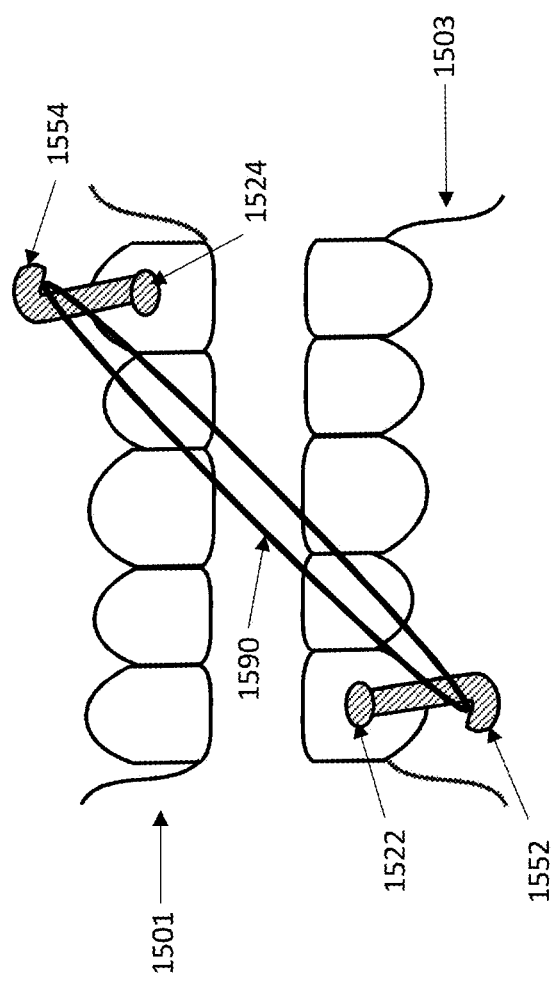
FIG. 15 illustrates dental attachments with power arms attached to opposing dental arches and a resilient member coupled thereto.

FIG. 15 illustrates another example of an application of dental attachments with auxiliary features. A first auxiliary feature 1552 can be attached to a first dental attachment 1522 on a tooth of a first dental arch 1503 of the patient. A second auxiliary feature 1554 can be attached to a second dental attachment 1524 on a tooth of a second dental arch 1501 of the patient. An elastic band 1590 can be hooked onto the first and second auxiliary features to provide a pulling force to pull corresponding teeth in toward each other. The angles of the first and second auxiliary features may vary depending on a desired force direction. In some embodiments, the attachments and/or auxiliary features are also used in conjunction with one or more additional orthodontic devices, such as one or more aligners, to move teeth in the first and/or second dental arches according to a treatment plan.

Figures 16A, 16B:
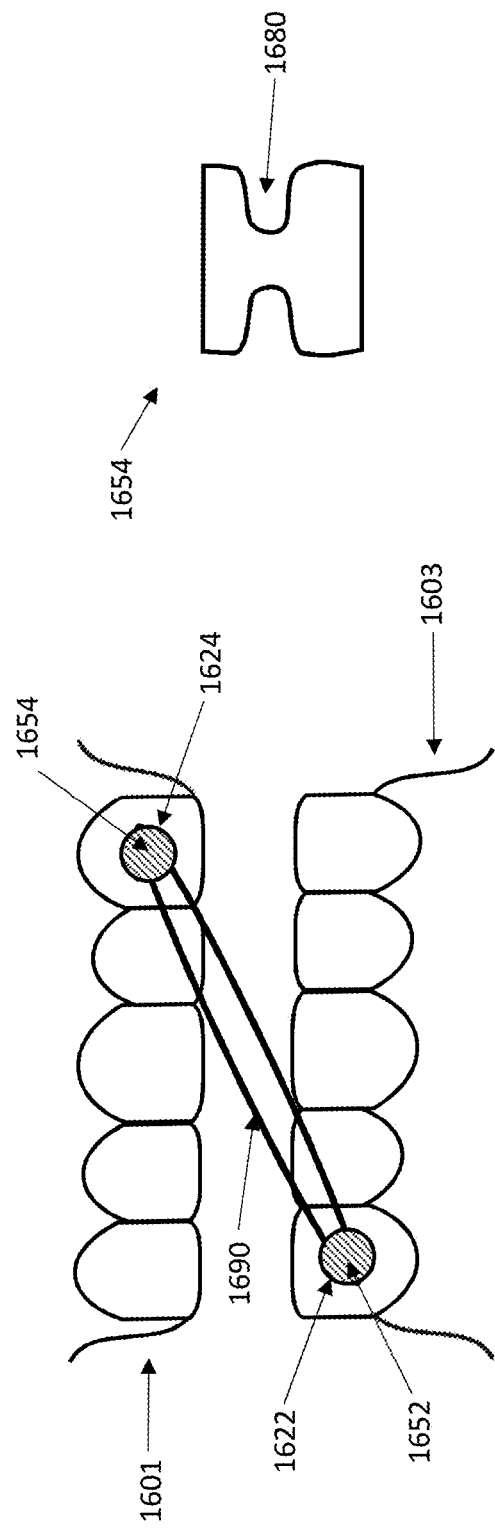
FIGS. 16A and 16B illustrate dental attachments with button auxiliary features attached to opposing dental arches and a resilient member coupled thereto.

FIG. 16A illustrates a further example of dental attachments with auxiliary features. The dental attachment (e.g., 1622 or 1624) can include an auxiliary feature (e.g., 1652 or 1654) in the form of a button. FIG. 16B shows an example section view of the button auxiliary feature 1654, showing a groove 1680 that an elastic band 1590 can be hooked around. The elastic band 1590 can be hooked around the button auxiliary features 1652 and 1654 to apply a pulling force toward corresponding teeth on opposing dental arches 1601 and 1603. In some embodiments, the attachments and/or auxiliary features are also used in conjunction with one or more additional orthodontic devices, such as one or more aligners, to move teeth in the first and/or second dental arches according to a treatment plan.

In some embodiments, the auxiliary feature and attachment are supported by an attachment frame, such as illustrated in in the example of FIG. 17. The dental attachment (e.g., 1720) with auxiliary feature (e.g., 1750) attached thereto can be supported by an attachment frame (e.g., 1755), which is connected directly or indirectly to the frame. In some cases, the attachment frame is directly or indirectly connected to the frame by an attachment support (e.g., 1765) that extends from the frame. The attachment frame may surround at least a portion of the attachment and/or the auxiliary feature, and be connected to the attachment and/or the auxiliary feature by one or more struts (e.g., 1758). In some embodiments, the one or more struts are frangibly coupled to the attachment and/or the auxiliary feature for easier removal (e.g., with or without the use of a detachment tool). The one or more struts may have a tapered geometry.

As described herein, the dental attachment placement structures described herein can be made of one material or a combination of materials. In some cases, the dental attachment placement structures can formed of one or more polymers (e.g., polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, or a combination thereof). In some embodiments, the dental attachment placement structure can be fabricated out of a second material that is different than the attachment material. For example, the attachment can be fabricated from a composite material and the dental attachment placement structure can be fabricated from a polymer, such as those discussed above. In some embodiments, the attachment and dental attachment placement structure can be constructed such that they are connected to each other. As discussed herein, this connection can be designed to be cut, broken, or otherwise released to allow the dental attachment placement structure to be removed while the attachment is positioned on the tooth.

Figure 11:
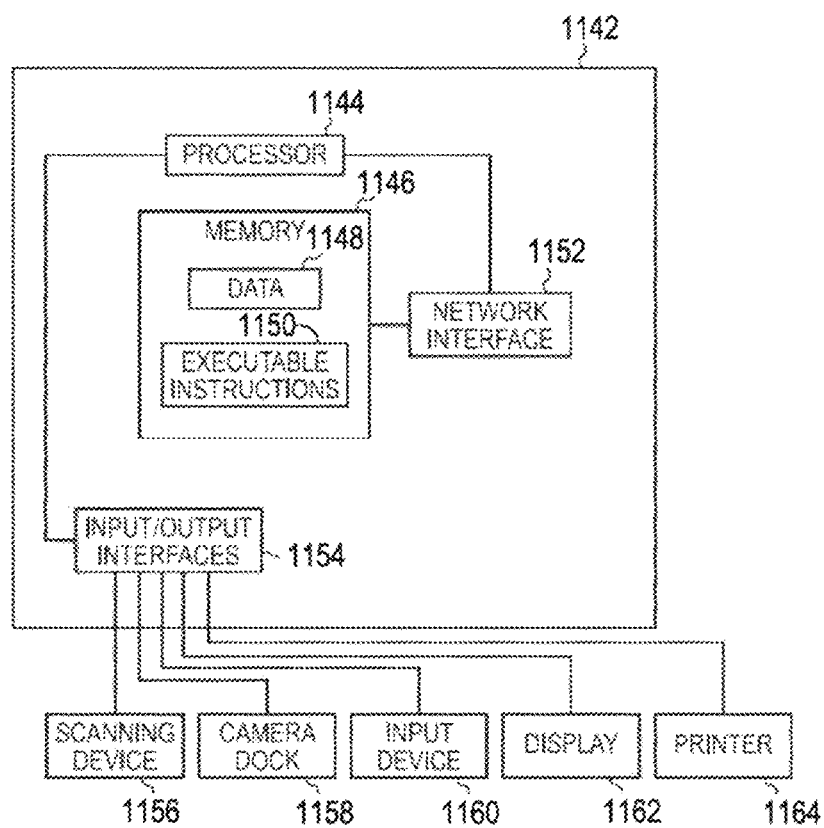
FIG. 11 illustrates a computing device that can be utilized according to one or more embodiments of the present disclosure.

FIG. 11 illustrates a computing device that can be utilized according to one or more embodiments of the present disclosure. For instance, a computing device 1142 can have a number of components coupled thereto. The computing device 1142 can include a processor 1144 and a memory 1146. The memory 1146 can have various types of information including data 1148 and executable instructions 1150, as discussed herein. The processor 1144 can execute instructions 1150 that are stored on an internal or external non-transitory computer device readable medium (CRM). A non-transitory CRM, as used herein, can include volatile and/or non-volatile memory. Volatile memory can include memory that depends upon power to store information, such as various types of dynamic random access memory (DRAM), among others. Non-volatile memory can include memory that does not depend upon power to store information.

Memory 1146 and/or the processor 1144 may be located on the computing device 1142 or off of the computing device 1142, in some embodiments. As such, as illustrated in the embodiment of FIG. 11, the computing device 1142 can include a network interface 1152. Such an interface 1152 can allow for processing on another networked computing device, can be used to obtain information about the patient, and/or can be used to obtain data and/or executable instructions for use with various embodiments provided herein.

As illustrated in the embodiment of FIG. 11, the computing device 1142 can include one or more input and/or output interfaces 1154. Such interfaces 1154 can be used to connect the computing device 1142 with one or more input and/or output devices 1156, 1158, 1140, 1142, 1164. For example, in the embodiment illustrated in FIG. 11, the input and/or output devices can include a scanning device 1156, a camera dock 1158, an input device 1140 (e.g., a mouse, a keyboard, etc.), a display device 1142 (e.g., a monitor), a printer 1164, and/or one or more other input devices. The input/output interfaces 1154 can receive executable instructions and/or data, storable in the data storage device (e.g., memory), representing a virtual dental model of a patient's dentition.

In some embodiments, the scanning device 1156 can be configured to scan one or more physical dental molds of a patient's dentition. In one or more embodiments, the scanning device 1156 can be configured to scan the patient's dentition, a dental appliance, and/or attachment placement structure directly. The scanning device 1156 can be configured to input data into the computing device 1142. In some embodiments, the camera dock 1158 can receive an input from an imaging device (e.g., a 2D or 3D imaging device) such as a digital camera, a printed photograph scanner, and/or other suitable imaging device. The input from the imaging device can, for example, be stored in memory 1146.

The processor 1144 can execute instructions to provide a visual indication of a treatment plan, a dental appliance, and/or a one or more attachments on the display 1142. The computing device 1142 can be configured to allow a treatment professional or other user to input treatment goals. Input received can be sent to the processor 1144 as data 1148 and/or can be stored in memory 1146. Such connectivity can allow for the input and/or output of data and/or instructions among other types of information. Some embodiments may be distributed among various computing devices within one or more networks, and such systems as illustrated in FIG. 11 can be beneficial in allowing for the capture, calculation, and/or analysis of information discussed herein.

The processor 1144, in association with the data storage device (e.g., memory 1146), can be associated with the data 1148. The processor 1144, in association with the memory 1146, can store and/or utilize data 1148 and/or execute instructions 1150 for creating and/or modeling interactions between an attachment and a tooth; interactions between an attachment and an appliance; and/or combinations of interactions between one or more attachments, one or more teeth and/or other structure in the mouth of the patient, and/or one or more appliances for moving teeth.

The processor 1144, in association with the memory 1146 can, in addition to or alternatively, store and/or utilize data 1148 and/or execute instructions 1150 for creating and/or modeling attachment placement structures and/or attachments, and/or adhesive and/or releasable materials, as well as a virtual modeling of such items with or without an appliance for moving teeth, and/or one or more teeth. The virtual model of the attachment placement structure and/or attachments to attach a dental appliance to the teeth of a patient can be used to create a physical dental appliance, attachment placement structure and/or attachments, for instance, as discussed further herein.

The processor 1144 coupled to the memory 1146 can, for example, include instructions to cause the computing device 1142 to perform a method including, for example, creating a treatment plan based on a virtual model of a jaw of a patient, wherein the treatment plan includes use of an attachment.

In some embodiments, the processor 1144 coupled to the memory 1146 can cause the computing device 1142 to perform the method comprising modeling a virtual dental attachment based on the treatment plan, wherein the virtual dental attachment is constructed to provide one or more forces desired by the treatment plan.

In various embodiments, the processor 1144 coupled to the memory 1146 can cause the computing device 1142 to perform the method comprising creating a virtual dental attachment placement apparatus that includes a surface (e.g., contoured surface) configured to register in accordance with a scan of the patient's dental arch. The computing device 1142 may be configured to determine (e.g., calculate) a desired position of one or more attachments on corresponding teeth based on the virtual dental attachment placement apparatus and the scan of the patient's dental arch. Such analysis can be also be accomplished one or more times for a treatment plan. For example, if a treatment plan has 30 stages, it would be possible to have different attachments for each stage or possibly more, if desired. However, in many instances the attachment type, position, and/or orientation may be changed a few times during the treatment plan.

Through use of virtual modeling, attachments can be virtually tested and the best attachment type, shape, position, and/or orientation can be selected without inconveniencing the patient with trial and error of attachments during treatment. Additionally, use of virtual modeling can also allow for custom design of attachment shapes that will be suitable for a specific patient's needs and/or a specific function within an area of a patient's mouth. From such analysis, different physical dental attachment placement apparatuses can be created from the virtual dental attachment placement apparatus data that would be utilized to create the attachments needed for the different stages.

Further, the specialized nature of the design of such attachments can also allow the attachments to be made from different materials. In this manner, attachments during a treatment plan or even during one stage can be of a different material that may provide more specialized force distribution than was possible with standard attachments.

In some embodiments, the printer 1144 can be a three dimensional or direct fabrication device that can create a dental appliance directly from instructions from the computing device 1142. Embodiments of the present disclosure utilizing such technology can be particularly beneficial for a variety of reasons. For example, such direct manufacture allows for less waste of materials due to less processing steps and increased specialization of the attachment placement structure, attachment materials, and/or other components of the appliances described herein.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the FIGS. for the purpose of streamlining the disclosure. This method of disclosure is not to be interpreted as reflecting an intention that the embodiments of the disclosure require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. An aligner attachment placement device, comprising:
   a frame configured to extend over at least a portion of a dental arch;
   an attachment support extending from a first side of the frame;
   an aligner attachment frangibly connected to the attachment support;
   a first and second registration anchor extending from the frame and configured to hold the aligner attachment against a tooth surface at a predetermined position, wherein a gap portion of the frame between the first and second registration anchors is configured to suspend over one or more teeth of the dental arch such that a space is between the gap portion and the one or more teeth when the aligner attachment placement device is placed on the dental arch, wherein the aligner attachment is shaped to interact with a surface of an aligner to impart forces on the dental arch when the aligner attachment is attached on the tooth surface; and
   a retention support extending from a second side of the frame and configured to maintain the frame over the dental arch, wherein the retention support is separate from and located between the first and second registration anchors, wherein the retention support includes an extension arm and a tooth contact portion, wherein the tooth contact portion is shaped to contact one or more teeth of the dental arch, and the extension arm couples the tooth contact portion to the second side of the frame, wherein at least part of the extension arm has a smaller width than the tooth contact portion.

2. The device of claim 1, wherein the aligner attachment is coupled to the attachment support via a plurality of frangible portions.

3. The device of claim 1, wherein the aligner attachment is adapted to break away from the attachment support at an interface region.

4. The device of claim 1, wherein the attachment support is configured as an attachment frame around the aligner attachment, wherein the aligner attachment is attached to the attachment frame by one or more frangible portions.

5. The device of claim 1, wherein the aligner attachment includes a textured surface on a tooth-facing side to increase a bond strength of the aligner attachment to the tooth surface.

6. The device of claim 1, wherein each of the first and second registration anchors has a contoured surface to complement a surface of corresponding one or more teeth of the dental arch.

7. The device of claim 6, wherein the contoured surface of each of the first and second registration anchors corresponds to a surface of corresponding one or more of an incisor, canine, premolar, and molar of the dental arch.

8. The device of claim 1, wherein the aligner attachment is configured to attach to the same tooth that the first or second registration anchor is configured to hold the aligner attachment against.

9. The device of claim 1, wherein the aligner attachment is configured to attach to a different tooth than the first or second registration anchor is configured to hold the aligner attachment against.

10. The device of claim 1, wherein the attachment support is between the first and second registration anchors along a length of the frame.

11. The device of claim 1, wherein the retention support is adapted to contact one or more lingual tooth surfaces.

12. The device of claim 1, wherein the retention support is adapted to contact an interproximal region between two teeth.

13. The device of claim 1, further comprising an integrated device identifier.

14. The device of claim 1, wherein the aligner attachment includes one or more auxiliary features that extend from the aligner attachment.

15. The device of claim 14, wherein the one or more auxiliary features includes a power arm, hook, button, spring, brace, bracket, wire, rod, band, blade, coil, elastic, ring, track, link and chain.

16. The device of claim 1, wherein the retention support includes:
an arched or angled portion that extends from the frame and is configured to be separated from the dental arch by the space; and
a contact portion at a distal end of the arched or angled portion, the contact portion configured to contact one or more teeth, gums, or one or more teeth and gums of the dental arch.

17. The device of claim 1, further comprising one or more three-dimensional (3D) printed regions arranged to form one or more of the frame, the attachment support, the first registration anchor, the second registration anchor, and the retention support.

18. The device of claim 1, wherein the shape of the aligner attachment is based on a computer modeling interaction of the aligner attachment and the aligner.

19. An aligner attachment placement device, comprising:

a frame configured to extend over a portion of a dental arch;
an attachment support extending from a first side of the frame;
an aligner attachment removably attached to the attachment support and adapted to attach to a tooth surface;
a first and second registration anchor extending from the frame, wherein the first registration anchor is separated by the second registration anchor by a gap portion of the frame that is configured to suspend over one or more teeth along the portion of the dental arch such that a space is between the gap portion and the one or more teeth, the first and second registration anchors configured to place the aligner attachment at a predetermined position on the tooth surface, wherein the aligner attachment is shaped to interact with a surface of an aligner to impart forces on the dental arch when the aligner attachment is attached on the tooth surface; and
a retention support extending from a second side of the frame and adapted to maintain the aligner attachment at the predetermined position, wherein the retention support is separate from and located between the first and second registration anchors, wherein the retention support includes an extension arm and a tooth contact portion, wherein the tooth contact portion is shaped to contact one or more teeth of the dental arch, and the extension arm couples the tooth contact portion to the second side of the frame, wherein at least part of the extension arm has a smaller width than the tooth contact portion.

20. The device of claim 19, wherein each of the first and second registration anchors have a contact surface adapted to contact a corresponding tooth.

21. The device of claim 19, wherein the aligner attachment extends from a buccal side of the frame and the retention support extends from a lingual side of the frame.

22. The device of claim 19, wherein the attachment support extends from the gap portion of the frame and the aligner attachment is positioned to attach to one of one or more spanned teeth.

23. The device of claim 19, wherein the aligner attachment is configured to attach to a same tooth as the first registration anchor or the second registration anchor is configured to contact.

24. The device of claim 19, further comprising a second attachment support, the second attachment support having a second aligner attachment adapted to attach to a second tooth surface.

25. The device of claim 24, wherein the second attachment support extends from the first registration anchor or the second registration anchor.

26. The device of claim 19, wherein the aligner attachment includes one or more auxiliary features that extend from the aligner attachment.

27. The device of claim 26, wherein the one or more auxiliary features includes one or more of a power arm, hook, button, spring, brace, bracket, wire, rod, band, blade, coil, elastic, ring, track, link and chain.

28. The device of claim 19, wherein the first registration anchor is configured to register with an occlusal surface of a first tooth, and the second registration anchor is configured to register with an occlusal surface of a second tooth that is non-adjacent to the first tooth.

29. The device of claim 19, wherein the gap portion is configured to suspend over the one or more teeth along the portion of the dental arch such that the space is between the gap portion and an occlusal surface of the one or more teeth.

30. The device of claim 19, further comprising one or more three-dimensional (3D) printed regions arranged to form one or more of the frame, the attachment support, the first registration anchor, the second registration anchor, and the retention support.

31. An aligner system comprising:
an attachment placement device comprising:
a frame configured to extend over at least a portion of a dental arch;
a plurality of attachment supports, wherein each attachment support is configured to extend over a buccal surface of the dental arch when the frame is worn over the dental arch;
a plurality of aligner attachments, wherein each aligner attachment is frangibly connected to one of the attachment supports of the plurality of attachment supports;
a plurality of registration anchors extending from the frame, wherein adjacent registration anchors of the plurality of registration anchors are separated by a gap portion of the frame that is configured to suspend over one or more teeth of the dental arch such that a space is between the gap portion and the one or more teeth when the attachment placement device is placed on the dental arch, wherein the plurality of registration anchors is configured to hold the aligner attachment against a tooth surface at a predetermined position when the frame is worn over the dental arch; and
a plurality of retention supports extending from the frame, wherein the plurality of retention supports is configured to maintain the frame over the dental arch when the frame is worn over the dental arch, wherein each of the plurality of retention supports is separate from and located between adjacent registration anchors of the plurality of registration anchors, wherein each of the retention supports includes an extension arm and a tooth contact portion, wherein the tooth contact portion is shaped to contact one or more teeth of the dental arch, and the extension arm couples the tooth contact portion to the frame, wherein at least part of the extension arm has a smaller width than the tooth contact portion; and
an aligner shaped to interact with a surface of the aligner attachment and to impart forces on the dental arch in accordance with a treatment plan when the aligner attachment is attached to the tooth surface.

32. The system of claim 31, wherein each retention support of the plurality of retention supports includes:
an arched or angled portion that extends from the frame and is configured to be separated from the dental arch by the space; and
a contact portion at a distal end of the arched or angled portion, the contact portion configured to contact one or more teeth, gums, or one or more teeth and gums of the dental arch.

* * * * *